(12) United States Patent
Agiwal et al.

(10) Patent No.: US 12,167,467 B2
(45) Date of Patent: Dec. 10, 2024

(54) METHOD AND APPARATUS FOR PERFORMING RANDOM ACCESS PROCEDURE

(71) Applicant: Samsung Electronics Co., Ltd., Suwon-si (KR)

(72) Inventors: Anil Agiwal, Suwon-si (KR); Saidhiraj Amuru, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 18/190,583

(22) Filed: Mar. 27, 2023

(65) Prior Publication Data

US 2023/0232464 A1    Jul. 20, 2023

Related U.S. Application Data

(63) Continuation of application No. 16/047,787, filed on Jul. 27, 2018, now Pat. No. 11,647,544.

(30) Foreign Application Priority Data

Jul. 27, 2017 (IN) .............................. 201711026769

(51) Int. Cl.
*H04W 74/08* (2024.01)
*H04B 7/06* (2006.01)
(Continued)

(52) U.S. Cl.
CPC ...... *H04W 74/0833* (2013.01); *H04B 7/0626* (2013.01); *H04L 5/0048* (2013.01);
(Continued)

(58) Field of Classification Search
CPC ............. H04W 74/0833; H04W 24/10; H04W 56/001; H04W 76/27; H04W 36/0077;
(Continued)

(56) References Cited

U.S. PATENT DOCUMENTS 11,647,544 B2 * 5/2023 Agiwal ................ H04W 76/27
370/329
2009/0316638 A1    12/2009 Yi et al.
(Continued)

FOREIGN PATENT DOCUMENTS

CN    102348197 A    2/2012
CN    105099627 A    11/2015
(Continued)

OTHER PUBLICATIONS

Media Tek Inc.; Handover in NR Considering Multiple-beam Operation; 3GPP TSG-RAN WG2 Meeting #98; R2-1704525; May 15-19, 2017; Hangzhou, China; May 5, 2017.
(Continued)

*Primary Examiner* — Walli Z Butt
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for internet of things (IoT) are provided. The communication method and system includes intelligent services based on the 5G communication technology and the IoT-related technology, such as smart home, smart building, smart city, smart car, connected car, health care, digital education, smart retail, security and safety services. A method by a terminal for transmitting a random access (RA) preamble is provided. The method includes receiving configuration information on RA resources associated with synchronization signal (SS) blocks from a base station, receiving one or more SS blocks from the base station, determining whether there is at least one suitable SS block for which contention free RA resources are configured amongst the one or more SS blocks based on the configuration information, selecting a suitable SS block for which contention free RA resources are configured if there is at
(Continued)

least one suitable SS block for which contention free RA resources are configured amongst the one or more SS blocks, selecting a first RA preamble corresponding to the selected suitable SS block, and transmitting the first RA preamble to the base station.

20 Claims, 34 Drawing Sheets

(51) Int. Cl.
  H04L 5/00        (2006.01)
  H04W 24/10       (2009.01)
  H04W 56/00       (2009.01)
  H04W 74/0833     (2024.01)
  H04W 76/27       (2018.01)
  H04W 36/00       (2009.01)
(52) U.S. Cl.
  CPC ......... *H04W 24/10* (2013.01); *H04W 56/001* (2013.01); *H04W 76/27* (2018.02); *H04B 7/0617* (2013.01); *H04W 36/0077* (2013.01)
(58) Field of Classification Search
  CPC . H04W 36/08; H04W 74/0866; H04W 56/00; H04W 74/002; H04B 7/0626; H04B 7/0617; H04L 5/0048
  See application file for complete search history.

(56) References Cited

U.S. PATENT DOCUMENTS

| | | |
|---|---|---|
| 2012/0307716 A1 | 12/2012 | Zhao et al. |
| 2014/0112254 A1 | 4/2014 | Lindoff et al. |
| 2015/0264132 A1 | 9/2015 | Dang et al. |
| 2015/0289141 A1 | 10/2015 | Ghasemzadeh et al. |
| 2015/0341912 A1 | 11/2015 | Kim et al. |
| 2015/0382205 A1 | 12/2015 | Lee |
| 2016/0057783 A1 | 2/2016 | Rosa et al. |
| 2016/0183167 A1 | 6/2016 | Agiwal et al. |
| 2017/0006642 A1 | 1/2017 | Park et al. |
| 2017/0034853 A1 | 2/2017 | Rune et al. |
| 2017/0064693 A1 | 3/2017 | Kim et al. |
| 2017/0094688 A1 | 3/2017 | Lee et al. |
| 2017/0251460 A1 | 8/2017 | Agiwal et al. |
| 2018/0270792 A1 | 9/2018 | Park et al. |
| 2018/0270895 A1 | 9/2018 | Park et al. |
| 2018/0279193 A1* | 9/2018 | Park ..................... H04W 36/26 |
| 2018/0279286 A1 | 9/2018 | Akoum et al. |
| 2018/0324653 A1 | 11/2018 | Nagaraja et al. |
| 2018/0368189 A1 | 12/2018 | Narasimha et al. |
| 2019/0037423 A1 | 1/2019 | Yu et al. |
| 2019/0104549 A1 | 4/2019 | Deng et al. |
| 2019/0116613 A1 | 4/2019 | Abedini et al. |
| 2019/0281624 A1* | 9/2019 | Kim .................... H04J 13/0062 |
| 2019/0349830 A1* | 11/2019 | Peisa ................... H04B 7/0617 |
| 2019/0387441 A1* | 12/2019 | Koskela ............ H04W 36/0077 |
| 2020/0008245 A1 | 1/2020 | Yan et al. |
| 2020/0068457 A1 | 2/2020 | You et al. |
| 2020/0120634 A1 | 4/2020 | Lee et al. |
| 2020/0154326 A1 | 5/2020 | Deenoo et al. |
| 2020/0305041 A1 | 9/2020 | Fan et al. |

FOREIGN PATENT DOCUMENTS

| | | |
|---|---|---|
| CN | 105474726 A | 4/2016 |
| WO | 2012/173565 A1 | 12/2012 |
| WO | 2014/070066 A1 | 5/2014 |
| WO | 2014/154246 A1 | 10/2014 |
| WO | 2016/086144 A1 | 6/2016 |

OTHER PUBLICATIONS

Fujitsu; Discussion on RACH procedure; 3GPP TSG RAN WG1 Meeting #88bis; R1-1704477; Apr. 3-7, 2017; Spokane, USA; Mar. 25, 2017.
Guangdong OPPO Mobile Telecom; Discussion on Random Access Procedure for NR; 3GPP TSG RAN WG1 NR Ad-Hoc Meeting; R1-1700548; Jan. 16-20, 2017; Spokane, USA; Jan. 9, 2017.
Nokia et al.; NR Random Access Procedure; 3GPP TSG-RAN WG1 AH_NR Meeting; R1-1700651; Jan. 16-20, 2017; Spokane, USA; Jan. 9, 2017.
ZTE; 4-step random access procedure; 3GPP TSG RAN WG1 NR Ad-hoc#2; R1-1709897; Jun. 27-30, 2017; Qingdao, P.R. China; Jun. 17, 2017.
Ericsson; On the use of SS for beam management; 3GPP TSG-RAN WG1 #89ah-NR; R1-1711019; Jun. 27-30, 2017; Qingdao, China; Jun. 17, 2017.
Ericsson; NR mapping between SS-blocks and PRACH preambles; 3GPP TSG-RAN WG1 Meeting #89; R1-708726; May 15-19, 2017; Hangzhou, China; May 7, 2017.
ETSI MCC; Report of 3GPP TSG RAN WG2 NR AdHoc#2 meeting, Qingdao, China; 3GPP TSG-RAN WG2 meeting #99; R2-1707602; Aug. 21-25, 2017; Berlin, Germany; Aug. 21, 2017.
Chinese Office Action with English translation dated Jul. 28, 2023; Chinese Appln. No. 201880049216.3.
Korean Office Action with English translation dated Aug. 24, 2023; Korean Appln. 10-2018-0088109.
Chen; Research on LTE RACH process; China Academic Journal Electronic Publishing House; www.cnki.net; Jun. 26, 2009.
Samsung; Beam Selection for HO Access; 3GPP TSG-RAN WG2 #99bis; Prague, Czech Republic; Oct. 9-13, 2017.
Samsung; Further Discussion on NR Random Access and Impact on RAN4 RRM Specification; 3GPP TSG-RAN WG4 Meeting #86; R4-1802037; Athens, Greece; Feb. 26-Mar. 2, 2018.
Chinese Notice of Allowance with English translation dated Dec. 8, 2023; Chinese Appln. No. 2018800492163.
Extended European Search Report dated Feb. 13, 2024; European Appln. No. 23204194.7-1216 / 4336903.
International Search Report dated Oct. 8, 2018, issued in International Application No. PCT/KR2018/008569.
Samsung, 'Considerations on contention-free random access', R1-1707937, 3GPP TSG RAN WG1 Meeting #89, Hangzhou, China, May 6, 2017, See pp. 1-6.
Intel Corporation, 'NR random access procedure', R1-1706172, 3GPP TSG RAN WG1 Meeting #88bis, Spokane, USA, Apr. 3, 2017, See p. 3.
Ericsson, "Further details of handover execution in NR", 3GPP TSG RAN WG2 Ad Hoc on NR, R2-1707276, Qingdao, China, Jun. 27-29, 2017.
Huawei, et al. "Baseline handover procedure for inter gNB hand over in NR", 3GPP TSG RAN WG2 Ad Hoc #2 on NR, R2-1706705, Qingdao, China, Jun. 27-29, 2017.
Nokia, et al., "Beam Recovery", 3GPP TS G RAN WG1 Ad Hoc #2, R1-1711291, Qingdao, P.R. China, Jun. 27-30, 2017.
Japanese Office Action dated Jul. 26, 2022, issued in Japanese Application No. 2020-504202.
Indian Search Report dated Mar. 14, 2022; Indian Appln. No. 201711026769.
The Extended European Search report dated Feb. 26, 2021, issued in European Application No. 18837438.3.
NTEL, "Considerations of random access procedure in multiple and single beam scenarios," R2-1703445, Spokane, Washington, USA, Apr. 3-7, 2017.
Korean Office Action dated Feb. 21, 2023, issued in Korean Application No. 10-2018-0088109.
Chinese Office Action dated Feb. 27, 2023, issued in Chinese Application No. 201880049216.3.

* cited by examiner

METHOD AND APPARATUS FOR PERFORMING RANDOM ACCESS PROCEDURE

CROSS-REFERENCE TO RELATED APPLICATION(S)

This application is a continuation application of prior application Ser. No. 16/047,787 filed on Jul. 27, 2018, which is based on and claims priority under 35 U.S.C. § 119(a) of an Indian patent application number 201711026769, filed on Jul. 27, 2017, in the Indian Patent Office, the disclosure of which is incorporated by reference herein in its entirety.

BACKGROUND

1. Field

The disclosure relates to a system, a method and an apparatus for performing a random access procedure in a wireless communication system. More particularly, the disclosure relates to a method for selecting PRACH preamble and/or PRACH resources/occasions during the random access procedure.

2. Description of the Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands but also in higher frequency (mmWave) bands, e.g., 10 GHz to 100 GHz bands, so as to accomplish higher data rates. These frequency bands can be licensed or unlicensed. To mitigate propagation loss of the radio waves and increase the transmission distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In the recent years several broadband wireless technologies have been developed to meet the growing number of broadband subscribers and to provide more and better applications and services. The second generation (2G) wireless communication system has been developed to provide voice services while ensuring the mobility of users. The third generation (3G) wireless communication system supports not only the voice service but also data service. The 4G wireless communication system has been developed to provide high-speed data service. However, the 4G wireless communication system suffers from lack of resources to meet the growing demand for high speed data services. Therefore, the 5G wireless communication system is being developed to meet the growing demand of various services with diverse requirements, e.g., high speed data services, support ultra-reliability and low latency applications.

In addition, the 5G wireless communication system is expected to address different use cases having quite different requirements in terms of data rate, latency, reliability, mobility etc. However, it is expected that the design of the air-interface of the fifth generation wireless communication system would be flexible enough to serve the user equipments (UEs) having quite different capabilities depending on the use case and market segment the UE cater service to the end customer. Example use cases the 5G wireless communication system wireless system is expected to address is enhanced mobile broadband (eMBB), massive MTC (m-MTC), ultra-reliable low latency communication (URLL), etc. The eMBB requirements like tens of Gbps data rate, low latency, high mobility so on and so forth address the market segment representing the related-art wireless broadband subscribers desiring internet connectivity everywhere, all the time and on the go. The m-MTC requirements like very high connection density, infrequent data transmission, very long battery life, low mobility address so on and so forth address the market segment representing the IoT/IoE envisioning connectivity of billions of devices. The URLL requirements like very low latency, very high reliability and variable mobility so on and so forth address the market segment representing the industrial automation application, vehicle-to-vehicle/vehicle-to-infrastructure communication foreseen as one of the enablers for autonomous cars.

In the existing wireless communication system i.e., in LTE, random access (RA) procedure is used to achieve uplink time synchronization. RA procedure is used in LTE during initial access, handover, radio resource control (RRC) connection re-establishment procedure, positioning purpose, scheduling request transmission, secondary cell group (SCG) addition/modification and data or control information transmission in uplink by non—synchronized UE in RRC CONNECTED state. In LTE two types of RA procedure are defined: contention-based and contention-free.

Contention-Based RA (CBRA) Procedure:

FIG. 1 illustrates a procedure of CBRA according to the related art.

RA Preamble (or Msg1) Transmission: UE transmits an RA preamble at operation 101. UE selects one of the available 64-Ncf contention based RA preambles. Ncf is the number of RA preambles reserved for contention free access. The contention based RA preambles can be optionally partitioned into two groups. If two groups are configured, UE selects the group based on size of message 3 UE can transmit. The initial RA preamble transmission power is set based on open loop estimation after compensating for path loss.

RA response (RAR) or Msg2: Evolved node B (eNB) transmits the RAR on physical downlink shared channel (PDSCH) addressed to random access-radio network temporary identifier (RA-RNTI) at operation 102. RA-RNTI identifies the time-frequency slot in which RA preamble was detected by eNB. RAR conveys RA preamble identifier, timing alignment information, temporary cell-radio network temporary identifier (C-RNTI) and UL grant for message 3. RAR may also include back off indicator to instruct UE to back off for period of time before retrying RA attempt. RAR is transmitted in RAR window.

FIG. 3 illustrates an RA preamble transmission and an RAR window according to the related art.

As shown in FIG. 3, RAR window starts at subframe 'x+3' for RA preamble transmitted in subframe 'x'. RAR window size is configurable.

Scheduled uplink (UL) Transmission on UL shared channel (SCH) (or Msg3): UE performs scheduled transmission at operation 103. The scheduled UL transmission is used to transmit message such as RRC connection request, RRC connection re-establishment request, RRC handover confirm, scheduling request, etc. It also includes the UE identity (i.e., C-RNTI or system architecture evolution-temporary mobile subscriber identity (S-TMSI) or a random number). Hybrid automatic repeat request (HARQ) is used for this transmission. The message transmitted in the scheduled UL transmission is commonly referred as Msg3.

Contention Resolution Message (or Msg 4): eNB transmits contention resolution message at operation 104. The contention resolution message is also commonly referred as Msg4. The contention resolution message uses HARQ and is addressed to C-RNTI (if included in Msg3) or temporary C-RNTI (if C-RNTI is not included in Msg3). On successful decoding of the contention resolution message, HARQ feedback is only sent by UE which detects its own UE ID (or C-RNTI).

Contention-Free RA (CFRA) Procedure:

FIG. 2 illustrates a procedure of CFRA according to the related art.

CFRA procedure is used for scenarios such as handover where low latency is required, timing advance establishment for secondary cell (Scell), etc.

Referring to FIG. 2, eNB assigns to UE a non-contention RA preamble in dedicated signaling at operation 201.

The UE transmits the assigned non-contention RA preamble at operation 202.

The eNB transmits the RAR on PDSCH addressed to RA-RNTI at operation 203. RAR conveys RA preamble identifier and timing alignment information. RAR may also include UL grant. RAR is transmitted in RAR window similar to CBRA procedure. CFRA procedure terminates after receiving the RAR.

It is to be noted that during the random access procedure which is contention free (i.e., contention free preamble is assigned), UE transmits and retransmits the contention free RA preamble until the random access procedure is completed.

Issue Description

At higher frequency, beamforming is necessary to compensate for high path loss. UE/gNB needs to transmit/receive physical random access channel (PRACH) preamble and Msg3 using beamforming GNB/UE needs to transmit/receive RAR & Msg4 using beamforming UE and gNB may support multiple transmission (TX)/reception (RX) beams where each TX/RX beam covers a specific coverage area. In case of beamformed PRACH preamble transmission, DL TX beam (i.e., gNB TX beam) is indicated by UE during PRACH preamble transmission. Based on received PRACH preamble transmission, gNB can identify the DL TX beam for transmitting Msg2.

UE can identify the DL TX beam based on DL synchronization signals, reference signals or broadcast channel which are transmitted multiple times in case of beamforming system. One or multiple DL TX beams can be used for transmitting DL synchronization signals, reference signals or broadcast channel in each time occasion. A time occasion of transmitting synchronization signals (i.e., primary synchronization signal (PSS)/synchronization signal (SSS) and primary broadcast channel (PBCH) using one or multiple DL TX beams is referred as synchronization signal (SS) block. Network transmits DL synchronization signals and PBCH using multiple SS blocks periodically. GNB can configure an association between one or multiple occasion for SS Block and a subset of random access channel (RACH) resources (i.e., time/frequency resources which are also referred as PRACH occasions or RA occasions) and/or a subset of PRACH preamble (also referred as RA preamble or Random Access preamble) indices. This association can be configured in RACH configuration signaled in system information or in dedicated RRC signaling (e.g., handover command). UE selects the PRACH preamble and/or PRACH resource (or PRACH occasion) corresponding to SS block in which the UE has received the DL synchronization signals. Similar to SS blocks, gNB can configure an association between one or multiple CSI-RSs (CSI-RS is transmitted using TX beamforming) and a subset of PRACH resources (i.e., time/frequency resources which are also referred as PRACH occasions or RA occasions) and/or a subset of PRACH preamble indices. This association can be configured in RACH configuration signaled in system information or in dedicated RRC signaling (e.g., handover command) UE selects the PRACH preamble and/or PRACH resource (or PRACH occasion) corresponding to received CSI-RS signal.

The first issue is how the UE selects the SS block for PRACH preamble and/or PRACH resource (or PRACH occasion) selection during initial PRACH preamble transmission. The second issue is how the UE selects the SS block for PRACH preamble and/or PRACH resource (or PRACH occasion) selection during PRACH re-transmission i.e., when UE fails to receive RAR successfully after transmitting the PRACH preamble. The third issue is how the UE selects the SS block for PRACH preamble and/or PRACH resource selection (or PRACH occasion) during handover to target cell for PRACH (re-)transmission in target cell wherein the handover command includes contention free PRACH preambles and/or PRACH resources (or PRACH occasions) for one or more SS blocks in addition to contention based PRACH preambles and/or PRACH resources (or PRACH occasions) for all SS blocks.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

In accordance with a first aspect of the disclosure, a method by a terminal for transmitting a random access (RA) preamble is provided. The method includes receiving configuration information on RA resources associated with synchronization signal (SS) blocks from a base station, receiving one or more SS blocks from the base station, identifying whether there is at least one suitable SS block for which contention free RA resources are configured amongst the one or more SS blocks, selecting a suitable SS block for which contention free RA resources are configured if there is at least one suitable SS block for which contention free RA resources are configured amongst the one or more SS blocks, selecting a first RA preamble corresponding to the selected suitable SS block, and transmitting the first RA preamble to the base station.

In accordance with a second aspect of the disclosure, a method by a base station for receiving a random access (RA) preamble. The method includes transmitting configuration information on RA resources associated with synchronization signal (SS) blocks to a terminal, transmitting one or more SS blocks to the terminal, and receiving an RA preamble from the terminal. The RA preamble corresponds to a SS block selected amongst the one or more SS blocks based on whether there is at least one suitable SS block for which contention free RA resources are configured amongst the one or more SS blocks. The SS block is a suitable SS block for which contention free RA resources are configured if there is at least one suitable SS block for which contention free RA resources are configured amongst the one or more SS blocks.

In accordance with a third aspect of the disclosure, a terminal for transmitting a random access (RA) preamble is provided. The terminal includes a transceiver and a controller coupled with the transceiver. The transceiver is configured to receive signals from a base station, and transmit signals to the base station. The controller is configured to control the transceiver to receive configuration information on RA resources associated with synchronization signal (SS) blocks from the base station, control the transceiver to receive one or more SS blocks from the base station, identify whether there is at least one suitable SS block for which contention free RA resources are configured amongst the one or more SS blocks, select a suitable SS block for which contention free RA resources are configured if there is at least one suitable SS block for which contention free RA resources are configured amongst the one or more SS blocks, select a first RA preamble corresponding to the selected suitable SS block, and control the transceiver to transmit the first RA preamble to the base station.

In accordance with a fourth aspect of the disclosure, a base station for receiving a random access (RA) preamble is provided. The base station includes a transceiver and a controller coupled with the transceiver. The transceiver is configured to receive signals from a terminal, and transmit signals to the terminal. The controller is configured to control the transceiver to transmit configuration information on RA resources associated with synchronization signal (SS) blocks to the terminal, control the transceiver to transmit one or more SS blocks to the terminal, and control the transceiver to receive an RA preamble from the terminal. The RA preamble corresponds to a SS block selected amongst the one or more SS blocks based on whether there is at least one suitable SS block for which contention free RA resources are configured amongst the one or more SS block. The SS block is a suitable SS block for which contention free RA resources are configured if there is at least one suitable SS block for which contention free RA resources are configured amongst the one or more SS blocks.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
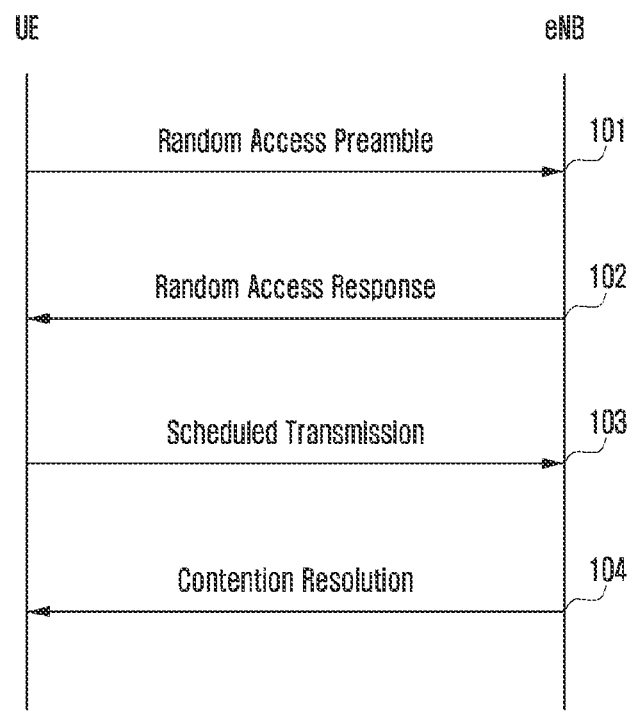
FIG. 1 illustrates a procedure of contention-based random access (RA) (CBRA) according to the related art.
Figure 2:
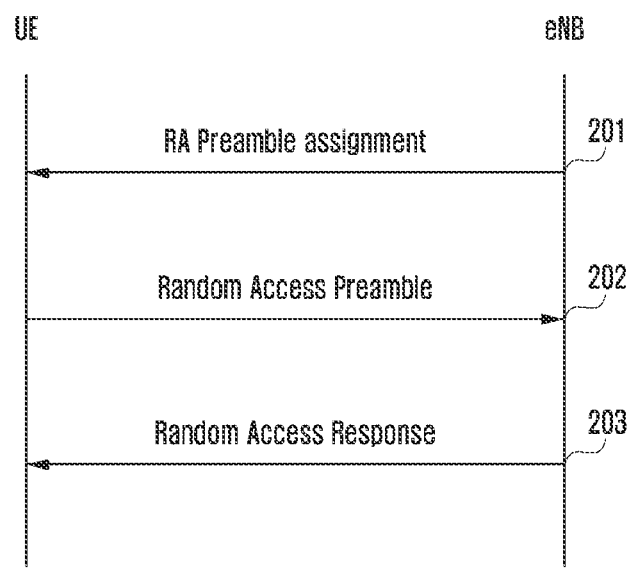
FIG. 2 illustrates a procedure of contention-free RA (CFRA) according to the related art.
Figure 3:
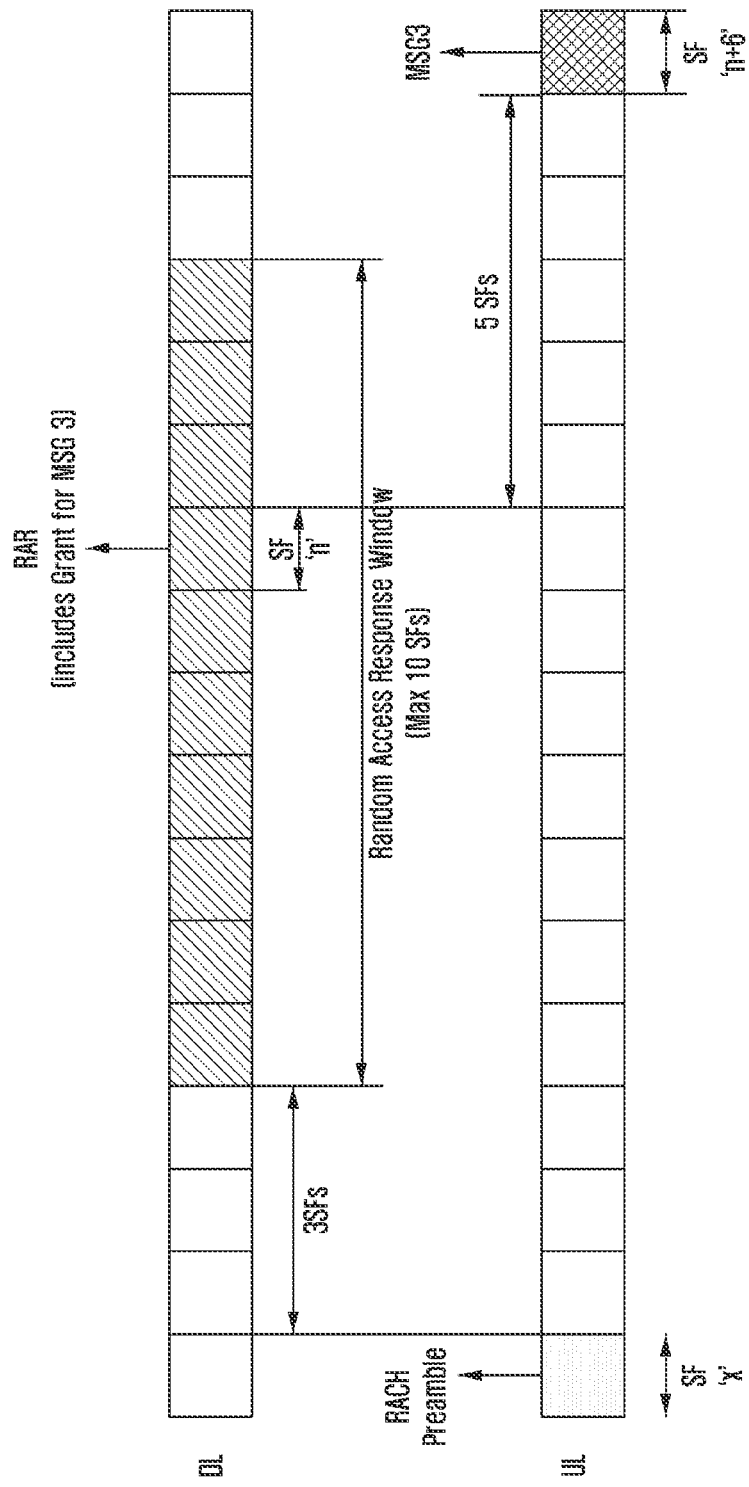
FIG. 3 illustrates an RA preamble transmission and an RA response (RAR) window according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

Figure 4:
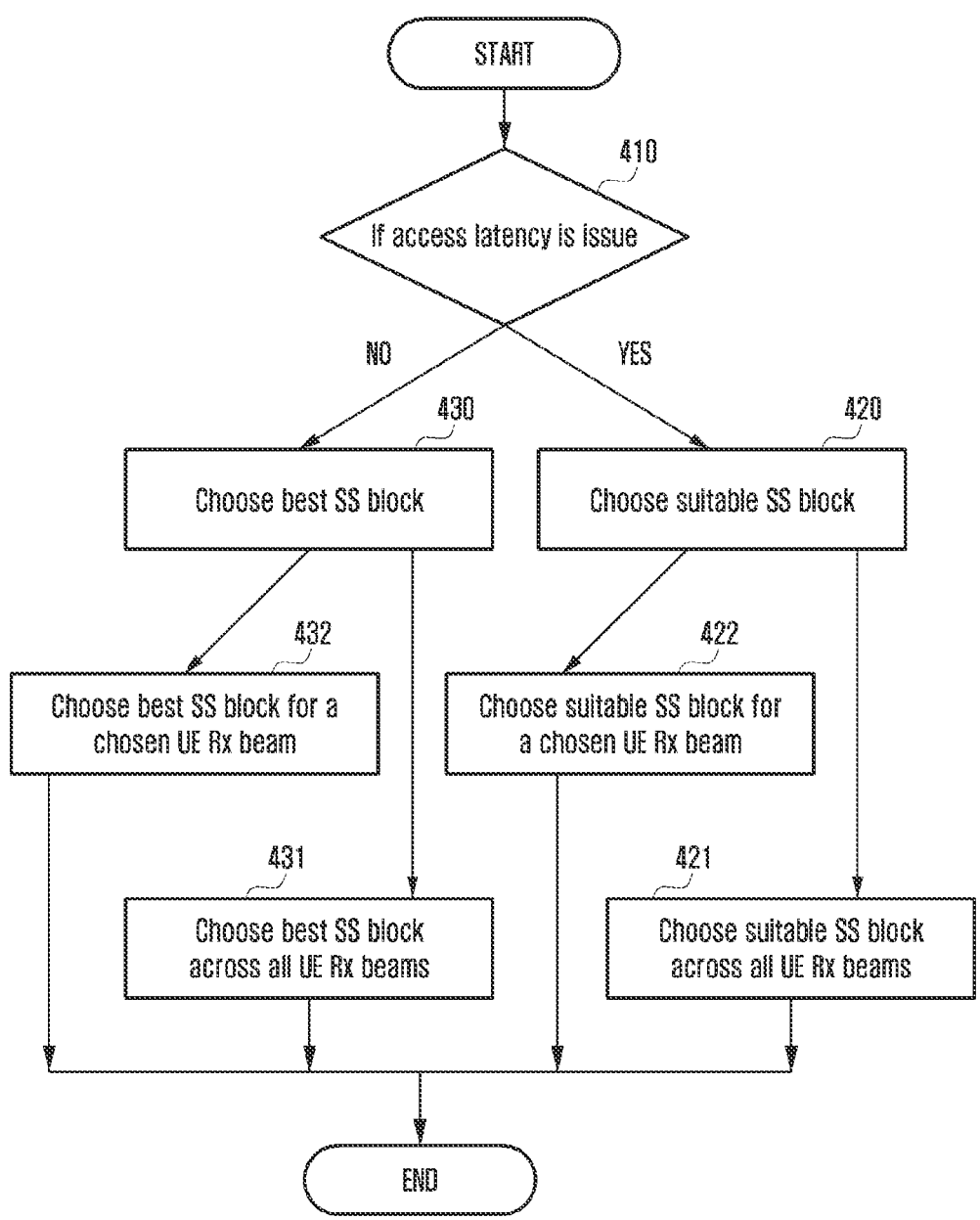
FIG. 4 describes a user equipment (UE) behavior at a high level according to an embodiment of the disclosure.

FIG. 4 describes the UE behavior at a high level according to an embodiment of the disclosure. The UE behavior described in FIG. 4 will be discussed in detail in various methods discussed further below.

Referring to FIG. 4, UE first decides whether the access latency is an issue or not for its random access channel (RACH) procedure at operation 410. For example, for a low latency application, the UE definitely has to finish its RACH procedure fast and hence access latency is definitely an issue. However for some applications wherein the UE only worries about sending a report to the BS but is not worried about time taken for the same, such as in metering applications, a UE can conclude that the access latency is not an issue for its network entry. When the access latency is indeed critical, the UE must enter the network as soon as possible and hence the UE can decide to perform RACH on a suitable SS block (the definition of suitable and how it is chosen will be discussed in detail later) at operation 420. Otherwise, the UE can find the best SS block among all possible SS blocks transmitted by the gNB i.e., after scanning and measuring all the SS blocks transmitted by the gNB (indicated via parameter L which is pre-defined for a given frequency band in 3GPP specifications or indicated via parameter 'SSBPositionsInBurst' signaled by gNB in system information or RRC message) and then take a decision at operation 430. Furthermore, this decision can also be extended to the UE side beamforming whether the UE must scan all its UE reception (Rx) beams at operation 421 or 431, or the UE can just choose one RX beam and be satisfied when the UE finds a suitable SS block corresponding to this chosen UE Rx beam at operation 422 or 432. While the RACH procedure performance may indeed depend on this choice of the SS block, the UE will mostly worry only about camping onto the network as soon as possible in case access latency is an issue. This procedure of finding suitable SS block can be either left to full UE implementation or can be supported by the gNB or fixed in the specification via an explicit threshold. The various methods by which a reference signals received power (RSRP) threshold can be indicated to the UE are discussed below. If reference signal received quality (RSRQ) measurements or signal-to-interference-plus-noise ratio (SINR) measurements will be used for the case of RACH procedure, the threshold needs to be indicated and signaled appropriately. For ease, it is described only as a threshold in the rest of the disclosure.

For the case of initial access RACH procedure, the gNB can indicate the threshold for selecting the SS block to the UE by one or combinations of the following mechanisms:
 1. Fixed in specification.
 2. remaining minimum system information (RMSI) (e.g., SIB 1) indication.
 3. RACH configuration indication.

A gNB can have full control over its network loading, cell edge radius, deployment conditions etc. Hence, a gNB may decide to change the threshold used for the suitable SS block choice, for various UEs, by explicit indication via RMSI or via RACH configuration information. A value fixed in specification may or may not work at all situations. Furthermore, for fairness cases, the gNB may decide this threshold uniformly fairly across all users and hence explicit indication may be preferable. This threshold may be explicitly indicated as an absolute value or as a differential value with respect to some reference value such as −100 dBm (as an example) which may be fixed in specification. This differential reporting can help to reduce some number of bits in the way this threshold is indicated.

For the case of sub-6 GHz systems, wherein the multiple SS blocks are mainly provided for the case of coherent combining and better PBCH demodulation, it does not matter which RACH resource the UE chooses. This may be explicitly indicated to the user by the gNB. This issue of choosing the SS block makes a difference especially in the case of mmWave systems wherein a UE must choose a specific beam/direction/SS-block of the gNB for performing RACH.

4. For re-transmission; threshold can be indicated in RAR if something changes at gNB side.

The same threshold indicated in the initial access procedure may continue to be used for the case of full RACH procedure and any re-transmissions that may be needed for the same. Else, an explicit indication in the RAR message may be indicated to the UE which it can use for further re-transmissions of the RACH preamble. This enables flexibility from gNB side to dynamically change the threshold based on channel conditions/network loading etc.

5. For contention-free (CF); indicate the threshold in handover command for the CSI-RS RACH.
 6. For CF; this threshold is fixed in specification.
 7. For CF; Complete UE implementation without target gNB assistance.
 8. For CF; indicate the threshold in dedicated UE specific signaling.

For the case of CF RACH based on CSI-RS, a different threshold may have to be indicated to the UE which is suitable for the CSI-RS resources/beams. This is because the CSI-RS beams may have a different configuration as opposed to the SS block based beams i.e., wider versus narrow etc. In such cases an appropriate threshold for the same also have to be indicated. Apart from (6) and (7) above which are similar to the case of SS block, for the CF case, the target cell must indicate the threshold to be used. Hence, this threshold may be indicated in the handover command. For the case of this handover, as discussed next, the target cell may indicate two thresholds to the UE: a) CSI-RS based threshold and the b) SS-based threshold. Again, SS threshold can be different from CSI-RS threshold due to difference in beam forming designs.

9. For CF case; fall back RACH based on SS-based threshold can be indicated in handover command.
 10. For CF case; fall back RACH based on SS-based threshold can be indicated via SI of the target cell.
 11. For CF case; fall back RACH based on SS-based threshold can be fixed in specification.
 12. For CF case; fall back RACH based on SS-based threshold can be indicated via RACH configuration of the target cell.

The options 8-11 indicate the various means of indicating this SS-based threshold for the case of CF RACH performed in the case of the handover procedure. If the UE reads the system information (SI) of the target cell, then this threshold may be indicated via SI as well. Also this threshold can be included in the RACH configuration of the target cell when the RACH configuration is provided to the UE.

13. SS threshold for initial access can be different from the SS threshold for handover/CF case.

Note that the thresholds for the case of initial access and handover can be different in order to support fast access to network or faster handover and low interruption times etc. For example, conservative thresholds may be provided in case of the handover to allow for 0ms handover interruption times.

14. If no indication, UE assumes same threshold for initial access and handover for SS based mechanisms.

If no explicit indication is given to the UE, then the UE can use the available threshold which was given in the previous stages, such as initial access.

15. For the case of beam recovery RACH, which may be based on CSI-RS or SS-blocks; the threshold needed for the same can be indicated to the UE via RRC connection establishment procedure (i.e., in RRC reconfiguration message).

This threshold for beam recovery may be different from the other thresholds as the UE must recover fast from the beam failure via L1 mechanisms. If the beam recovery is initiated by the network, then the threshold can be indicated to the UE via UE specific signaling which is suitable for the specific time when the procedure is triggered i.e., via downlink control information (DCI) or media access control (MAC) or RRC signaling.

Having set the context for choosing best or suitable SS blocks, it is described in detail the UE behavior for the RACH transmission and re-transmission by using the available measurements as below.

Figure 5:
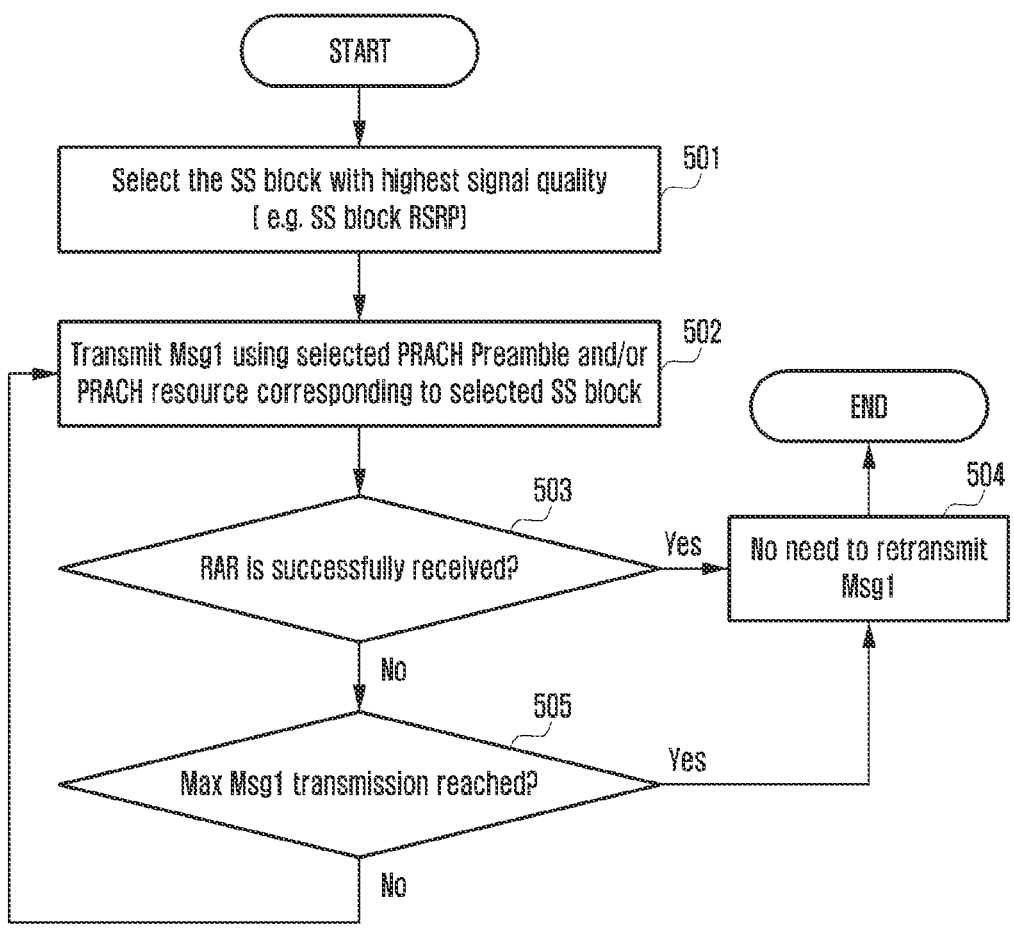
FIG. 5 illustrates a UE behavior for random access channel (RACH) transmission and re-transmission based on Method 1 according to an embodiment of the disclosure.

Method 1:

FIG. 5 illustrates the UE behavior for the RACH transmission and re-transmission based on Method 1 according to an embodiment of the disclosure.

Referring to FIG. 5, UE selects the SS block with highest signal quality for initial PRACH preamble transmission at operation 501. During a random access procedure, the first PRACH preamble transmission is referred as the initial PRACH preamble transmission. The signal quality is measured over the resources of SS block carrying PSS and/or SSS and/or demodulation reference signal (DMRS) for PBCH. The signal quality can be RSRP, RSRQ or received signal strength indicator (RSSI). In an embodiment, the UE may select the SS block with highest signal quality amongst all SS blocks transmitted by gNB. In another embodiment, the UE may select the SS block with highest signal quality amongst all SS blocks for which measurements are available.

The UE then transmits a PRACH preamble (i.e., Msg1) by selecting a PRACH preamble and/or a PRACH resource (or PRACH occasion) corresponding to the selected SS block at operation 502. A PRACH preamble may be referred as a RA preamble or a RACH preamble.

If SS block is associated with PRACH preambles, the UE selects a PRACH preamble randomly from the PRACH preambles corresponding to the selected SS block. The UE may select the earliest available PRACH resource (or PRACH occasion) from configured PRACH resources (or PRACH occasions). In an embodiment, the UE may select randomly one PRACH resource (or PRACH occasion) from configured PRACH resources (or PRACH occasions). In case multiple frequency division multiplexed PRACH resources (or PRACH occasions) are available at the same time, the UE randomly selects with equal probability one PRACH resource (or PRACH occasion) from available multiple frequency division multiplexed PRACH resources (or PRACH occasions).

If SS block is associated with PRACH resources (or PRACH occasions), the UE may select the earliest available PRACH resource (or PRACH occasion) from PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple frequency division multiplexed PRACH resources (or PRACH occasions) are available at the same time corresponding to the selected SS block, the UE randomly selects with equal probability one PRACH resource (or PRACH occasion) from available multiple frequency division multiplexed PRACH resources (or PRACH occasions). The UE randomly selects with equal probability a PRACH preamble from configured set of PRACH preambles.

If SS block is associated with PRACH preambles and PRACH resources, the UE selects a PRACH preamble randomly from the PRACH preambles corresponding to the selected SS block. In an embodiment, the UE may select randomly one PRACH resource (or PRACH occasion) from configured PRACH resources (or PRACH occasions) corresponding to the selected SS block. The UE may select the earliest available PRACH resource (or PRACH occasion) from PRACH resources (or PRACH occasions) corresponding to the selected SS block. In case multiple frequency division multiplexed PRACH resources (or PRACH occasion) are available at the same time corresponding to the selected SS block, the UE randomly selects with equal probability one PRACH resource (or PRACH occasion) from available multiple frequency division multiplexed PRACH resources (or PRACH occasions).

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 503. If the UE successfully receives the RAR, there is no need to retransmit Msg1 at operation 504. If the UE is not able to receive the RAR, the UE determines whether the UE has performed maximum number of allowed Msg1 transmissions at operation 505. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE does not reselect the SS block. The UE uses the same SS block as selected for initial transmission. SS block is selected when random access procedure is initiated and the same SS block is used for PRACH preamble and/or PRACH resource (or PRACH occasion) selection and path loss estimation for all (re-)transmissions of Msg1 during a random access procedure.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:

UE may select SS block (or CSI-RS) with highest signal quality when random access procedure is initiated. UE may use the selected SS block (or CSI-RS) for PRACH preamble and/or PRACH resource (or PRACH occasion) selection and path loss estimation for all (re-)transmissions of Msg1 during a random access procedure.

Figure 6:
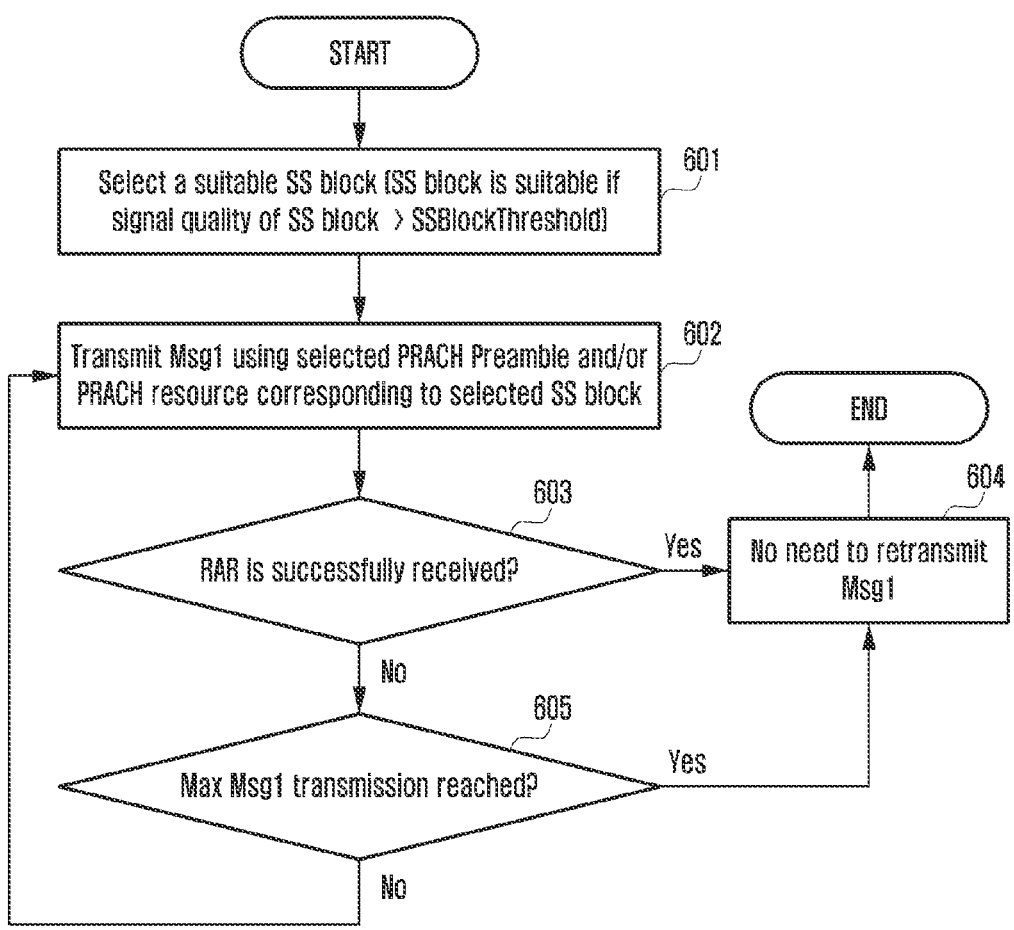
FIG. 6 illustrates a UE behavior for RACH transmission and re-transmission based on Method 2 according to an embodiment of the disclosure.

Method 2:

FIG. 6 illustrates the UE behavior for the RACH transmission and re-transmission based on Method 2 according to an embodiment of the disclosure.

Referring to FIG. 6, UE selects a suitable SS block for initial PRACH preamble transmission at operation 601. A SS block is suitable if signal quality of SS block is greater than the threshold 'SSBlockThreshold'. In an embodiment, a SS block is suitable if signal quality of SS block is greater than or equal to a threshold 'SSBlockThreshold'. The SSBlockThreshold can be configured by network in system information (e.g., together with PRACH configuration or in RMSI) or handover command or in dedicated RRC signaling. The signal quality is measured over the resources of SS block carrying PSS and/or SSS and/or DMRS for PBCH. The signal quality can be RSRP or RSRQ or RSSI. In case multiple SS blocks are suitable, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

The UE then transmits a PRACH preamble (i.e., Msg1) by selecting a PRACH preamble and/or a PRACH resource (or PRACH occasion) corresponding to the selected SS block at operation 602.

If SS block is associated with PRACH preambles, the UE selects a PRACH preamble randomly from the PRACH preambles corresponding to the selected SS block. The UE may select the earliest available PRACH resource (or PRACH occasion) from configured PRACH resources (or PRACH occasions). In an embodiment, the UE may select randomly one PRACH resource (or PRACH occasion) from configured PRACH resources (or PRACH occasions). In case multiple frequency division multiplexed PRACH resources (or PRACH occasions) are available in time, the UE randomly selects with equal probability one PRACH resource (or PRACH occasion) from available multiple frequency division multiplexed PRACH resources (or PRACH occasions).

If SS block is associated with PRACH resources (or PRACH occasions), the UE may select the earliest available PRACH resource (or PRACH occasion) from the PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple frequency division multiplexed PRACH resources (or PRACH occasions) are available corresponding to the selected SS block, the UE randomly selects with equal probability one PRACH resource (or PRACH occasion) from available multiple frequency division multiplexed PRACH resources (or PRACH occasions). The UE randomly selects with equal probability a PRACH preamble from configured set of PRACH preambles.

If SS block is associated with PRACH preambles and PRACH resources, the UE selects a PRACH preamble randomly from the PRACH preambles corresponding to the selected SS block. The UE may select the earliest available PRACH resource (or PRACH occasion) from PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple frequency division multiplexed PRACH resources (or PRACH occasion) are available corresponding to the selected SS block, the UE randomly selects with equal probability one PRACH resource (or PRACH occasion) from available multiple frequency division multiplexed PRACH resources (or PRACH occasions).

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 603. If the UE successfully receives the RAR, there is no need to retransmit Msg1 at operation 604. If the UE is not able to receive the RAR, the UE determines whether the UE has performed maximum number of allowed Msg1 transmissions at operation 605. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE does not reselect the SS block. The UE uses the same SS block as selected for initial transmission. Suitable SS block is selected when random access procedure is initiated and the same SS block is used for PRACH preamble and/or PRACH resource (or PRACH occasion) selection and path loss estimation for all (re-)transmissions of Msg1 during a random access procedure. In case suitable SS block is not found, UE may reselect a suitable SS block during retransmission as explained later.

In the procedure explained above, it is possible that the UE is not able to find any suitable SS block. In this case the UE may perform one of the following:

The UE does not transmit Msg1. Additionally, the UE may trigger cell reselection for idle/inactive state and RLF (i.e., connection re-establishment) for connected state.

The UE selects SS block with highest signal quality among all the SS blocks or among the SS blocks for which measurements are available. In this case (i.e., when suitable SS block is not selected), during retransmission of Msg1 the UE may change SS block if SS block for previous transmission is still not suitable and another suitable SS block is found. In an embodiment, the UE may be allowed to transmit Msg1 without selecting a suitable SS block for 'N' number of times. Parameter N can be pre-defined or signaled by network.

The UE may delay Msg1 transmission until the UE founds suitable SS block. In one embodiment, the UE may delay Msg1 transmission for a maximum time period 'T'. The time period T can be configured by network in system information (e.g., together with PRACH configuration or in RMSI) or handover command or in dedicated RRC signaling. After expiry of this time if suitable SS block is still not found the UE may trigger cell reselection for idle/inactive state and RLF (i.e., connection re-establishment) for connected state. Alternately, after expiry of this time if suitable SS block is still not found, the UE may select SS block with highest signal quality among all the SS blocks or among the SS blocks for which measurements are available.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:

1. UE may select suitable (signal quality>SSBlockThreshold) SS block (or CSI-RS) when random access procedure is initiated. UE may use the selected SS block (or CSI-RS) for PRACH preamble and/or PRACH resource (or PRACH occasion) selection and path loss estimation for all (re-)transmissions of Msg1 during a random access procedure.

2. UE may select SS block (or CSI-RS) with highest signal quality if suitable SS block is not found.

3. UE may change the SS block (or CSI-RS) if suitable SS block (or CSI-RS) was not used for previous transmission and SS block (or CSI-RS) for previous transmission is still not suitable and another suitable SS block (or CSI-RS) is found.

4. UE may reselect the cell if suitable SS block (or CSI-RS) is not found.

5. UE may delay the Msg1 transmission until suitable SS block (or CSI-RS) is found.

6. UE may delay the Msg1 transmission for a defined time period if suitable SS block (or CSI-RS) is not found. UE may trigger cell reselection for idle/inactive state and RLF (i.e., connection re-establishment) for connected state if suitable SS block (or CSI-RS) is not found even after that time period.

Figure 7:
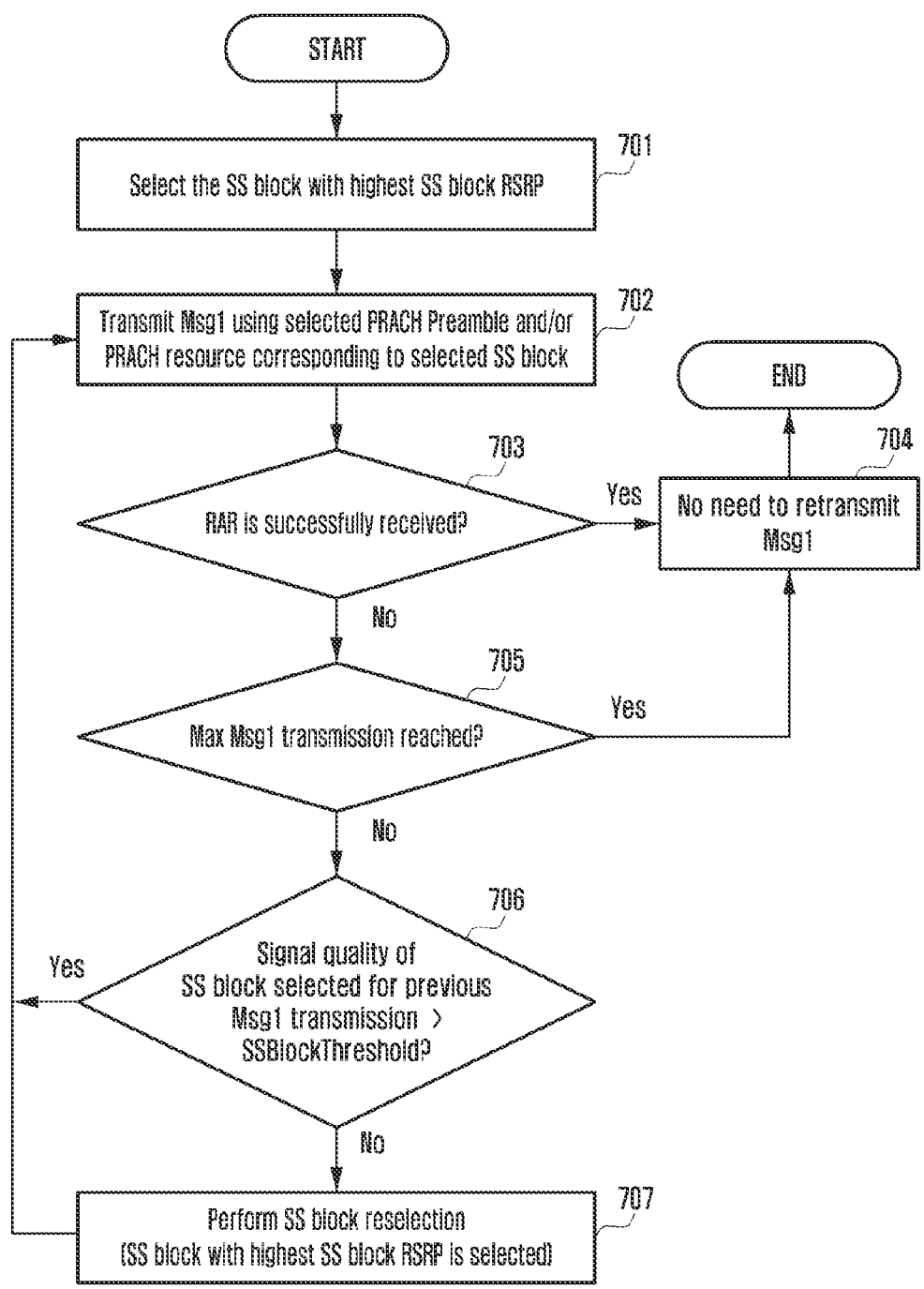
FIG. 7 illustrates a UE behavior for RACH transmission and re-transmission based on Method 3 according to an embodiment of the disclosure.

Method 3:

FIG. 7 illustrates the UE behavior for the RACH transmission and re-transmission based on Method 3 according to an embodiment of the disclosure.

Referring to FIG. 7, UE selects the SS block with highest signal quality for initial PRACH preamble transmission at operation 701. The signal quality is measured over the resources of SS block carrying PSS and/or SSS and/or DMRS for PBCH. The signal quality can be RSRP or RSRQ or RSSI. In an embodiment, the UE may select the SS block with highest signal quality amongst all SS blocks transmitted by gNB. In another embodiment, the UE may select the SS block with highest signal quality amongst all SS blocks for which measurements are available.

The UE then transmits a PRACH preamble (i.e., Msg1) by selecting a PRACH preamble and/or a PRACH resource (or PRACH occasion) corresponding to the selected SS block at operation 702.

If SS block is associated with PRACH preambles, the UE selects a PRACH preamble randomly from the PRACH preambles corresponding to the selected SS block. The UE may select the earliest available PRACH resource (or PRACH occasion) from configured PRACH resources (or PRACH occasions). In an embodiment, the UE may select randomly one PRACH resource (or PRACH occasion) from configured PRACH resources (or PRACH occasions). In case multiple frequency division multiplexed PRACH resources (or PRACH occasions) are available at the same time, the UE randomly selects with equal probability one PRACH resource (or PRACH occasion) from available multiple frequency division multiplexed PRACH resources (or PRACH occasions).

If SS block is associated with PRACH resources (or PRACH occasions), the UE may select the earliest available PRACH resource (or PRACH occasion) from PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple frequency division multiplexed PRACH resources (or PRACH occasions) are available in time corresponding to the selected SS block, the UE randomly selects with equal probability one PRACH resource (or PRACH occasion) from available multiple frequency division multiplexed PRACH resources (or PRACH occasions). The UE randomly selects with equal probability a PRACH preamble from configured set of PRACH preambles.

If SS block is associated with PRACH preambles and PRACH resources, the UE selects a PRACH preamble randomly from the PRACH preambles corresponding to the selected SS block. The UE may select the earliest available PRACH resource (or PRACH occasion) from PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple frequency division multiplexed PRACH resources (or PRACH occasion) are available corresponding to the selected SS block, the UE randomly selects with equal probability one PRACH resource (or PRACH occasion) from available multiple frequency division multiplexed PRACH resources (or PRACH occasions).

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 703. If the UE successfully receives the RAR, there is no need to retransmit Msg1 at operation 704. If the UE is not able to receive the RAR, the UE determines whether the UE has performed maximum number of allowed Msg1 transmissions at operation 705. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of SS block selected for previous Msg1 transmission is greater than or equal to a threshold 'SSBlockThreshold' at operation 706. If the signal quality of the SS block selected for the previous Msg1 transmission is greater than or equal to the threshold 'SSBlockThreshold' UE does not reselect the SS block. The threshold can be configured by network in system information (e.g., together with PRACH configuration or in RMSI) or handover command or in dedicated RRC signaling. The UE uses the same SS block as selected for the previous transmission for PRACH preamble and/or PRACH resource selection and path loss estimation for retransmission (i.e., next Msg1 transmission). During the retransmission, if the signal quality of the SS block selected for the previous Msg1 transmission is less than the threshold 'SSBlockThreshold', the UE may reselect SS block at operation 707. The UE may select the SS block with highest signal quality amongst all SS blocks transmitted by gNB. In another embodiment, the UE may select the SS block with highest signal quality amongst all SS blocks for which measurements are available.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:

UE may select SS block (or CSI-RS) with highest signal quality when random access procedure is initiated. UE reselects SS block (or CSI-RS) during retransmission if SS block (or CSI-RS) of previous transmission is below a threshold based on latest measurement wherein SS block (or CSI-RS) with highest signal quality is selected during retransmission. UE may use the selected SS block (or CSI-RS) for PRACH preamble and/or PRACH resource (or PRACH occasion) selection and path loss estimation for transmission of Msg1 during a random access procedure.

Figure 8:
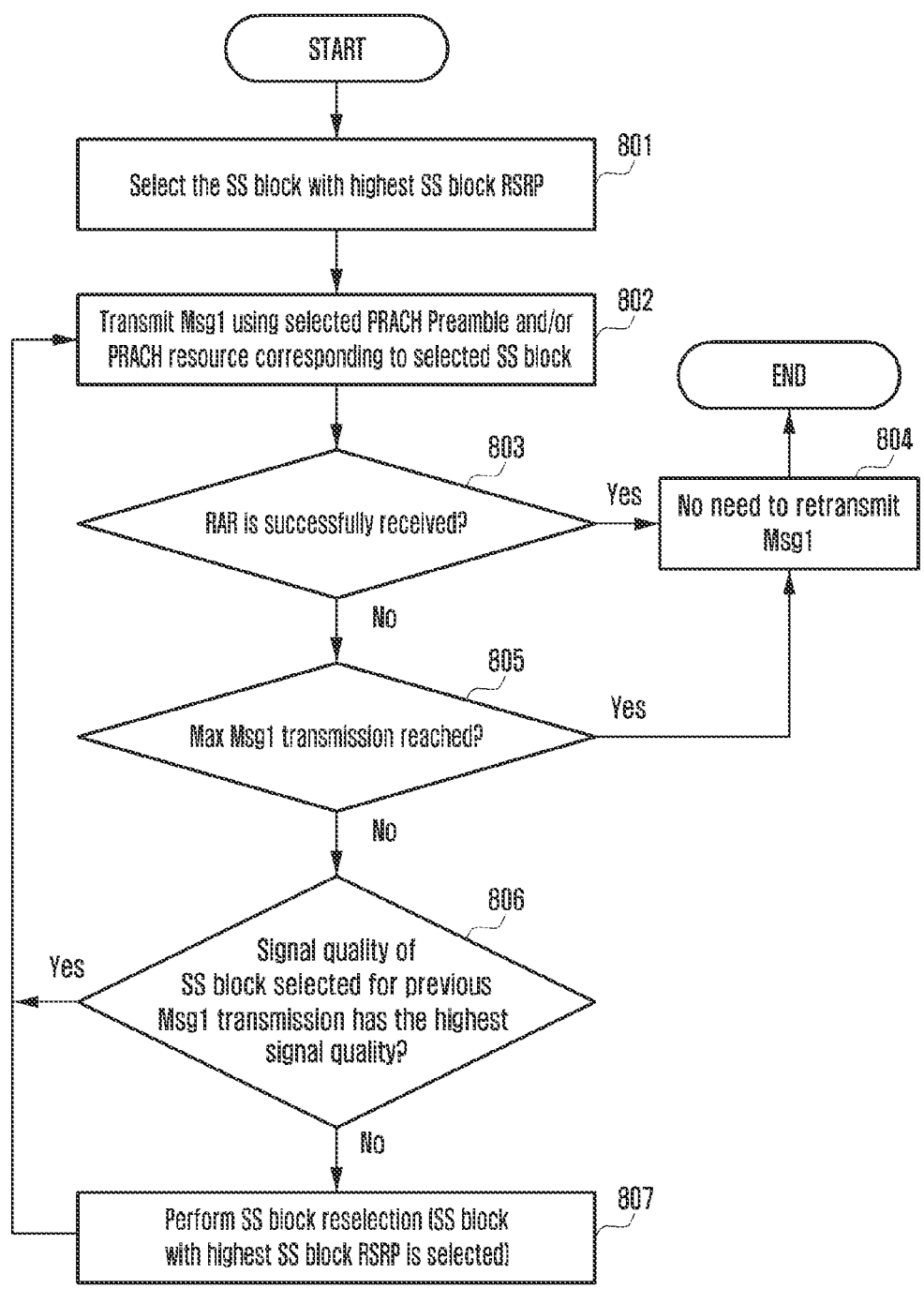
FIG. 8 illustrates a UE behavior for RACH transmission and re-transmission based on Method 4 according to an embodiment of the disclosure.

Method 4:

FIG. 8 illustrates the UE behavior for the RACH transmission and re-transmission based on Method 4 according to an embodiment of the disclosure.

Referring to FIG. 8, UE selects the SS block with highest signal quality for initial PRACH preamble transmission at operation 801. The signal quality is measured over the resources of SS block carrying PSS and/or SSS and/or DMRS for PBCH. The signal quality can be RSRP or RSRQ or RSSI. In an embodiment, the UE may select the SS block with highest signal quality amongst all SS blocks transmitted by gNB. In another embodiment, the UE may select the SS block with highest signal quality amongst all SS blocks for which measurements are available.

The UE then transmits a PRACH preamble (i.e., Msg1) by selecting a PRACH preamble and/or a PRACH resource (or PRACH occasion) corresponding to the selected SS block at operation 802.

If SS block is associated with PRACH preambles, the UE selects a PRACH preamble randomly from the PRACH preambles corresponding to the selected SS block. The UE may select the earliest available PRACH resource (or PRACH occasion) from configured PRACH resources (or PRACH occasions). In an embodiment, the UE may select randomly one PRACH resource (or PRACH occasion) from configured PRACH resources (or PRACH occasions). In case multiple frequency division multiplexed PRACH resources (or PRACH occasions) are available, the UE randomly selects with equal probability one PRACH resource (or PRACH occasion) from available multiple frequency division multiplexed PRACH resources (or PRACH occasions).

If SS block is associated with PRACH resources (or PRACH occasions), the UE may select the earliest available PRACH resource (or PRACH occasion) from PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple frequency division multiplexed PRACH resources (or PRACH occasions) are available in time corresponding to the selected SS block, the UE randomly selects with equal probability one PRACH resource (or PRACH occasion) from available multiple frequency division multiplexed PRACH resources (or PRACH occasions). The UE randomly selects with equal probability a PRACH preamble from configured set of PRACH preambles.

If SS block is associated with PRACH preambles and PRACH resources (or PRACH occasions), the UE selects a PRACH preamble randomly from the PRACH preambles corresponding to the selected SS block. The UE may select the earliest available PRACH resource (or PRACH occasion) from PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple frequency division multiplexed PRACH resources (or PRACH occasion) are available time corresponding to the selected SS block, the UE randomly selects with equal probability one PRACH resource (or PRACH occasion) from available multiple frequency division multiplexed PRACH resources (or PRACH occasions).

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 803. If the UE successfully receives the RAR, there is no need to retransmit Msg1 at operation 804. If the UE is not able to receive the RAR, the UE determines whether the UE has performed maximum number of allowed Msg1 transmissions at operation 805. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of SS block selected for previous Msg1 transmission has the highest signaling quality based on latest measurements at operation 806. If the signal quality of the SS block selected for the previous Msg1 transmission has the highest signaling quality, the UE does not reselect the SS block. The UE uses the same SS block as selected for the previous transmission for PRACH preamble and/or PRACH resource selection and path loss estimation for retransmission (i.e., next Msg1 transmission). During the retransmission, if the signal quality of the SS block selected for the previous Msg1 transmission does not have highest signaling quality, the UE may reselect SS block at operation 807. The UE may select the SS block with highest signal quality amongst all SS blocks transmitted by gNB. In another embodiment, the UE may select the SS block with highest signal quality amongst all SS blocks for which measurements are available.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Figure 9:
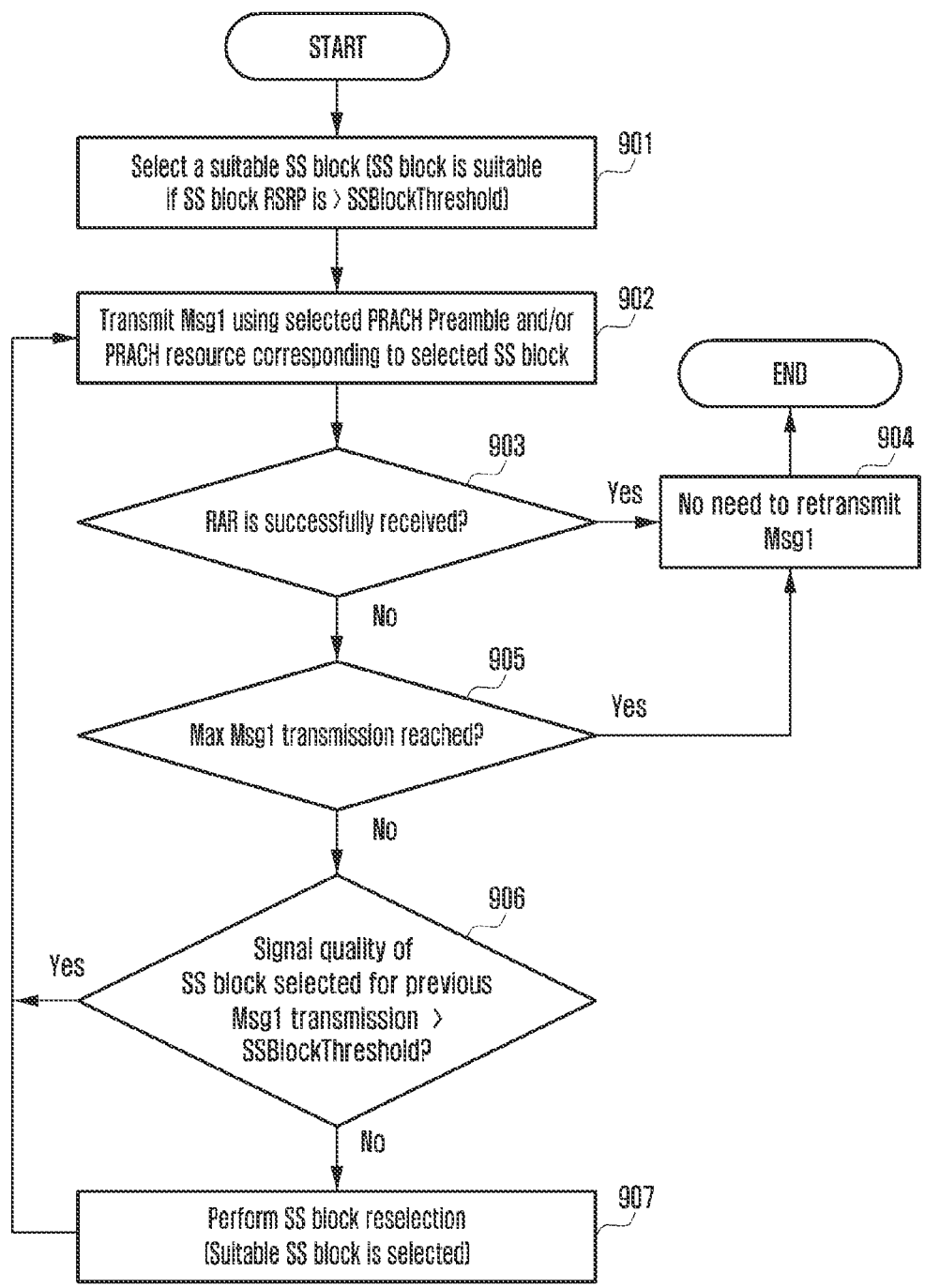
FIG. 9 illustrates a UE behavior for RACH transmission and re-transmission based on Method 5 according to an embodiment of the disclosure.

Key Point:

UE may select SS block (or CSI-RS) with highest signal quality when random access procedure is initiated. UE reselects SS block (or CSI-RS) during retransmission if SS block (or CSI-RS) of previous transmission does not have highest signal quality based on latest measurement wherein SS block (or CSI-RS) with highest signal quality is selected during retransmission. UE may use the selected SS block (or CSI-RS) for PRACH preamble and/or PRACH resource (or PRACH occasion) selection and path loss estimation for transmission of Msg1 during a random access procedure. Method 5:

FIG. 9 illustrates the UE behavior for the RACH transmission and re-transmission based on Method 5 according to an embodiment of the disclosure.

Referring to FIG. 9, UE selects a suitable SS block for initial PRACH preamble transmission at operation 901. A SS block is suitable if signal quality of SS block is greater than the threshold 'SSBlockThreshold'. In an embodiment, a SS block is suitable if signal quality of SS block is greater than or equal to a threshold 'SSBlockThreshold'. The SSBlockThreshold can be configured by network in system information (e.g., together with PRACH configuration or in RMSI) or handover command or in dedicated RRC signaling. The signal quality is measured over the resources of SS block carrying PSS and/or SSS and/or DMRS for PBCH. The signal quality can be RSRP or RSRQ or RSSI. In case multiple SS blocks are suitable, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

The UE then transmits a PRACH preamble (i.e., Msg1) by selecting a PRACH preamble and/or a PRACH resource (or PRACH occasion) corresponding to the selected SS block at operation 902.

If SS block is associated with PRACH preambles, the UE selects a PRACH preamble randomly from the PRACH preambles corresponding to the selected SS block. The UE may select the earliest available PRACH resource (or PRACH occasion) from configured PRACH resources (or PRACH occasions). In an embodiment, the UE may select randomly one PRACH resource (or PRACH occasion) from configured PRACH resources (or PRACH occasions). In case multiple frequency division multiplexed PRACH resources (or PRACH occasions) are available, the UE randomly selects with equal probability one PRACH resource (or PRACH occasion) from available multiple frequency division multiplexed PRACH resources (or PRACH occasions).

If SS block is associated with PRACH resources (or PRACH occasions), the UE may select the earliest available PRACH resource (or PRACH occasion) from PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple frequency division multiplexed PRACH resources (or PRACH occasions) are available in time corresponding to the selected SS block, the UE randomly selects with equal probability one PRACH resource (or PRACH occasion) from available frequency division multiplexed PRACH resources (or PRACH occasions). The UE randomly selects with equal probability a PRACH preamble from configured set of PRACH preambles.

If SS block is associated with PRACH preambles and PRACH resources (or PRACH occasions), the UE selects a PRACH preamble randomly from the PRACH preambles corresponding to the selected SS block. The UE may select the earliest available PRACH resource (or PRACH occasion) from PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple frequency division multiplexed PRACH resources (or PRACH occasion) are available in time corresponding to the selected SS block, the UE randomly selects with equal probability one PRACH resource (or PRACH occasion) from available frequency division multiplexed PRACH resources (or PRACH occasions).

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 903. If the UE successfully receives the RAR, there is no need to retransmit Msg1 at operation 904. If UE is not able to receive the RAR, the UE determines whether the UE has performed maximum number of allowed Msg1 transmissions at operation 905. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of SS block selected for previous Msg1 transmission is greater than or equal to a threshold 'SSBlockThreshold' at operation 906. If the signal quality of the SS block selected for the previous Msg1 transmission is greater than or equal to the threshold 'SSBlockThreshold' the UE does not reselect the SS block. The threshold can be configured by network in system information (e.g., together with PRACH configuration or in RMSI) or handover command or in dedicated RRC signaling. The UE uses the same SS block as selected for the previous transmission for PRACH preamble and/or PRACH resource selection and path loss estimation for retransmission (i.e., next Msg1 transmission). During the retransmission, if the signal quality of the SS block selected for the previous Msg1 transmission is less than the threshold 'SSBlockThreshold', the UE may reselect SS block at operation 907. The UE may select a suitable SS block in same manner as the UE selected SS block for initial Msg1 transmission. In an alternate embodiment, during retransmission UE may select the SS block in same manner as initial transmission.

In the procedure explained above, it is possible that the UE is not able to find any suitable SS block. In this case the UE may perform one of the following:

The UE does not transmit Msg1. Additionally, the UE may trigger cell reselection for idle/inactive state and RLF (i.e., connection re-establishment) for connected state.

The UE selects SS block with highest signal quality among all the SS blocks or among the SS blocks for which measurements are available. In this case (i.e., when suitable SS block is not selected), during retransmission of Msg1 the UE may change SS block if SS block for previous transmission is still not suitable and another suitable SS block is found. In an embodiment, the UE may be allowed to transmit Msg1 without selecting a suitable SS block for 'N' number of times. Parameter N can be pre-defined or signaled by network.

The UE may delay Msg1 transmission until the UE founds suitable SS block. In one embodiment, the UE may delay Msg1 transmission for a maximum time period 'T'. The time period T can be configured by network in system information (e.g., together with PRACH configuration or in RMSI) or handover command or in dedicated RRC signaling. After expiry of this time if suitable SS block is still not found the UE may trigger cell reselection for idle/inactive state and RLF (i.e., connection re-establishment) for connected state. Alternately, after expiry of this time if suitable SS block is still not found, the UE may select SS block with highest signal quality among all the SS blocks or among the SS blocks for which measurements are available.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:
1. UE may select suitable SS block (or CSI-RS) when random access procedure is initiated. UE reselects SS block (or CSI-RS) during retransmission if SS block (or CSI-RS) of previous transmission is below a threshold based on latest measurement wherein suitable SS block (or CSI-RS) is selected during retransmission. UE may use the selected SS block (or CSI-RS) for PRACH preamble and/or PRACH resource (or PRACH occasion) selection and path loss estimation for transmission of Msg1 during a random access procedure.
2. UE may select SS block (or CSI-RS) with highest signal quality if suitable SS block is not found.
3. UE may change the SS block (or CSI-RS) if suitable SS block (or CSI-RS) was not used for previous transmission and SS block (or CSI-RS) for previous transmission is still not suitable and another suitable SS block (or CSI-RS) is found.
4. UE may reselect the cell if suitable SS block (or CSI-RS) is not found.
5. UE may delay the Msg1 transmission until suitable SS block (or CSI-RS) is found.
6. UE may delay the Msg1 transmission for a defined time period if suitable SS block (or CSI-RS) is not found. UE may trigger cell reselection for idle/inactive state and RLF (i.e., connection re-establishment) for connected state if suitable SS block (or CSI-RS) is not found even after that time period.

Figure 10:
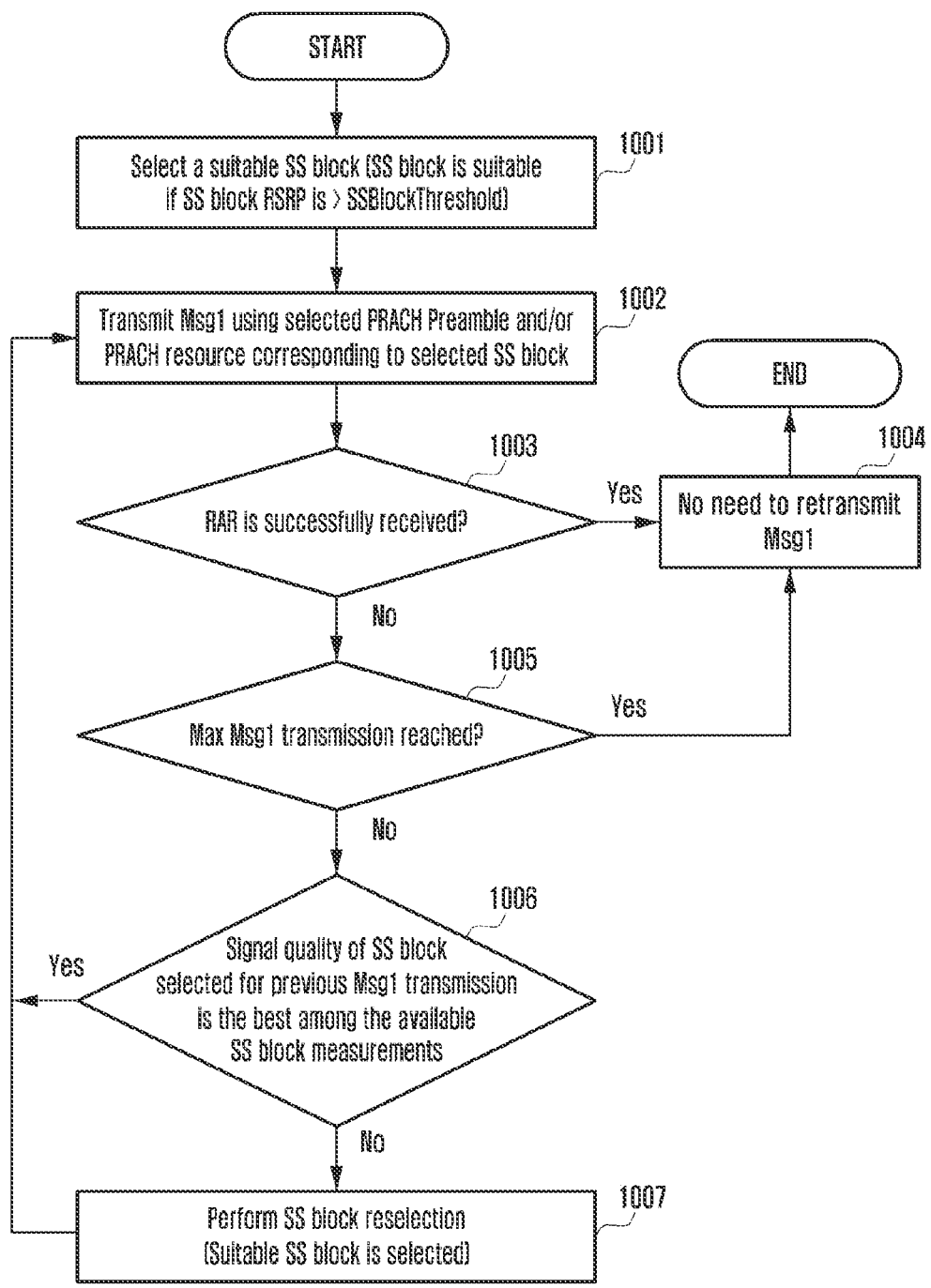
FIG. 10 illustrates a UE behavior for RACH transmission and re-transmission based on Method 6 according to an embodiment of the disclosure.

Method 6:

FIG. 10 illustrates the UE behavior for the RACH transmission and re-transmission based on Method 6 according to an embodiment of the disclosure.

Referring to FIG. 10, UE selects a suitable SS block for initial PRACH preamble transmission at operation 1001. A SS block is suitable if signal quality of SS block is greater than the threshold 'SSBlockThreshold'. In an embodiment, a SS block is suitable if signal quality of SS block is greater than or equal to a threshold 'SSBlockThreshold'. The SSBlockThreshold can be configured by network in system information (e.g., together with PRACH configuration or in RMSI) or handover command or in dedicated RRC signaling. The signal quality is measured over the resources of SS block carrying PSS and/or SSS and/or DMRS for PBCH. The signal quality can be RSRP or RSRQ or RSSI. In case multiple SS blocks are suitable, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

The UE then transmits a PRACH preamble (i.e., Msg1) by selecting a PRACH preamble and/or a PRACH resource (or PRACH occasion) corresponding to the selected SS block at operation 1002.

If SS block is associated with PRACH preambles, the UE selects a PRACH preamble randomly from the PRACH preambles corresponding to the selected SS block. The UE may select the earliest available PRACH resource (or PRACH occasion) from configured PRACH resources (or PRACH occasions). In an embodiment, the UE may select randomly one PRACH resource (or PRACH occasion) from configured PRACH resources (or PRACH occasions). In case multiple PRACH resources (or PRACH occasions) are available in time, the UE randomly selects with equal probability one PRACH resource (or PRACH occasion) from available PRACH resources (or PRACH occasions).

If SS block is associated with PRACH resources (or PRACH occasions), the UE may select the earliest available PRACH resource (or PRACH occasion) from PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple PRACH resources (or PRACH occasions) are available in time corresponding to the selected SS block, the UE randomly selects with equal probability one PRACH resource (or PRACH occasion) from available PRACH resources (or PRACH occasions). The UE randomly selects with equal probability a PRACH preamble from configured set of PRACH preambles.

If SS block is associated with PRACH preambles and PRACH resources (PRACH occasions), the UE selects a PRACH preamble randomly from the PRACH preambles corresponding to the selected SS block. The UE may select the earliest available PRACH resource (or PRACH occasion) from PRACH resources (or PRACH occasions) corresponding to the selected SS block. In an embodiment, the UE may select randomly one PRACH resource (or PRACH occasion) from configured PRACH resources (or PRACH occasions) corresponding to the selected SS block. In case multiple PRACH resources (or PRACH occasion) are available in time corresponding to the selected SS block, the UE randomly selects with equal probability one PRACH resource (or PRACH occasion) from available PRACH resources (or PRACH occasions).

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 1003. If the UE successfully receives the RAR, there is no need to retransmit Msg1 at operation 1004. If the UE is not able to receive the RAR, the UE determines whether the UE has performed maximum number of allowed Msg1 transmissions at operation 1005. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of SS block selected for the previous Msg1 transmission has the best signal quality amongst the available or all SS blocks measurement at operation 1006. If the signal quality of the SS block selected for the previous Msg1 transmission has the best signal quality amongst the available or all SS blocks measurement, the UE does not reselect the SS block. Otherwise the UE may reselect a suitable SS block in same manner as the UE selected SS block for initial Msg1 transmission at operation 1007. In alternate embodiment, during the retransmission, if the signal quality of the SS block selected for the previous Msg1 transmission is not above 'SSBlockThreshold' and does not have the best signal quality amongst the available or all SS blocks measurements, the UE may reselect the SS block in same manner as the UE selected SS block for initial Msg1 transmission. Otherwise the UE does not reselect the SS block. The threshold can be configured by network in system information (e.g., together with PRACH configuration or in RMSI) or handover command or in dedicated RRC signaling.

In the procedure explained above, it is possible that the UE is not able to find any suitable SS block. In this case the UE may perform one of the following:

The UE does not transmit Msg1. Additionally, the UE may trigger cell reselection for idle/inactive state and RLF (i.e., connection re-establishment) for connected state.

The UE selects SS block with highest signal quality among all the SS blocks or among the SS blocks for which measurements are available. In this case (i.e., when suitable SS block is not selected), during retransmission of Msg1 the UE may change SS block if SS block for previous transmission is still not suitable and another suitable SS block is found. In an embodiment, the UE may be allowed to transmit Msg1 without selecting a suitable SS block for 'N' number of times. Parameter N can be pre-defined or signaled by network.

The UE may delay Msg1 transmission until the UE founds suitable SS block. In one embodiment, the UE may delay Msg1 transmission for a maximum time period 'T'. The time period T can be configured by network in system information (e.g., together with PRACH configuration or in RMSI) or handover command or in dedicated RRC signaling. After expiry of this time if suitable SS block is still not found the UE may trigger cell reselection for idle/inactive state and RLF (i.e., connection re-establishment) for connected state. Alternately, after expiry of this time if suitable SS block is still not found, the UE may select SS block with highest signal quality among all the SS blocks or among the SS blocks for which measurements are available.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:

1. UE may select suitable SS block (or CSI-RS) when random access procedure is initiated. UE reselects SS block (or CSI-RS) during retransmission if SS block (or CSI-RS) of previous transmission is not the best among the available SS block (or CSI-RS) measurements. UE may use the selected SS block (or CSI-RS) for PRACH preamble and/or PRACH resource (or PRACH occasion) selection and path loss estimation for transmission of Msg1 during a random access procedure.

2. UE may select suitable SS block (or CSI-RS) when random access procedure is initiated. UE reselects SS block (or CSI-RS) during retransmission if signal quality of SS block selected for previous Msg1 transmission is not above 'SSBlockThreshold' and does not have the best signal quality amongst the available or all SS blocks measurements. UE may use the selected SS block (or CSI-RS) for PRACH preamble and/or PRACH resource (or PRACH occasion) selection and path loss estimation for transmission of Msg1 during a random access procedure.

3. UE may select SS block (or CSI-RS) with highest signal quality if suitable SS block is not found.

4. UE may change the SS block (or CSI-RS) if suitable SS block (or CSI-RS) was not used for previous transmission and SS block (or CSI-RS) for previous transmission is still not suitable and another suitable SS block (or CSI-RS) is found.

5. UE may reselect the cell if suitable SS block (or CSI-RS) is not found.

6. UE may delay the Msg1 transmission until suitable SS block (or CSI-RS) is found.

7. UE may delay the Msg1 transmission for a defined time period if suitable SS block (or CSI-RS) is not found. UE may trigger cell reselection (for idle/inactive state and RLF (i.e., connection re-establishment) for connected state if suitable SS block (or CSI-RS) is not found even after that time period.

Figure 11:
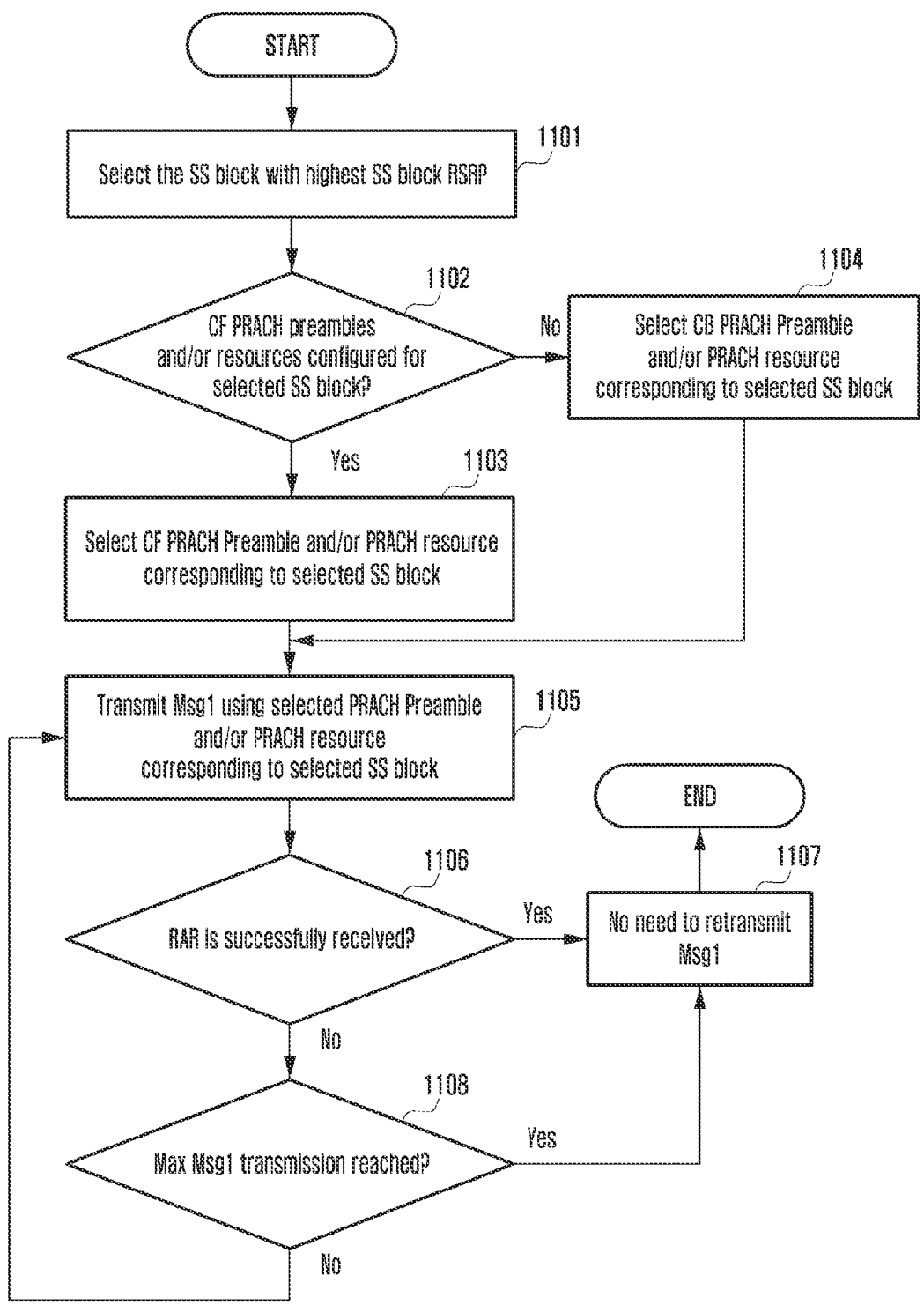
FIG. 11 illustrates a UE behavior for RACH transmission and re-transmission based on Method 7 according to an embodiment of the disclosure.

Method 7:

FIG. 11 illustrates the UE behavior for the RACH transmission and re-transmission based on Method 7 according to an embodiment of the disclosure.

Referring to FIG. 11, UE selects the SS block with highest signal quality for initial PRACH preamble transmission at operation 1101. The signal quality is measured over the resources of SS block carrying PSS and/or SSS and/or DMRS for PBCH. The signal quality can be RSRP or RSRQ or RSSI. In an embodiment, the UE may select the SS block with highest signal quality amongst all SS blocks transmitted by gNB. In another embodiment, the UE may select the SS block with highest signal quality amongst all SS blocks for which measurements are available.

The UE then selects a PRACH preamble and/or a PRACH resource (or PRACH occasion) corresponding to the selected SS block to transmit a PRACH preamble (i.e., Msg1). The UE determines whether contention free PRACH preambles and/or resources are configured for the selected SS block at operation 1102. If the UE is configured with a contention free (i.e., dedicated) PRACH preamble and/or PRACH resource corresponding to the selected SS block, the UE selects a dedicated PRACH preamble and/or PRACH resource corresponding to the selected block at operation 1103. Otherwise, the UE selects PRACH preamble and/or PRACH resource corresponding to the selected SS block from contention based subset of PRACH preambles and/or PRACH resources corresponding to the selected SS block at operation 1104.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

The UE transmits Msg1 using the selected PRACH preamble and/or PRACH resource corresponding to the selected SS block at operation 1105.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 1106. If the UE successfully receives the RAR, there is no need to retransmit Msg1 at operation 1107. If the UE is not able to receive the RAR, the UE determines whether the UE has performed maximum number of allowed Msg1 transmissions at operation 1108. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE does not reselect the SS block. The UE uses the same SS block as selected for initial transmission. SS block is selected when random access procedure is initiated and the same SS block is used for PRACH preamble and/or PRACH resource (or PRACH occasion) selection and path loss estimation for all (re-)transmissions of Msg1 during a random access procedure. In an alternate embodiment, during retransmission UE may select the SS block in same manner as initial transmission.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:

UE may select SS block (or CSI-RS) with highest signal quality. Same SS block (or CSI-RS) is used for Msg1 (re-)transmission during a random access procedure. UE may select PRACH preamble and/or PRACH resource corresponding to the selected SS block (or CSI-RS) from CF resources (if configured); otherwise UE may select PRACH preamble and/or PRACH resource corresponding to the selected SS block from CB resources.

Figure 12:
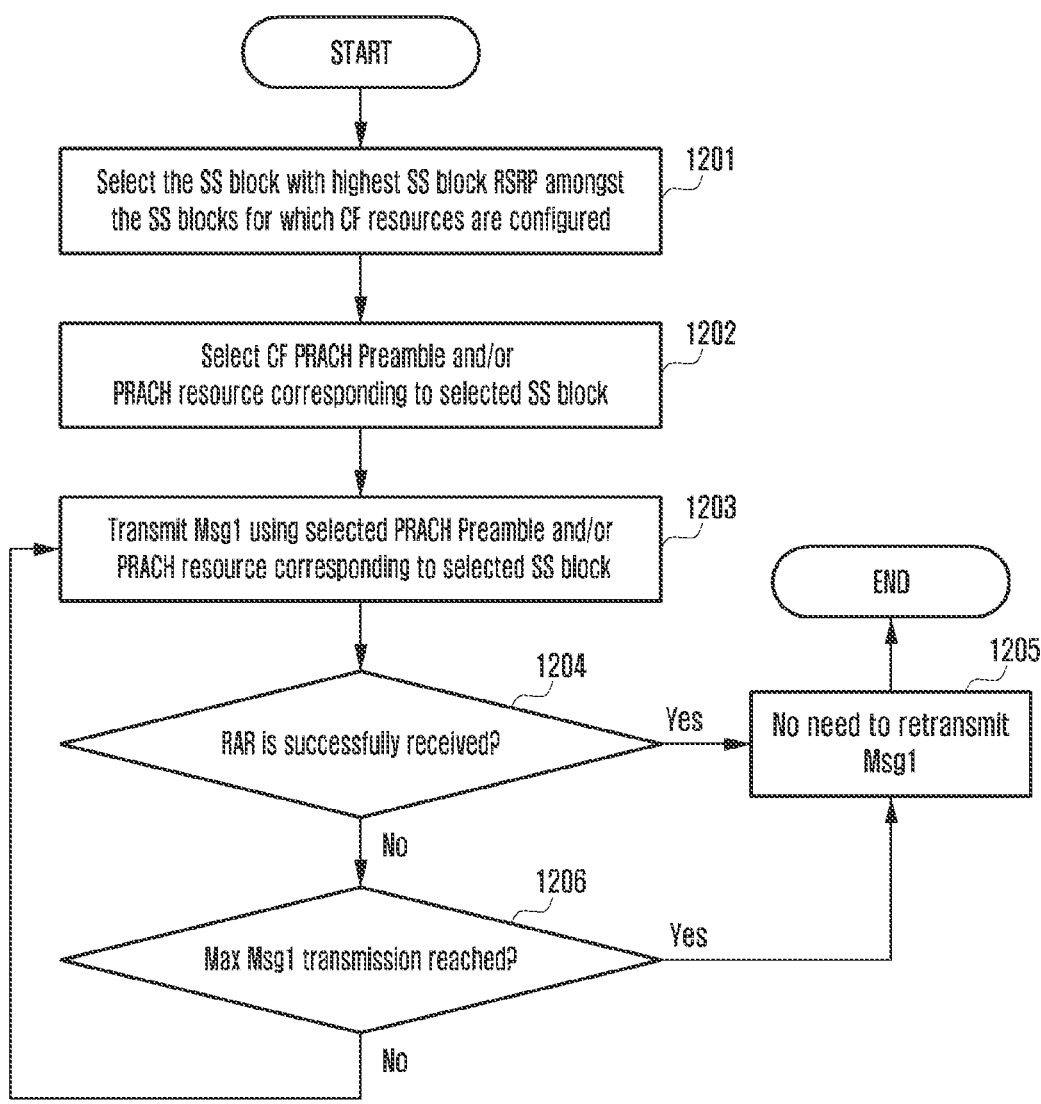
FIG. 12 illustrates a UE behavior for RACH transmission and re-transmission based on Method 8 according to an embodiment of the disclosure.

Method 8:

FIG. 12 illustrates the UE behavior for the RACH transmission and re-transmission based on Method 8 according to an embodiment of the disclosure.

Referring to FIG. 12, UE selects the SS block with highest signal quality for initial PRACH preamble transmission at operation 1201. The signal quality is measured over the resources of SS block carrying PSS and/or SSS and/or DMRS for PBCH. The signal quality can be RSRP or RSRQ or RSSI. In this method, the UE may select the SS block with highest signal quality amongst the SS blocks for which contention free preamble and/or resources are configured to UE by gNB.

The UE then selects a PRACH preamble and/or a PRACH resource (or PRACH occasion) corresponding to the selected SS block at operation 1202, and the UE transmits Msg1 using the selected PRACH preamble and/or PRACH resource corresponding to the selected SS block at operation 1203.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 1204. If the UE successfully receives the RAR, there is no need to retransmit Msg1 at operation 1205. If the UE is not able to receive the RAR, the UE determines whether the UE has performed maximum number of allowed Msg1 transmissions at operation 1206. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE does not reselect the SS block. The UE uses the same SS block as selected for initial transmission. SS block is selected when random access procedure is initiated and the same SS block is used for PRACH preamble and/or PRACH resource (or PRACH occasion) selection and path loss estimation for all (re-)transmissions of Msg1 during a random access procedure. In an alternate embodiment, during retransmission UE may select the SS block in same manner as initial transmission.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:

UE may select SS block (or CSI-RS) with highest signal quality amongst the SS blocks (or CSI-RS s) for which contention free preamble and/or resource is provided to UE. Same SS block (or CSI-RS) is used for Msg1 (re-) transmission during a random access procedure. UE may select at least one of PRACH preamble and/or PRACH resource corresponding to the selected SS block (or CSI-RS) from CF resources.

Figure 13:
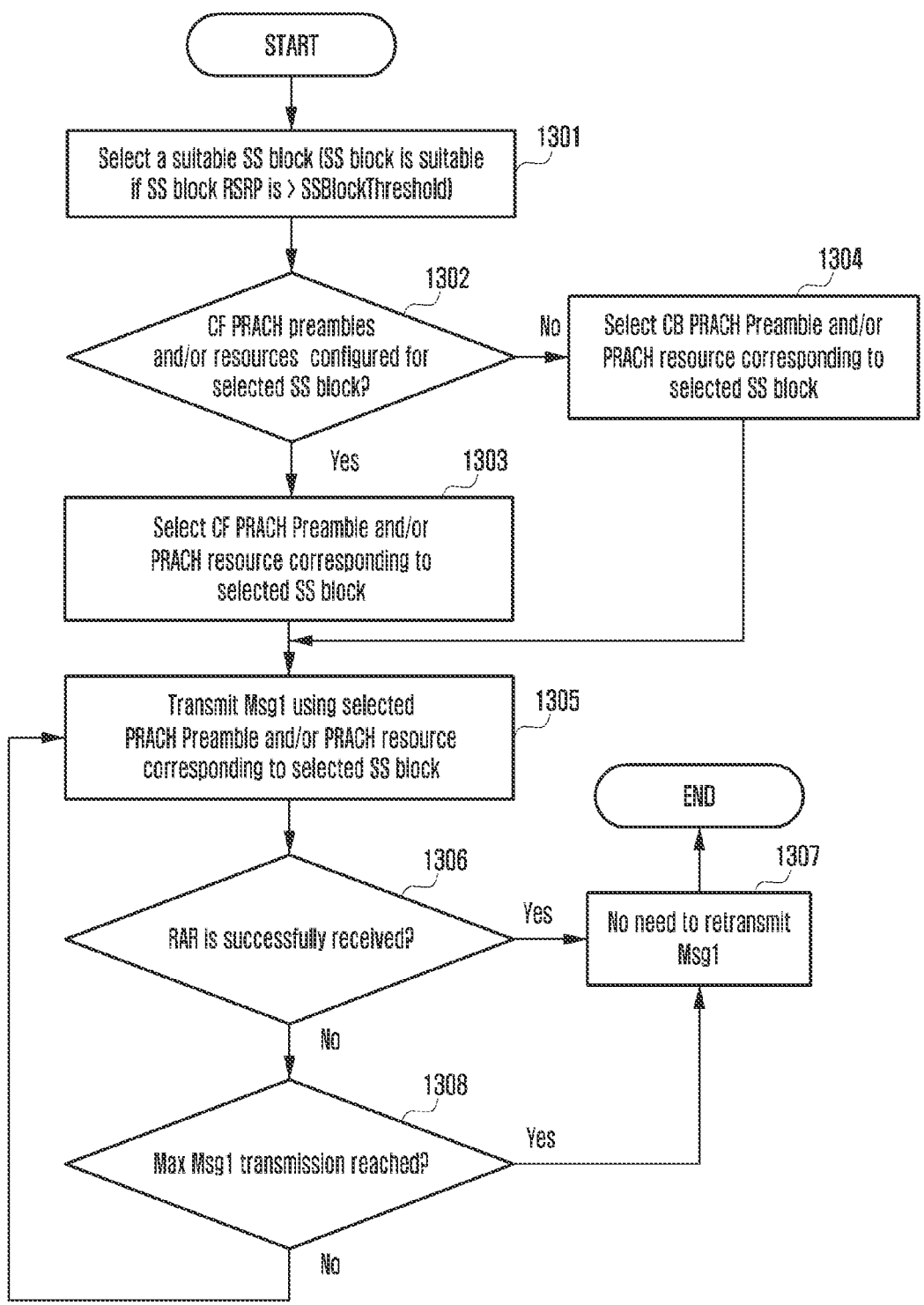
FIG. 13 illustrates a UE behavior for RACH transmission and re-transmission based on Method 9 according to an embodiment of the disclosure.

Method 9:

FIG. 13 illustrates the UE behavior for the RACH transmission and re-transmission based on Method 9 according to an embodiment of the disclosure.

Referring to FIG. 13, UE selects a suitable SS block for initial PRACH preamble transmission at operation 1301. A SS block is suitable if signal quality of SS block is greater than the threshold 'SSBlockThreshold'. In an embodiment, a SS block is suitable if signal quality of SS block is greater than or equal to a threshold 'SSBlockThreshold'. The SSBlockThreshold can be configured by network in system information (e.g., together with PRACH configuration or in RMSI) or handover command or in dedicated RRC signaling. The signal quality is measured over the resources of SS block carrying PSS and/or SSS and/or DMRS for PBCH. The signal quality can be RSRP or RSRQ or RSSI. In case multiple SS blocks are suitable, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

The UE then selects a PRACH preamble and/or a PRACH resource (or PRACH occasion) corresponding to the selected SS block to transmit a PRACH preamble (i.e., Msg1). The UE determines whether contention free PRACH preambles and/or resources are configured for the selected SS block at operation 1302. If the UE is configured with contention free (i.e., dedicated) PRACH preamble and/or PRACH resource corresponding to the selected SS block, the UE selects dedicated PRACH preamble and/or PRACH resource corresponding to the selected block at operation 1303. Otherwise, the UE selects PRACH preamble and/or PRACH resource corresponding to the selected SS block from contention based subset of PRACH preambles and/or PRACH resources corresponding to the selected SS block at operation 1304.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

The UE transmits Msg1 using the selected PRACH preamble and/or PRACH resource corresponding to the selected SS block at operation 1305.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 1306. If the UE successfully receives the RAR, there is no need to retransmit Msg1 at operation 1307. If the UE is not able to receive the RAR, the UE determines whether the UE has performed maximum number of allowed Msg1 transmissions at operation 1308. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE does not reselect the SS block. The UE uses the same SS block as selected for initial transmission. Suitable SS block is selected when random access procedure is initiated and the same SS block is used for PRACH preamble and/or PRACH resource (or PRACH occasion) selection and path loss estimation for all (re-)transmissions of Msg1 during a random access procedure. In case suitable SS block is not found, the UE may reselect a suitable SS block during retransmission as explained later.

In the procedure explained above, it is possible that the UE is not able to find any suitable SS block. In this case the UE may perform one of the following:

The UE does not transmit Msg1. Additionally, the UE may trigger cell reselection for idle/inactive state and RLF (i.e., connection re-establishment) for connected state.

The UE selects SS block with highest signal quality among all the SS blocks or among the SS blocks for which measurements are available. In this case (i.e., when suitable SS block is not selected), during retransmission of Msg1 the UE may change SS block if SS block for previous transmission is still not suitable and another suitable SS block is found. In an embodiment, the UE may be allowed to transmit Msg1 without selecting a suitable SS block for 'N' number of times. Parameter N can be pre-defined or signaled by network.

The UE may delay Msg1 transmission until the UE founds suitable SS block. In one embodiment, the UE may delay Msg1 transmission for a maximum time period 'T'. The time period T can be configured by network in system information (e.g., together with PRACH configuration or in RMSI) or handover command or in dedicated RRC signaling. After expiry of this time if suitable SS block is still not found the UE may trigger cell reselection for idle/inactive state and RLF (i.e., connection re-establishment) for connected state. Alternately, after expiry of this time if suitable SS block is still not found, the UE may select SS block with highest signal quality among all the SS blocks or among the SS blocks for which measurements are available. In an alternate embodiment, during retransmission UE may select the SS block in same manner as initial transmission.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:
1. UE may select suitable (signal quality>'SSBlockThreshold') SS block (or CSI-RS) when random access procedure is initiated. UE may use the selected SS block (or CSI-RS) for PRACH preamble and/or PRACH resource (or PRACH occasion) selection and path loss estimation for all (re-)transmissions of Msg1 during a random access procedure. Contention free PRACH preamble and/or PRACH resource for the selected SS block is selected if available. Otherwise contention based PRACH preamble and/or PRACH resource for the selected SS block is selected.
2. UE may select SS block (or CSI-RS) with highest signal quality if suitable SS block is not found.
3. UE may change the SS block (or CSI-RS) if suitable SS block (or CSI-RS) was not used for previous transmission and SS block (or CSI-RS) for previous transmission is still not suitable and another suitable SS block (or CSI-RS) is found.
4. UE may reselect the cell if suitable SS block (or CSI-RS) is not found.
5. UE may delay the Msg1 transmission until suitable SS block (or CSI-RS) is found.
6. UE may delay the Msg1 transmission for a defined time period if suitable SS block (or CSI-RS) is not found. UE may trigger cell reselection for idle/inactive state and RLF (i.e., connection re-establishment) for connected state if suitable SS block (or CSI-RS) is not found even after that time period.

Figure 14:
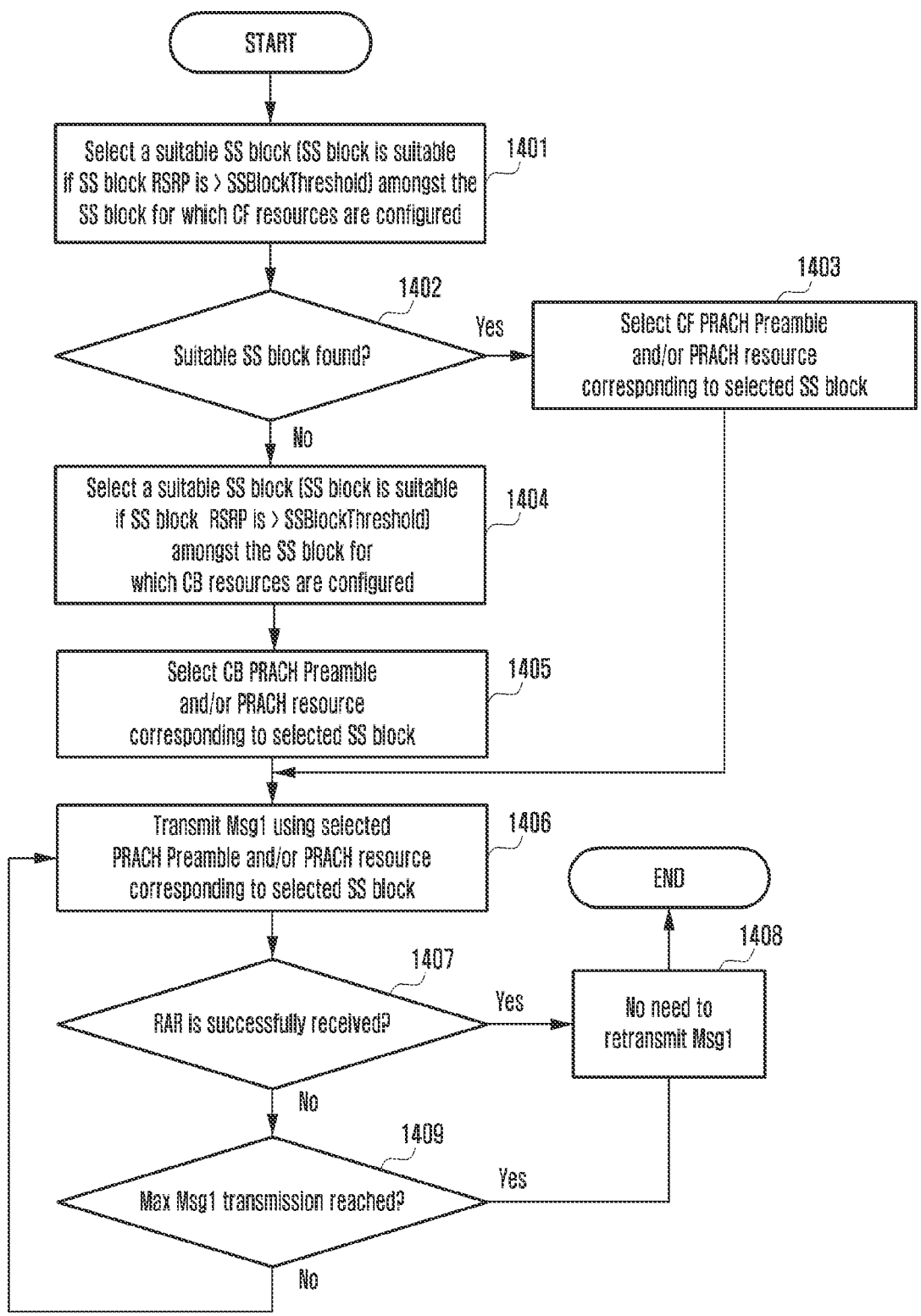
FIG. 14 illustrates a UE behavior for RACH transmission and re-transmission based on Method 10 according to an embodiment of the disclosure.

Method 10:

FIG. 14 illustrates the UE behavior for the RACH transmission and re-transmission based on Method 10 according to an embodiment of the disclosure.

Referring to FIG. 14, UE selects a suitable SS block for initial PRACH preamble transmission at operation 1401. A SS block is suitable if signal quality of SS block is greater than the threshold 'SSBlockThreshold'. In an embodiment, a SS block is suitable if signal quality of SS block is greater than or equal to a threshold 'SSBlockThreshold'. The SSBlockThreshold can be configured by network in system information (e.g., together with PRACH configuration or in RMSI) or handover command or in dedicated RRC signaling. The signal quality is measured over the resources of SS block carrying PSS and/or SSS and/or DMRS for PBCH. The signal quality can be RSRP or RSRQ or RSSI.

In this method the UE first check if there is a suitable SS block amongst the SS blocks for which dedicated PRACH preambles and/or PRACH resources are configured at operation 1402. If a suitable SS block for which dedicated PRACH preambles and/or PRACH resources are configured is found, the UE selects that SS block and selects a dedicated PRACH preamble and/or PRACH resource corresponding to the selected SS block at operation 1403. In case multiple SS blocks are suitable for which a dedicated preamble and/or resource is configured, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

If a suitable SS block is not found, amongst the SS blocks for which dedicated PRACH preambles and/or PRACH resources are configured, the UE selects a suitable block amongst the SS blocks for which contention based preambles and/or resources are configured at operation 1404, and the UE selects a contention based PRACH preamble and/or PRACH resource corresponding to the selected SS block at operation 1405. In case multiple SS blocks are suitable for which a contention based preamble and/or resource is configured, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

The UE then transmits a PRACH preamble (i.e., Msg1) using the selected PRACH preamble and/or PRACH resource corresponding to the selected SS block at operation 1406.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 1407. If the UE successfully receives the RAR, there is no need to retransmit Msg1 at operation 1408. If the UE is not able to receive the RAR, the UE determines whether the UE has performed maximum number of allowed Msg1 transmissions at operation 1409. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE does not reselect the SS block. The UE uses the same SS block as selected for initial transmission. Suitable SS block is selected when random access procedure is initiated and the same SS block is used for PRACH preamble and/or PRACH resource (or PRACH occasion) selection and path loss estimation for all (re-)transmissions of Msg1 during a random access procedure. In case suitable SS block is not found, the UE may reselect a suitable SS block during retransmission as explained later. In an alternate embodiment, during retransmission UE may select the SS block in same manner as initial transmission.

In the procedure explained above, it is possible that the UE is not able to find any suitable SS block while selecting SS block corresponding to contention based preambles and/or resources. In this case the UE may perform one of the following:

The UE does not transmit Msg1. Additionally, the UE may trigger cell reselection for idle/inactive state and RLF (i.e., connection re-establishment) for connected state.

The UE selects SS block with highest signal quality among all the SS blocks or among the SS blocks for which measurements are available. In this case (i.e., when suitable SS block is not selected), during retransmission of Msg1 the UE may change SS block if SS block for previous transmission is still not suitable and another suitable SS block is found. In an embodiment, the UE may be allowed to transmit Msg1 without selecting a suitable SS block for 'N' number of times. Parameter N can be pre-defined or signaled by network.

The UE may delay Msg1 transmission until the UE founds suitable SS block. In one embodiment, the UE may delay Msg1 transmission for a maximum time period 'T'. The time period T can be configured by network in system information (e.g., together with PRACH configuration or in RMSI) or handover command or in dedicated RRC signaling. After expiry of this time if suitable SS block is still not found the UE may trigger cell reselection for idle/inactive state and RLF (i.e., connection re-establishment) for connected state. Alternately, after expiry of this time if suitable SS block is still not found, the UE may select SS block with highest signal quality among all the SS blocks or among the SS blocks for which measurements are available.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:
1. UE may select suitable SS block (or CSI-RS) from SS blocks (or CSI-RSs) for which CF resources are configured. If no suitable SS block (or CSI-RS) is found from SS blocks (or CSI-RSs) for which CF resources are configured, UE may select suitable SS block (or CSI-RS) from SS blocks (or CSI-RSs) for which CB resources are configured. UE may use the selected SS block (or CSI-RS) for PRACH preamble and/or PRACH resource (or PRACH occasion) selection and path loss estimation for all (re-)transmissions of Msg1 during a random access procedure.

2. UE may select SS block (or CSI-RS) with highest signal quality if suitable SS block is not found.

3. UE may change the SS block (or CSI-RS) if suitable SS block (or CSI-RS) was not used for previous transmission and SS block (or CSI-RS) for previous transmission is still not suitable and another suitable SS block (or CSI-RS) is found.

4. UE may reselect the cell if suitable SS block (or CSI-RS) is not found.

5. UE may delay the Msg1 transmission until suitable SS block (or CSI-RS) is found.

6. UE may delay the Msg1 transmission for a defined time period if suitable SS block (or CSI-RS) is not found. UE may trigger cell reselection for idle/inactive state and RLF (i.e., connection re-establishment) for connected state if suitable SS block (or CSI-RS) is not found even after that time period.

Figure 15:
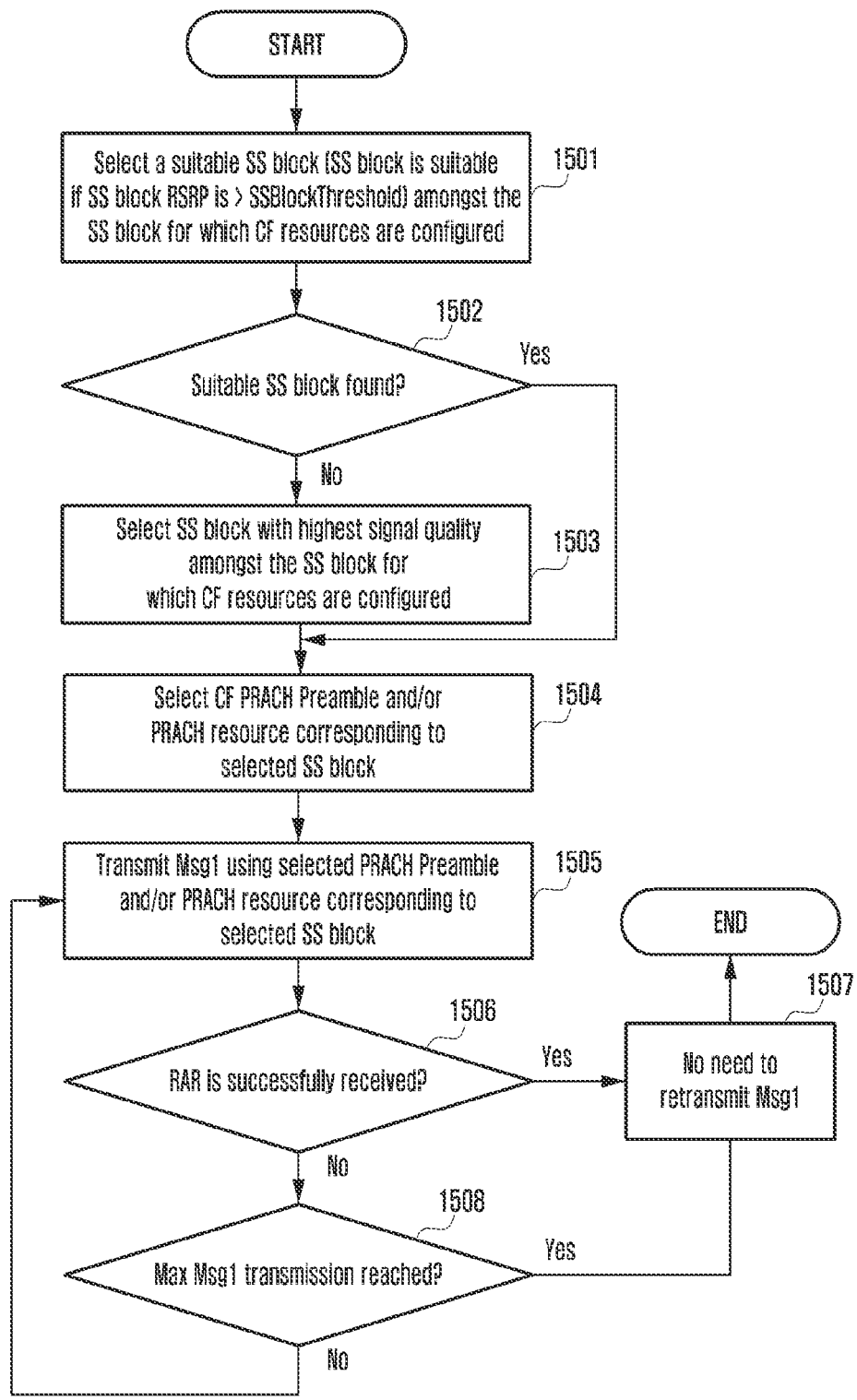
FIG. 15 illustrates a UE behavior for RACH transmission and re-transmission based on Method 11 according to an embodiment of the disclosure.

Method 11:

FIG. 15 illustrates the UE behavior for the RACH transmission and re-transmission based on Method 11 according to an embodiment of the disclosure.

Referring to FIG. 15, UE selects a suitable SS block for initial PRACH preamble transmission at operation 1501. A SS block is suitable if signal quality of SS block is greater than the threshold 'SSBlockThreshold'. In an embodiment, a SS block is suitable if signal quality of SS block is greater than or equal to a threshold 'SSBlockThreshold'. The SSBlockThreshold can be configured by network in system information (e.g., together with PRACH configuration or in RMSI) or handover command or in dedicated RRC signaling. The signal quality is measured over the resources of SS block carrying PSS and/or SSS and/or DMRS for PBCH. The signal quality can be RSRP or RSRQ or RSSI.

In this method the UE first check if there is a suitable SS block amongst the SS blocks for which dedicated PRACH preambles and/or PRACH resources are configured at operation 1502. If a suitable SS block for which dedicated PRACH preambles and/or PRACH resources are configured is found, the UE selects that SS block and selects a dedicated PRACH preamble and/or PRACH resource corresponding to the selected SS block at operation 1504. In case multiple SS blocks are suitable for which a dedicated preamble and/or resource is configured, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

If a suitable SS block is not found, amongst the SS blocks for which dedicated PRACH preambles and/or PRACH resources are configured, the UE selects a SS block with highest signal quality amongst the SS blocks for which dedicated PRACH preambles and/or PRACH resources are configured at operation 1503, and a dedicated PRACH preamble and/or PRACH resource corresponding to the selected SS block at operation 1504.

The UE then transmits a PRACH preamble (i.e., Msg1) using the selected PRACH preamble and/or PRACH resource corresponding to the selected SS block at operation 1505.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 1506. If the UE successfully receives the RAR, there is no need to retransmit Msg1 at operation 1507. If UE is not able to receive the RAR, the UE determines whether the UE has performed maximum number of allowed Msg1 transmissions at operation 1508. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE does not reselect the SS block. The UE uses the same SS block as selected for initial transmission. Suitable SS block is selected when random access procedure is initiated and the same SS block is used for PRACH preamble and/or PRACH resource (or PRACH occasion) selection and path loss estimation for all (re-)transmissions of Msg1 during a random access procedure. In an alternate embodiment, during retransmission UE may select the SS block in same manner as initial transmission.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:

UE may select suitable SS block (or CSI-RS) from SS blocks (or CSI-RSs) for which CF resources are configured. If no suitable SS block (or CSI-RS) is found from SS blocks (or CSI-RSs) for which CF resources are configured, UE may select SS block (or CSI-RS) with highest signal quality from SS blocks (or CSI-RSs) for which CF resources are configured. UE may use the selected SS block (or CSI-RS) for PRACH preamble and/or PRACH resource (or PRACH occasion) selection and path loss estimation for all (re-) transmissions of Msg1 during a random access procedure.

Figure 16:
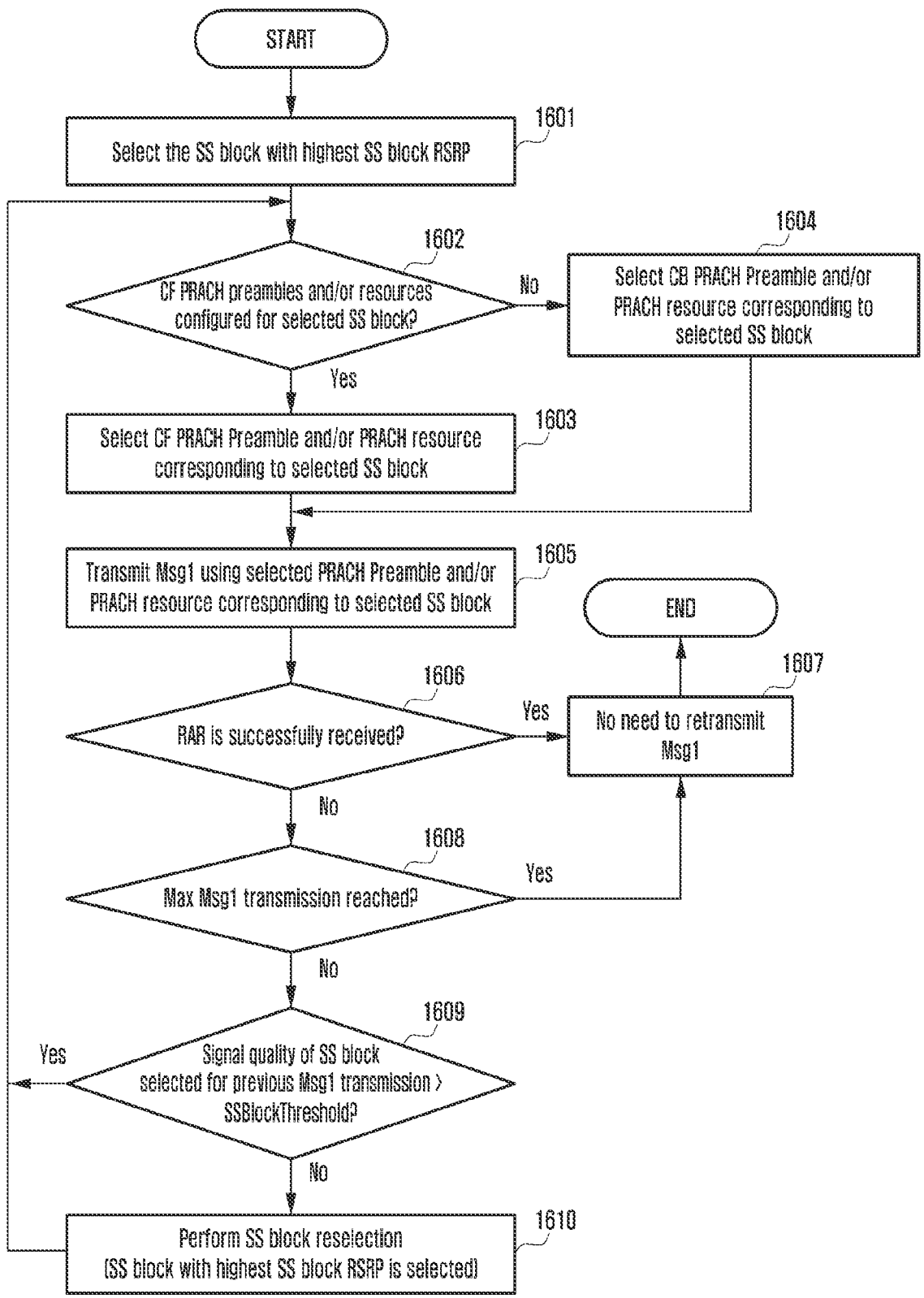
FIG. 16 illustrates a UE behavior for RACH transmission and re-transmission based on Method 12 according to an embodiment of the disclosure.

Method 12:

FIG. 16 illustrates the UE behavior for the RACH transmission and re-transmission based on Method 12 according to an embodiment of the disclosure.

Referring to FIG. 16, UE selects the SS block with highest signal quality for initial PRACH preamble transmission at operation 1601. The signal quality is measured over the resources of SS block carrying PSS and/or SSS and/or DMRS for PBCH. The signal quality can be RSRP or RSRQ or RSSI. In an embodiment, the UE may select the SS block with highest signal quality amongst all SS blocks transmitted by gNB. In another embodiment, the UE may select the SS block with highest signal quality amongst all SS blocks for which measurements are available.

The UE then selects a PRACH preamble and/or a PRACH resource (or PRACH occasion) corresponding to the selected SS block to transmit a PRACH preamble (i.e., Msg1). The UE determines whether contention free PRACH preambles and/or resources are configured for the selected SS block at operation 1602. If the UE is configured with a contention free (i.e., dedicated) PRACH preamble and/or PRACH resource corresponding to the selected SS block, the UE selects a dedicated PRACH preamble and/or PRACH resource corresponding to the selected block at operation 1603. Otherwise, the UE selects PRACH preamble and/or PRACH resource corresponding to the selected SS block from contention based subset of PRACH preambles and/or PRACH resources corresponding to the selected SS block at operation 1604.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

The UE transmits Msg1 using the selected PRACH preamble and/or PRACH resource corresponding to the selected SS block at operation 1605.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 1606. If the UE successfully receives the RAR, there is no need to retransmit Msg1 at operation 1607. If the UE is not able to receive the RAR, the UE determines whether the UE has performed maximum number of allowed Msg1 transmissions at operation 1608. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of SS block selected for previous Msg1 transmission is greater than or equal to a threshold 'SSBlockThreshold' at operation 1609. If the signal quality of the SS block selected for the previous Msg1 transmission is greater than or equal to the threshold 'SSBlockThreshold' the UE does not reselect the SS block. The threshold can be configured by network in system information (e.g., together with PRACH configuration or in RMSI) or handover command or in dedicated RRC signaling. The UE uses the same SS block as selected for the previous transmission for PRACH preamble and/or PRACH resource selection and path loss estimation for retransmission (i.e., next Msg1 transmission). During the retransmission, if the signal quality of the SS block selected for the previous Msg1 transmission is less than the threshold 'SSBlockThreshold', the UE may reselect SS block at operation 1610. The UE may select the SS block with highest signal quality amongst all SS blocks transmitted by gNB. In another embodiment, the UE may select the SS block with highest signal quality amongst all SS blocks for which measurements are available. In an alternate embodiment, during retransmission UE may select the SS block in same manner as initial transmission.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:

1. UE may select SS block (or CSI-RS) with highest signal quality when random access procedure is initiated. UE reselects SS block (or CSI-RS) during retransmission if SS block (or CSI-RS) of previous transmission is below a threshold based on latest measurement wherein SS block (or CSI-RS) with highest signal quality is selected during retransmission. UE may use the selected SS block (or CSI-RS) for PRACH preamble and/or PRACH resource (or PRACH occasion) selection and path loss estimation for transmission of Msg1 during a random access procedure.

2. UE may select PRACH preamble and/or PRACH resource corresponding to selected SS block (or CSI-RS) from CF resources (if configured); otherwise UE may select PRACH preamble and/or PRACH resource corresponding to the selected SS block from CB resources.

Figure 17:
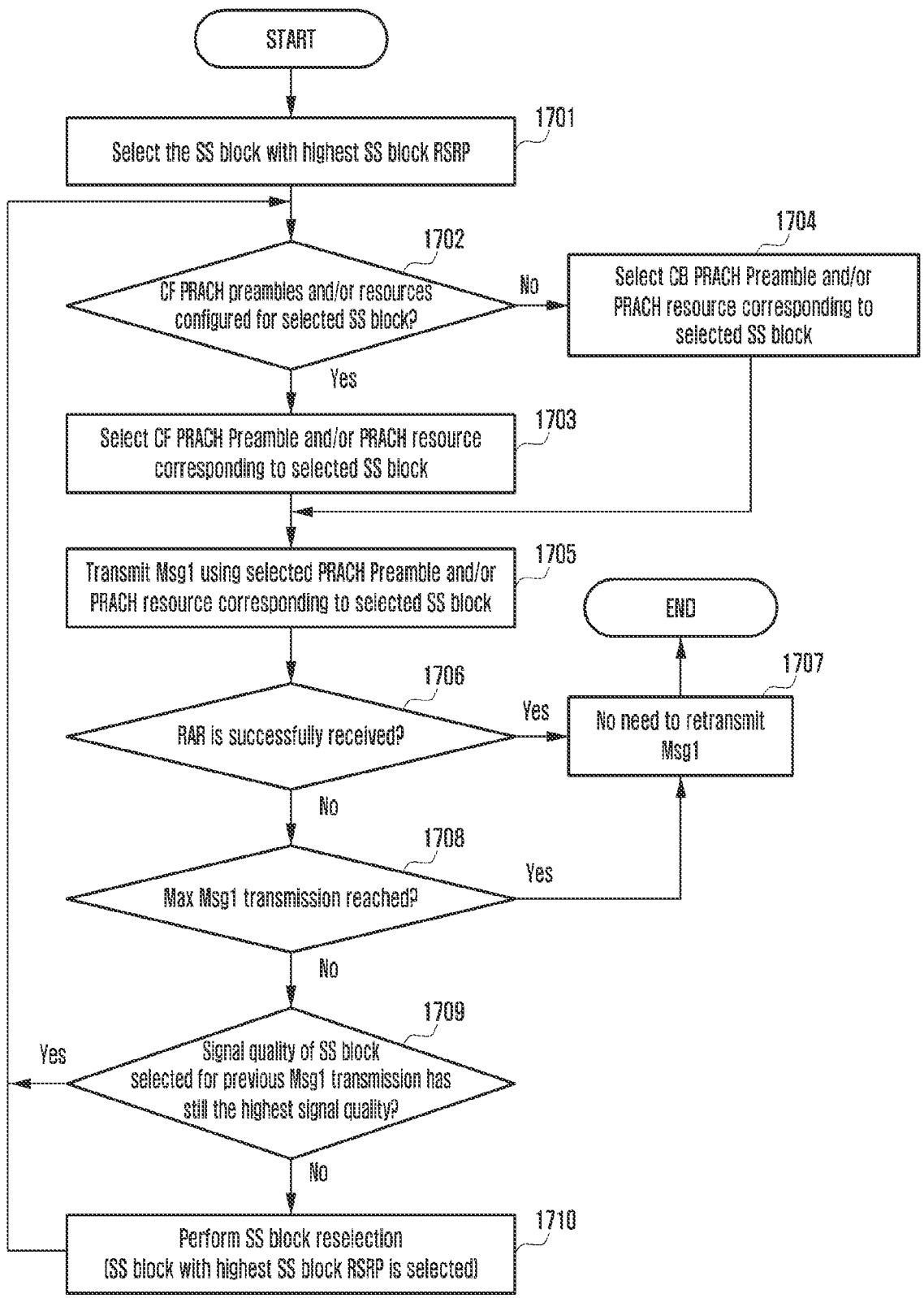
FIG. 17 illustrates a UE behavior for RACH transmission and re-transmission based on Method 13 according to an embodiment of the disclosure.

Method 13:

FIG. 17 illustrates the UE behavior for the RACH transmission and re-transmission based on Method 13 according to an embodiment of the disclosure.

Referring to FIG. 17, UE selects the SS block with highest signal quality for initial PRACH preamble transmission at operation 1701. The signal quality is measured over the resources of SS block carrying PSS and/or SSS and/or DMRS for PBCH. The signal quality can be RSRP or RSRQ or RSSI. In an embodiment, the UE may select the SS block with highest signal quality amongst all SS blocks transmitted by gNB. In another embodiment, the UE may select the SS block with highest signal quality amongst all SS blocks for which measurements are available.

The UE then selects a PRACH preamble and/or a PRACH resource (or PRACH occasion) corresponding to the selected SS block to transmit a PRACH preamble (i.e., Msg1). The UE determines whether contention free PRACH preambles and/or resources are configured for the selected SS block at operation 1702. If the UE is configured with a contention free (i.e., dedicated) PRACH preamble and/or PRACH resource corresponding to the selected SS block, the UE selects a dedicated PRACH preamble and/or PRACH resource corresponding to the selected block at operation 1703. Otherwise, the UE selects PRACH preamble and/or PRACH resource corresponding to the selected SS block from contention based subset of PRACH preambles and/or PRACH resources corresponding to the selected SS block at operation 1704.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

The UE transmits Msg1 using the selected PRACH preamble and/or PRACH resource corresponding to the selected SS block at operation 1705.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 1706. If the UE successfully receives the RAR, there is no need to retransmit Msg1 at operation 1707. If the UE is not able to receive the RAR, the UE determines whether the UE has performed maximum number of allowed Msg1 transmissions at operation 1708. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of SS block selected for previous Msg1 transmission has still the highest signaling quality based on latest measurements at operation 1709. If the signal quality of the SS block selected for the previous Msg1 transmission has the highest signaling quality, the UE does not reselect the SS block. The threshold can be configured by network in system information (e.g. together with PRACH configuration or in RMSI) or handover command or in dedicated RRC signaling. The UE uses the same SS block as selected for the previous transmission for PRACH preamble and/or PRACH resource selection and path loss estimation for retransmission (i.e., next Msg1 transmission). During the retransmission, if the signal quality of the SS block selected for the previous Msg1 transmission does not have highest signaling quality, the UE may reselect SS block at operation 1710. The UE may select the SS block with highest signal quality amongst all SS blocks transmitted by gNB. In another embodiment, the UE may select the SS block with highest signal quality amongst all SS blocks for which measurements are available. In an alternate embodiment, during retransmission UE may select the SS block in same manner as initial transmission.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Key Point:

1. UE may select SS block (or CSI-RS) with highest signal quality when random access procedure is initiated. UE reselects SS block (or CSI-RS) during retransmission if SS block (or CSI-RS) of previous transmission does not have the highest signal quality based on latest measurement wherein SS block (or CSI-RS) with highest signal quality is selected during retransmission. UE may use the selected SS block (or CSI-RS) for PRACH preamble and/or PRACH resource (or PRACH occasion) selection and path loss estimation for transmission of Msg1 during a random access procedure.

2. UE may select PRACH preamble and/or PRACH resource corresponding to selected SS block (or CSI-RS) from CF resources (if configured); otherwise UE may select PRACH preamble and/or PRACH resource corresponding to the selected SS block from CB resources.

Figure 18:
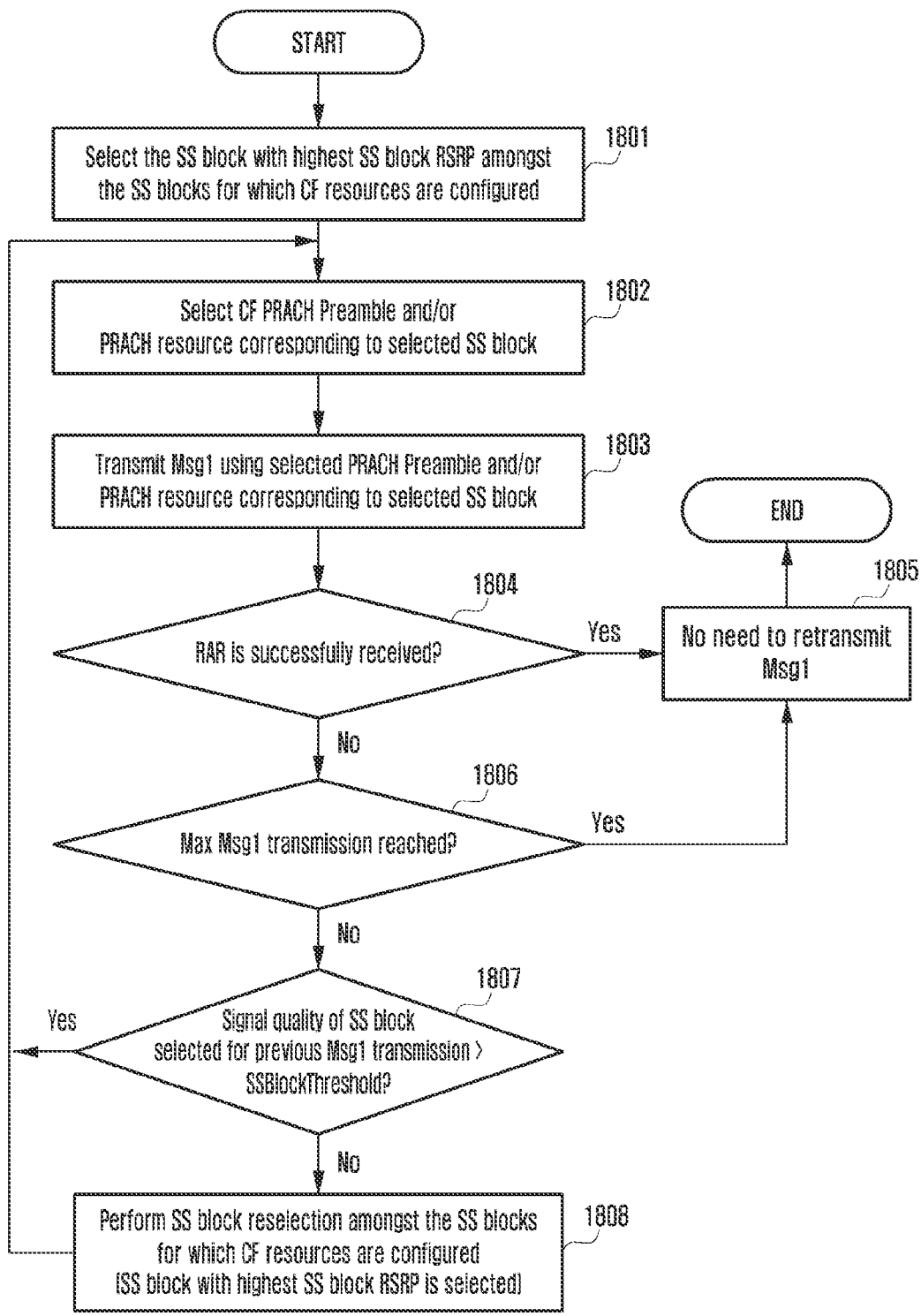
FIG. 18 illustrates a UE behavior for RACH transmission and re-transmission based on Method 14 according to an embodiment of the disclosure.

Method 14:

FIG. 18 illustrates the UE behavior for the RACH transmission and re-transmission based on Method 14 according to an embodiment of the disclosure.

Referring to FIG. 18, UE selects the SS block with highest signal quality for initial PRACH preamble transmission at operation 1801. The signal quality is measured over the resources of SS block carrying PSS and/or SSS and/or DMRS for PBCH. The signal quality can be RSRP or RSRQ or RSSI. In this method, the UE may select the SS block with highest signal quality amongst the SS blocks for which contention free preamble and/or resources are configured to UE by gNB.

The UE then selects a PRACH preamble and/or a PRACH resource (or PRACH occasion) corresponding to the selected SS block at operation 1802, and the UE transmits Msg1 using the selected PRACH preamble and/or PRACH resource corresponding to the selected SS block at operation 1803.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 1804. If the UE successfully receives the RAR, there is no need to retransmit Msg1 at operation 1805. If the UE is not able to receive the RAR, the UE determines whether the UE has performed maximum number of allowed Msg1 transmissions at operation 1806. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of SS block selected for previous Msg1 transmission is greater than or equal to a threshold 'SSBlockThreshold' at operation 1807. If the signal quality of the SS block selected for the previous Msg1 transmission is greater than or equal to the threshold 'SSBlockThreshold' the UE does not reselect the SS block. The threshold can be configured by network in system information (e.g., together with PRACH configuration or in RMSI) or handover command or in dedicated RRC signaling. The UE uses the same SS block as selected for the previous transmission for PRACH preamble and/or PRACH resource selection and path loss estimation for retransmission (i.e., next Msg1 transmission). During the retransmission, if the signal quality of the SS block selected for the previous Msg1 transmission is less than the threshold 'SSBlockThreshold', the UE may reselect SS block at operation 1808. The UE may select the SS block with highest signal quality amongst the SS blocks for which contention free preamble and/or resources are configured to UE by gNB.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Figure 19:
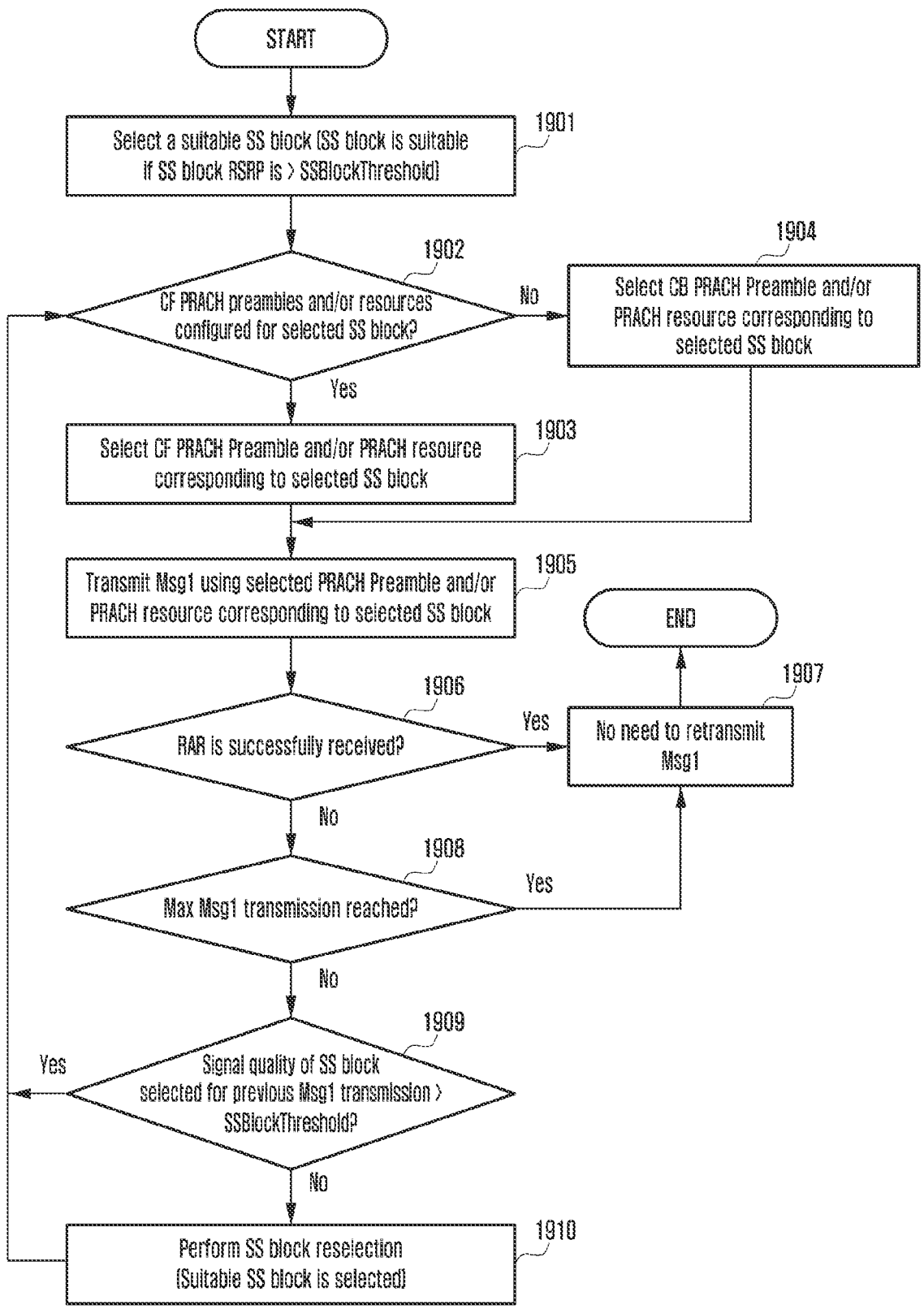
FIG. 19 illustrates a UE behavior for RACH transmission and re-transmission based on Method 15 according to an embodiment of the disclosure.

Method 15:

FIG. 19 illustrates the UE behavior for the RACH transmission and re-transmission based on Method 15 according to an embodiment of the disclosure.

Referring to FIG. 19, UE selects a suitable SS block for initial PRACH preamble transmission at operation 1901. A SS block is suitable if signal quality of SS block is greater than the threshold 'SSBlockThreshold'. In an embodiment, a SS block is suitable if signal quality of SS block is greater than or equal to a threshold 'SSBlockThreshold'. The SSBlockThreshold can be configured by network in system information (e.g., together with PRACH configuration or in RMSI) or handover command or in dedicated RRC signaling. The signal quality is measured over the resources of SS block carrying PSS and/or SSS and/or DMRS for PBCH. The signal quality can be RSRP or RSRQ or RSSI. In case multiple SS blocks are suitable, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

The UE then selects a PRACH preamble and/or a PRACH resource (or PRACH occasion) corresponding to the selected SS block to transmit a PRACH preamble (i.e., Msg1). The UE determines whether contention free PRACH preambles and/or resources are configured for the selected SS block at operation 1902. If the UE is configured with contention free (i.e., dedicated) PRACH preamble and/or PRACH resource corresponding to the selected SS block, the UE selects dedicated PRACH preamble and/or PRACH resource corresponding to the selected block at operation 1903. Otherwise, the UE selects PRACH preamble and/or PRACH resource corresponding to the selected SS block from contention based subset of PRACH preambles and/or PRACH resources corresponding to the selected SS block at operation 1904.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

The UE transmits Msg1 using the selected PRACH preamble and/or PRACH resource corresponding to the selected SS block at operation 1905.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 1906. If the UE successfully receives the RAR, there is no need to retransmit Msg1 at operation 1907. If the UE is not able to receive the RAR, the UE determines whether the UE has performed maximum number of allowed Msg1 transmissions at operation 1908. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of the SS block selected for the previous Msg1 transmission is greater than or equal to a threshold 'SSBlockThreshold' at operation 1909. If the signal quality of the SS block selected for the previous Msg1 transmission is greater than equal to a threshold 'SSBlockThreshold', the UE does not reselect the SS block. The threshold can be configured by network in system information (e.g., together with PRACH configuration or in RMSI) or handover command or in dedicated RRC signaling. The UE uses the same SS block as selected for the previous transmission for PRACH preamble and/or PRACH resource selection and path loss estimation for retransmission (i.e., next Msg1 transmission). During the retransmission, if the signal quality of the SS block selected for the previous Msg1 transmission is less than the threshold 'SSBlockThreshold', the UE may reselect SS block at operation 1910. The UE may select a suitable SS block. In case suitable SS block is not found, the UE may reselect a suitable SS block during retransmission as explained later.

In the procedure explained above, it is possible that the UE is not able to find any suitable SS block. In this case the UE may perform one of the following:

The UE does not transmit Msg1. Additionally, the UE may trigger cell reselection for idle/inactive state and RLF (i.e., connection re-establishment) for connected state.

The UE selects SS block with highest signal quality among all the SS blocks or among the SS blocks for which measurements are available. In this case (i.e., when suitable SS block is not selected), during retransmission of Msg1 the UE may change SS block if SS block for previous transmission is still not suitable and another suitable SS block is found. In an embodiment, the UE may be allowed to transmit Msg1 without selecting a suitable SS block for 'N' number of times. Parameter N can be pre-defined or signaled by network.

The UE may delay Msg1 transmission until the UE founds suitable SS block. In one embodiment, the UE may delay Msg1 transmission for a maximum time period 'T'. The time period T can be configured by network in system information (e.g., together with PRACH configuration or in RMSI) or handover command or in dedicated RRC signaling. After expiry of this time if suitable SS block is still not found the UE may trigger cell reselection for idle/inactive state and RLF (i.e., connection re-establishment) for connected state. Alternately, after expiry of this time if suitable SS block is still not found, the UE may select SS block with highest signal quality among all the SS blocks or among the SS blocks for which measurements are available.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Figure 20:
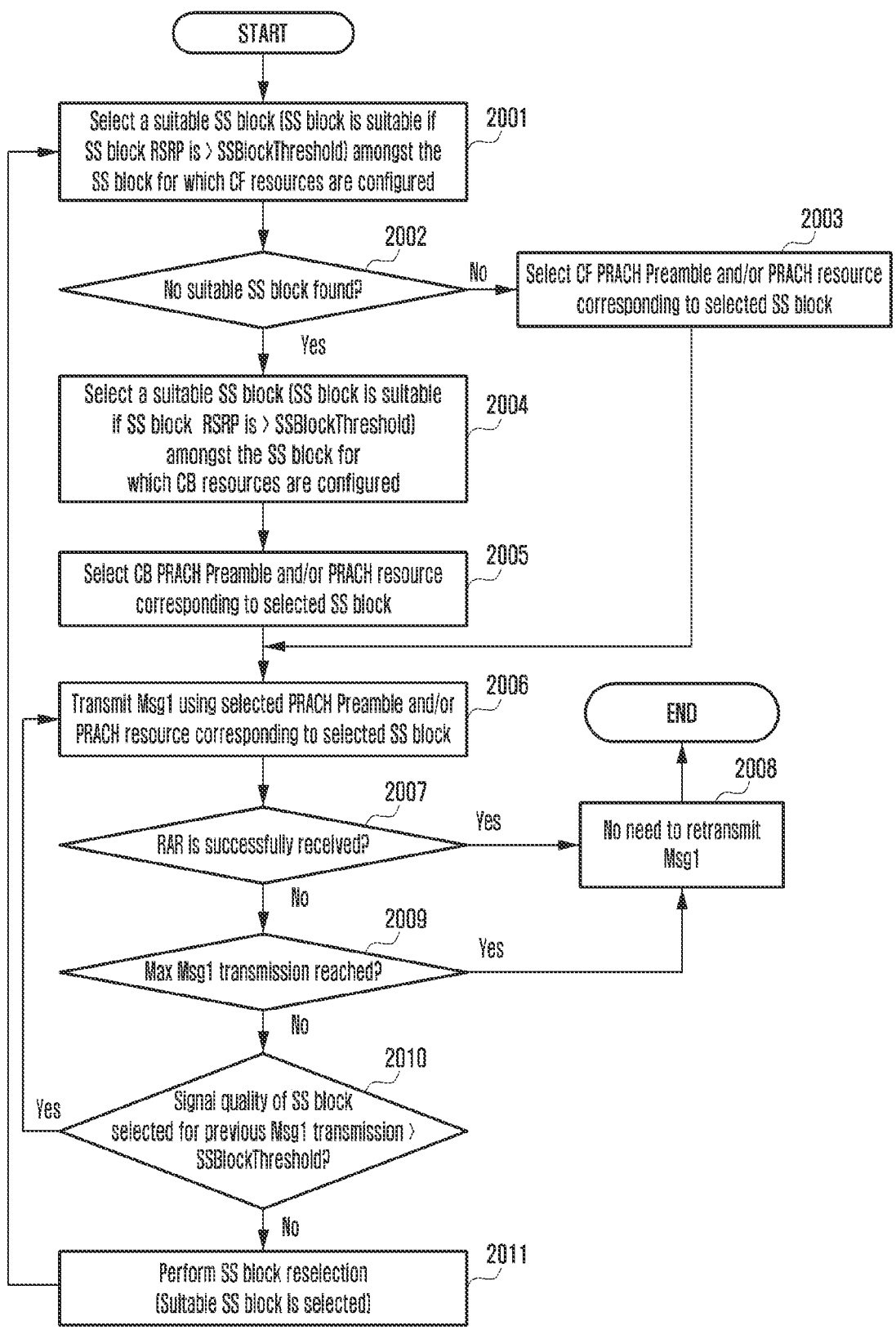
FIG. 20 illustrates a UE behavior for RACH transmission and re-transmission based on Method 16 according to an embodiment of the disclosure.

Method 16:

FIG. 20 illustrates the UE behavior for the RACH transmission and re-transmission based on Method 16 according to an embodiment of the disclosure.

Referring to FIG. 20, UE selects a suitable SS block for initial PRACH preamble transmission at operation 2001. A SS block is suitable if signal quality of SS block is greater than the threshold 'SSBlockThreshold'. In an embodiment, a SS block is suitable if signal quality of SS block is greater than or equal to a threshold 'SSBlockThreshold'. The SSBlockThreshold can be configured by network in system information (e.g., together with PRACH configuration or in RMSI) or handover command or in dedicated RRC signaling. The signal quality is measured over the resources of SS block carrying PSS and/or SSS and/or DMRS for PBCH. The signal quality can be RSRP or RSRQ or RSSI.

In this method the UE first check if there is a suitable SS block amongst the SS blocks for which dedicated PRACH preambles and/or PRACH resources are configured at operation 2002. If a suitable SS block for which dedicated PRACH preambles and/or PRACH resources are configured is found, the UE selects that SS block and selects a dedicated PRACH preamble and/or PRACH resource corresponding to the selected SS block at operation 2003. In case multiple SS blocks are suitable for which a dedicated preamble and/or resource is configured, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

If a suitable SS block is not found, amongst the SS blocks for which dedicated PRACH preambles and/or PRACH resources are configured, the UE selects a suitable block amongst the SS blocks for which contention based preambles and/or resources are configured at operation 2004, and the UE selects a contention based PRACH preamble and/or PRACH resource corresponding to the selected SS block at operation 2005. In case multiple SS blocks are suitable for which a contention based preamble and/or resource is configured, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

The UE then transmits a PRACH preamble (i.e., Msg1) using the selected PRACH preamble and/or PRACH resource corresponding to the selected SS block at operation 2006.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 2007. If the UE successfully receives the RAR, there is no need to retransmit Msg1 at operation 2008. If the UE is not able to receive the RAR, the UE determines whether the UE has performed maximum number of allowed Msg1 transmissions at operation 2009. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of SS block selected for previous Msg1 transmission is greater than or equal to a threshold 'SSBlockThreshold' at operation 2010. If the signal quality of the SS block selected for the previous Msg1 transmission is greater than or equal to the threshold 'SSBlockThreshold' the UE does not reselect the SS block. The threshold can be configured by network in system information (e.g., together with PRACH configuration or in RMSI) or handover command or in dedicated RRC signaling. The UE uses the same SS block as selected for the previous transmission for PRACH preamble and/or PRACH resource selection and path loss estimation for retransmission (i.e., next Msg1 transmission). During the retransmission, if the signal quality of the SS block selected for the previous Msg1 transmission is less than the threshold 'SSBlockThreshold', the UE may reselect SS block at operation 2011. The UE may select a suitable SS block. In case suitable SS block is not found, the UE may reselect a suitable SS block during retransmission as explained later.

In the procedure explained above, it is possible that the UE is not able to find any suitable SS block. In this case the UE may perform one of the following:

The UE does not transmit Msg1. Additionally, the UE may trigger cell reselection for idle/inactive state and RLF (i.e., connection re-establishment) for connected state.

The UE selects SS block with highest signal quality among all the SS blocks or among the SS blocks for which measurements are available. In this case (i.e., when suitable SS block is not selected), during retransmission of Msg1 the UE may change SS block if SS block for previous transmission is still not suitable and another suitable SS block is found. In an embodiment, the UE may be allowed to transmit Msg1 without selecting a suitable SS block for 'N' number of times. Parameter N can be pre-defined or signaled by network.

The UE may delay Msg1 transmission until the UE founds suitable SS block. In one embodiment, the UE may delay Msg1 transmission for a maximum time period 'T'. The time period T can be configured by network in system information (e.g., together with PRACH configuration or in RMSI) or handover command or in dedicated RRC signaling. After expiry of this time if suitable SS block is still not found the UE may trigger cell reselection for idle/inactive state and RLF (i.e., connection re-establishment) for connected state. Alternately, after expiry of this time if suitable SS block is still not found, the UE may select SS block with highest signal quality among all the SS blocks or among the SS blocks for which measurements are available.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS.

Figure 21:
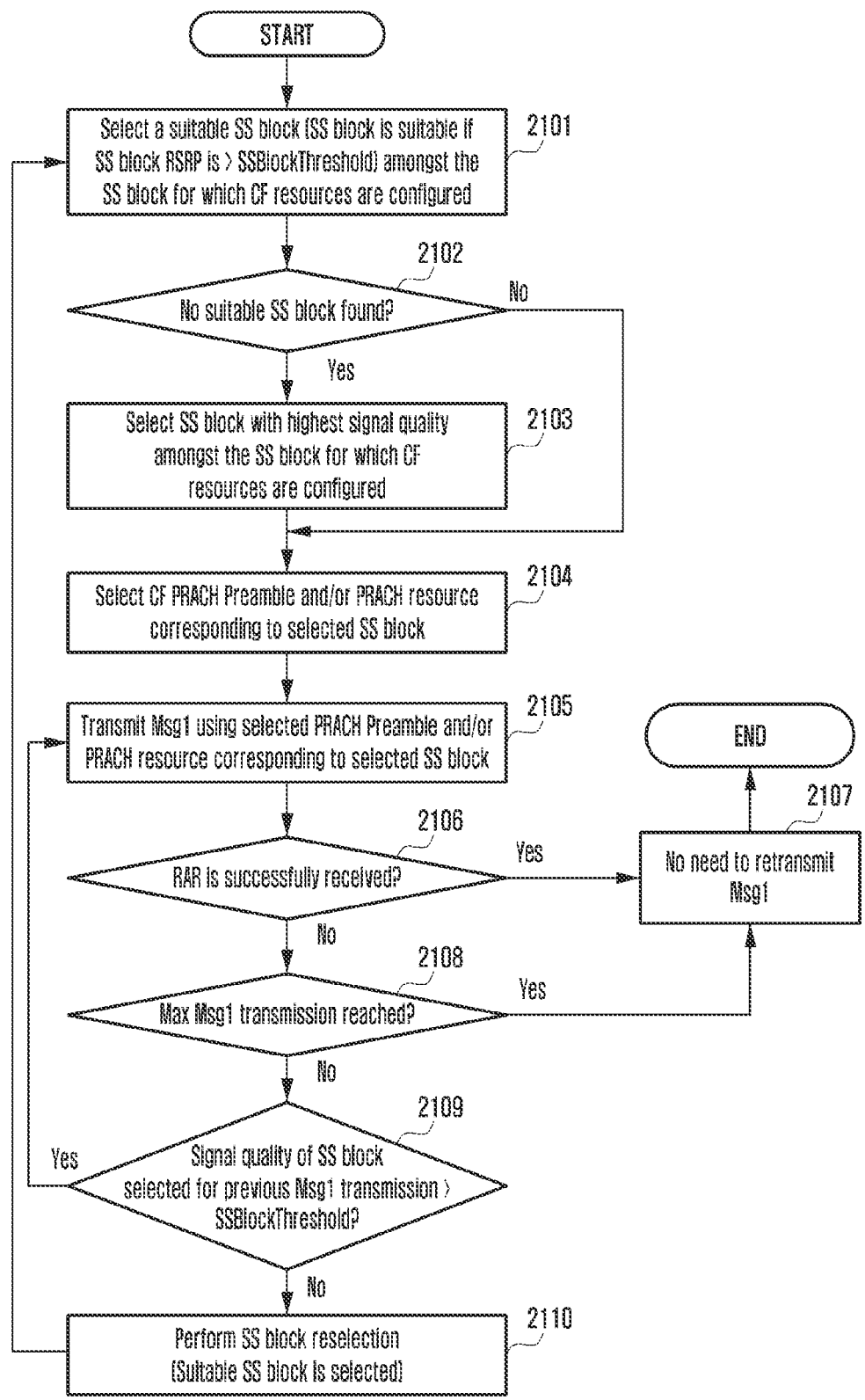
FIG. 21 illustrates a UE behavior for RACH transmission and re-transmission based on Method 17 according to an embodiment of the disclosure.

Method 17:

FIG. 21 illustrates the UE behavior for the RACH transmission and re-transmission based on Method 17 according to an embodiment of the disclosure.

Referring to FIG. 21, UE selects a suitable SS block for initial PRACH preamble transmission at operation 2101. A SS block is suitable if signal quality of SS block is greater than the threshold 'SSBlockThreshold'. In an embodiment, a SS block is suitable if signal quality of SS block is greater than or equal to a threshold 'SSBlockThreshold'. The SSBlockThreshold can be configured by network in system information (e.g., together with PRACH configuration or in RMSI) or handover command or in dedicated RRC signaling. The signal quality is measured over the resources of SS block carrying PSS and/or SSS and/or DMRS for PBCH. The signal quality can be RSRP or RSRQ or RSSI.

In this method the UE first check if there is a suitable SS block amongst the SS blocks for which dedicated PRACH preambles and/or PRACH resources are configured at operation 2102. If a suitable SS block for which dedicated PRACH preambles and/or PRACH resources are configured is found, the UE selects that SS block and selects a dedicated PRACH preamble and/or PRACH resource corresponding to the selected SS block at operation 2103. In case multiple SS blocks are suitable for which a dedicated preamble and/or resource is configured, the UE may select a SS block in one of the following ways:

UE may select the SS block with highest signal quality amongst the suitable SS blocks.

UE may select the SS block corresponding to which RACH resource (or PRACH occasion) is available earliest in time amongst the suitable SS blocks.

UE may select randomly with equal probability one of the SS block amongst the suitable SS blocks.

UE may select any SS block amongst the suitable SS blocks.

UE may select one of the following methods based on indication (can be signaled as part of PRACH configuration in SI and/or handover command and/or in dedicated RRC signaling) from network: select the SS block with highest signal quality amongst the suitable SS blocks or select the SS block corresponding to which RACH resource (or PRACH occasion) is available earliest in time amongst the suitable SS blocks or select randomly with equal probability one of the SS block amongst the suitable SS blocks.

If a suitable SS block is not found, amongst the SS blocks for which dedicated PRACH preambles and/or PRACH resources are configured, the UE selects a SS block with highest signal quality amongst the SS blocks for which dedicated PRACH preambles and/or PRACH resources are configured at operation 2103, and a dedicated PRACH preamble and/or PRACH resource corresponding to the selected SS block at operation 2104.

The UE then transmits a PRACH preamble (i.e., Msg1) using the selected PRACH preamble and/or PRACH resource corresponding to the selected SS block at operation 2105.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from dedicated PRACH resources otherwise the UE selects a PRACH resource (PRACH occasion) from contention based PRACH resources (PRACH occasions) corresponding to the selected SS block. The UE may select the earliest available PRACH resource (PRACH occasion) (dedicated if available otherwise contention) of PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in time corresponding to the selected SS block, the UE randomly selects with equal probability one PRACH resource (PRACH occasion) from available multiple frequency division multiplexed PRACH resources (PRACH occasions). The UE randomly selects with equal probability a PRACH preamble from configured set of PRACH preambles.

For calculating the power for transmitting the PRACH, the UE estimates the path loss based on signals received in the selected SS block. After transmitting the Msg1, the UE determines whether a RAR (i.e., Msg2) corresponding to Msg1 transmission is successfully received at operation 2106. If the UE successfully receives the RAR, there is no need to retransmit Msg1 at operation 2107. If the UE is not able to receive the RAR, the UE determines whether the UE has performed maximum number of allowed Msg1 transmissions at operation 2108. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of SS block selected for previous Msg1 transmission is greater than or equal to a threshold 'SSBlockThreshold' at operation 2109. If the signal quality of the SS block selected for the previous Msg1 transmission is greater than or equal to the threshold 'SSBlockThreshold' the UE does not reselect the SS block. The threshold can be configured by network in system information (e.g., together with PRACH configuration or in RMSI) or handover command or in dedicated RRC signaling. The UE uses the same SS block as selected for the previous transmission for PRACH preamble and/or PRACH resource selection and path loss estimation for retransmission (i.e., next Msg1 transmission). During the retransmission, if the signal quality of the SS block selected for the previous Msg1 transmission is less than the threshold 'SSBlockThreshold', the UE may reselect SS block at operation 2110. The UE may select a suitable SS block. In case suitable SS block is not found, the UE may reselect a suitable SS block during retransmission.

In an alternate embodiment of this method, instead of SS block, CSI-RS can be used. UE selects CSI-RS instead of SS block using same procedure as explained above for SS block. The UE may select PRACH preamble and/or PRACH resource (or PRACH occasion) from PRACH preambles and/or PRACH resources (or PRACH occasion) corresponding to the selected CSI-RS. All of the above procedures (Methods 1-17) can be replaced with the case of CSI-RS and thresholds signaled for the case of CSI-RS can be used. This can be done for the case of handover and the beam recovery cases wherein CSI-RS based RACH is suitable. Some procedures based on CSI-RS are described below, but which have fallback mechanisms based on the SS block wherein the RACH procedure fails or reaches maximum limit when it is performed using the CSI-RS resources.

Figure 22:
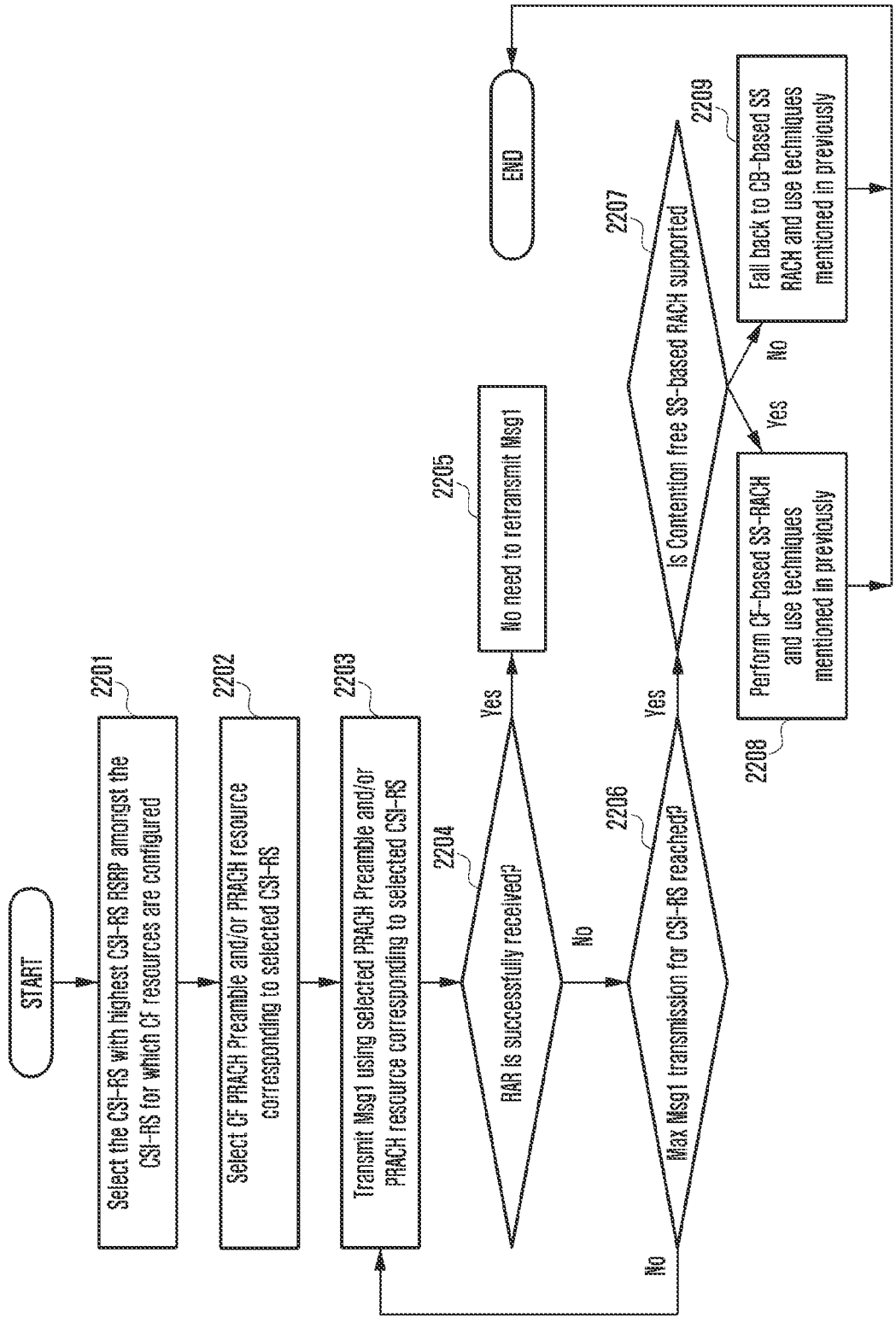
FIG. 22 illustrates a UE behavior for RACH transmission and re-transmission based on Method 18 according to an embodiment of the disclosure.

Method 18:

FIG. 22 illustrates the UE behavior for the RACH transmission and re-transmission based on Method 18 according to an embodiment of the disclosure.

Referring to FIG. 22, UE selects a suitable CSI-RS block for PRACH preamble transmission. This procedure is similar to the case of the SS block based RACH. The changes in the mentioned procedure occur when the maximum retransmission limit for the Msg1 is reached when CSI-RS is used. Then fallback RACH procedures for the UE may be supported by the gNB in order to allow for zero interruption time in handover scenarios. First the UE checks whether the CF RACH procedure based on the SS blocks of the target cell is supported at operation 2207. If it is supported, then it performs one of the CF methods based on SS blocks described earlier at operation 2208. If it is not configured and indicated to the UE via the handover command; then the UE must perform contention-based 4-step RACH procedure based on SS blocks of the target cell at operation 2209. The configuration for the same can be obtained by reading the SI of the target cell. For the case when the UE has to perform the contention-based RACH procedure, it can use the methods 1-6 mentioned earlier. The same mechanism can be used when the UE finds that the CSI-RS measurements are not crossing the suitable threshold levels. Either it can just continue to the perform RACH hoping that the RACH would succeed; else it can fallback to SS-based RACH or it can trigger a UE may trigger RLF (i.e., connection re-establishment) for connected state. The key points to be noted for this procedure are the selection of CSI-RS block with highest CSI-RS block RSRP amongst the CSI-RS blocks for which CF resources are configured; the fact that the same CSI-RS block is used for Msg1 (re-) transmission during a CF random access procedure and that the selection of PRACH preamble and/or PRACH resource corresponding to selected CSI-RS block from CF resources configured for the UE must be used.

In this procedure, the UE selects a suitable CSI-RS or the CSI-RS with highest CSI-RS RSRP amongst the CSI-RS for which CF resources are configured at operation 2201, the UE selects a dedicated PRACH preamble and/or PRACH resource corresponding to the selected CSI-RS at operation 2202, and the UE transmits a PRACH preamble (i.e., Msg1) using the selected PRACH preamble and/or PRACH resource corresponding to the selected CSI-RS resource at operation 2203.

If CSI-RS resource is associated with a dedicated preamble the UE uses that PRACH preamble. Otherwise, the UE selects a PRACH preamble randomly from the contention based PRACH preambles corresponding to the selected CSI-RS resources or from the entire pool of CF preambles.

If CSI-RS resource is associated with dedicated PRACH resources (PRACH occasions), the UE selects a PRACH resource from it otherwise the UE selects a PRACH resource (PRACH occasion) from contention based PRACH resources (PRACH occasions) corresponding to the selected CSI-RS resource or from the entire pool of dedicated set of resources (PRACH occasions) intended for the case of handover RACH.

After transmitting the Msg1, the UE determines whether a RAR (i.e., Msg2) corresponding to Msg1 transmission is successfully received at operation 2204. If the UE successfully receives the RAR, there is no need to retransmit Msg1 at operation 2205. If the UE is not able to receive the RAR, the UE determines whether the UE has performed maximum number of allowed Msg1 transmissions at operation 2206. The UE retransmits the Msg1 if the UE has not yet transmitted maximum number of allowed Msg1 transmissions. If the UE has performed maximum number of allowed Msg1 transmissions, fallback is needed.

For the case when fallback is needed, the UE sends a PRACH preamble (i.e., Msg1) using the selected PRACH preamble and/or PRACH resource corresponding to the selected SS block at operation 2208 or 2209.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from this subset otherwise the UE selects a PRACH resource (PRACH occasion) from contention based PRACH resources (PRACH occasions) corresponding to the selected SS block. The UE may select the earliest available time slot carrying a PRACH resource (dedicated if available otherwise contention) from PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in the time corresponding to the selected SS block, the UE randomly selects with equal probability one PRACH resource (PRACH occasion) multiple frequency division multiplexed from available PRACH resources (PRACH occasion). The UE randomly selects with equal probability a PRACH preamble from configured set of PRACH preambles.

These resources for the case of SS block can be either CF based or CB based appropriately as the decision taken by the UE.

Figure 23:
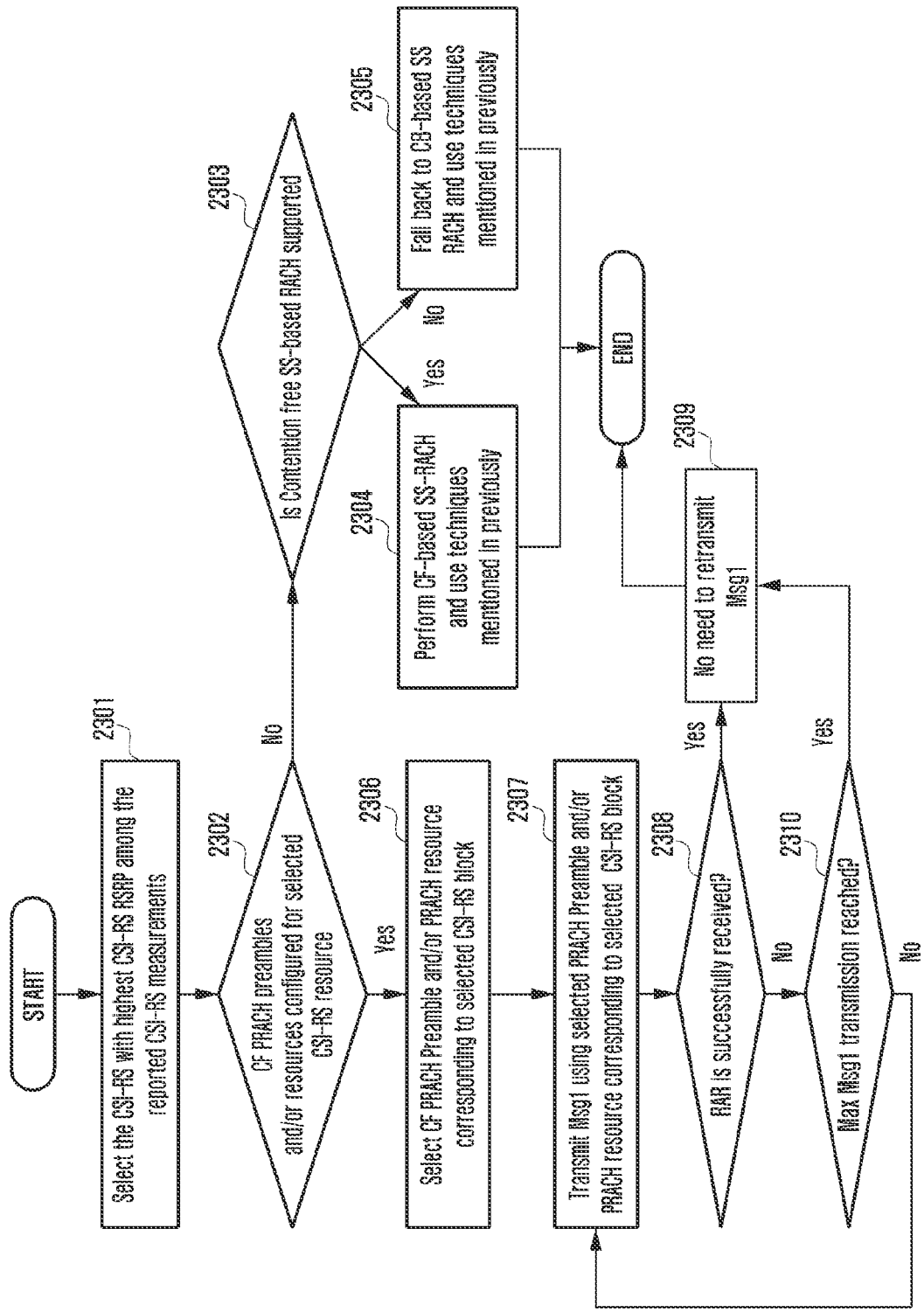
FIG. 23 illustrates a UE behavior for RACH transmission and re-transmission based on Method 19 according to an embodiment of the disclosure.

Method 19:

FIG. 23 illustrates the UE behavior for the RACH transmission and re-transmission based on Method 19 according to an embodiment of the disclosure.

Referring to FIG. 23, UE selects a suitable CSI-RS block for PRACH preamble transmission at operation 2301. This procedure is similar to the case of the SS block based RACH. The changes in the mentioned procedure occur when the UE finds that the CF resources for the case of CSI-RS based RACH are not configured to the UE at operation 2302. In such case the UE must fall back to the SS based RACH resources either CF at operation 2304 or the contention-based at operation 2305. The UE can use this behavior even in cases where it finds that the SS based RACH resources are available first in time as opposed to the CSI-RS resources. This can help UE save access latency and minimize the handover interruption time.

In this procedure, the UE selects a suitable CSI-RS or the CSI-RS with highest CSI-RS RSRP amongst the reported CSI-RS measurements at operation 2301, and the UE determines whether CF PRACH preambles and/or PRACH resources are configured for the selected CSI-RS resource at operation 2302. If the UE is configured with contention free (i.e., dedicated) PRACH preamble and/or PRACH resource corresponding to the selected CSI-RS block, the UE selects dedicated PRACH preamble and/or PRACH resource corresponding to the selected block at operation 2306, and the UE transmits a PRACH preamble (i.e., Msg1) using the selected PRACH preamble and/or PRACH resource corresponding to the selected CSI-RS resource at operation 2307.

If CSI-RS resource is associated with a dedicated preamble the UE uses that PRACH preamble. Otherwise, the UE selects a PRACH preamble randomly from the contention based PRACH preambles corresponding to the selected CSI-RS resources or from the entire pool of CF preambles.

If CSI-RS resource is associated with dedicated PRACH resources (PRACH occasions), the UE selects a PRACH resource from it otherwise the UE selects a PRACH resource (PRACH occasion) from contention based PRACH resources (PRACH occasions) corresponding to the selected CSI-RS resource or from the entire pool of dedicated set of resources (PRACH occasions) intended for the case of handover RACH.

After transmitting the Msg1, the UE determines whether a RAR (i.e., Msg2) corresponding to Msg1 transmission is successfully received at operation 2308. If the UE successfully receives the RAR, there is no need to retransmit Msg1 at operation 2309. If the UE is not able to receive the RAR, the UE determines whether the UE has performed maximum number of allowed Msg1 transmissions at operation 2310. The UE retransmits the Msg1 if the UE has not yet transmitted maximum number of allowed Msg1 transmissions. If the UE has performed maximum number of allowed Msg1 transmissions, the UE does not retransmit Msg1.

If the UE is not configured with contention free (i.e., dedicated) PRACH preamble and/or PRACH resource, fallback is need. For the case when fallback is needed, the UE checks whether the CF RACH procedure based on the SS blocks of the target cell is supported at operation 2303, and the UE sends a PRACH preamble (i.e., Msg1) using the selected PRACH preamble and/or PRACH resource corresponding to the selected SS block operation 2304 or 2305.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from this subset otherwise the UE selects a PRACH resource (PRACH occasion) from contention based PRACH resources (PRACH occasions) corresponding to the selected SS block. The UE may select the earliest available time slot carrying a PRACH resource (dedicated if available otherwise contention) from PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in the time corresponding to the selected SS block, the UE randomly selects with equal probability one PRACH resource (PRACH occasion) multiple frequency division multiplexed from available PRACH resources (PRACH occasion). The UE randomly selects with equal probability a PRACH preamble from configured set of PRACH preambles.

These resources for the case of SS block can be either CF based or CB based appropriately as the decision taken by the UE.

Figure 24A:
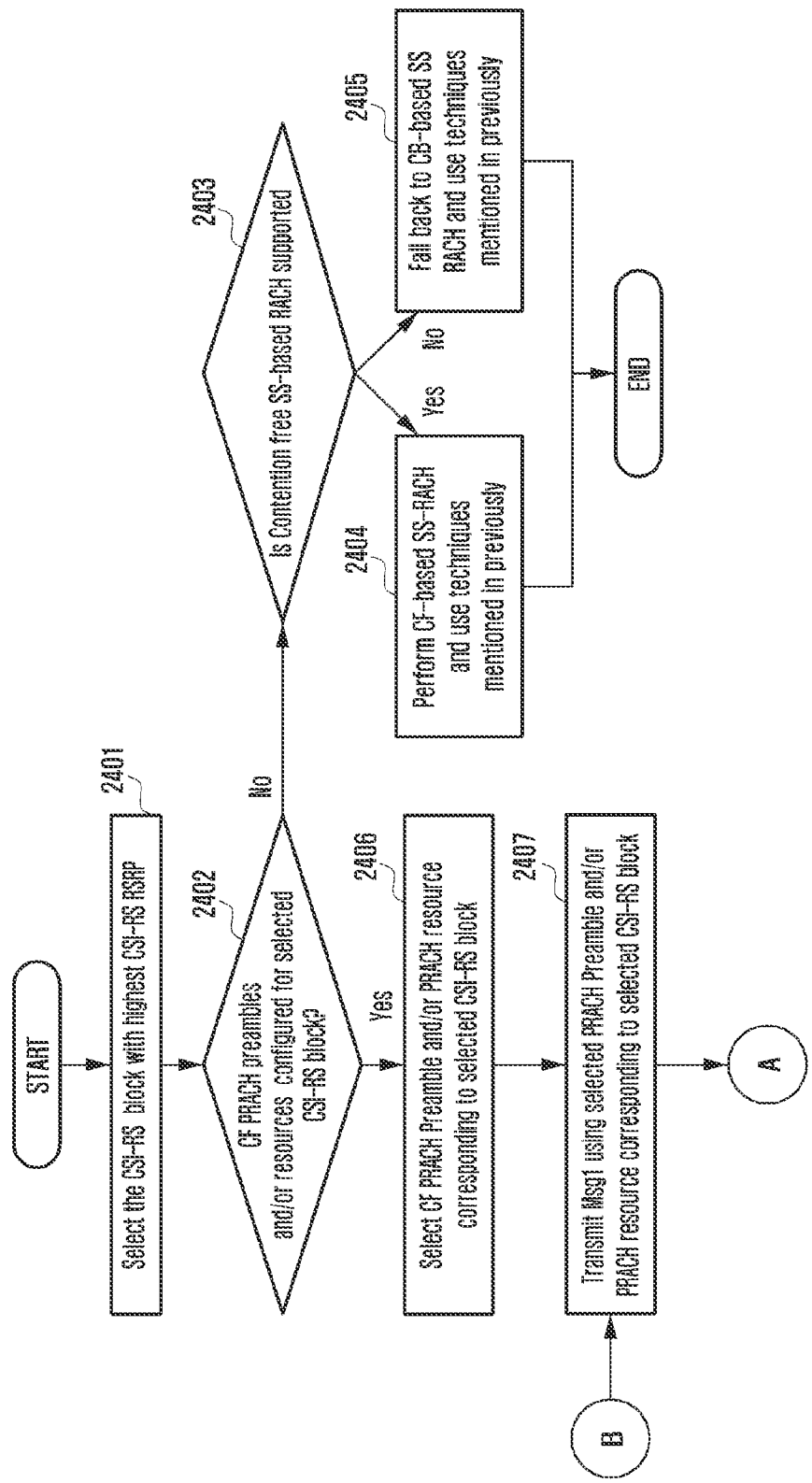
FIGS. 24A and 24B illustrate a UE behavior for RACH transmission and re-transmission based on Method 20 according to an embodiment of the disclosure.
Figure 24B:
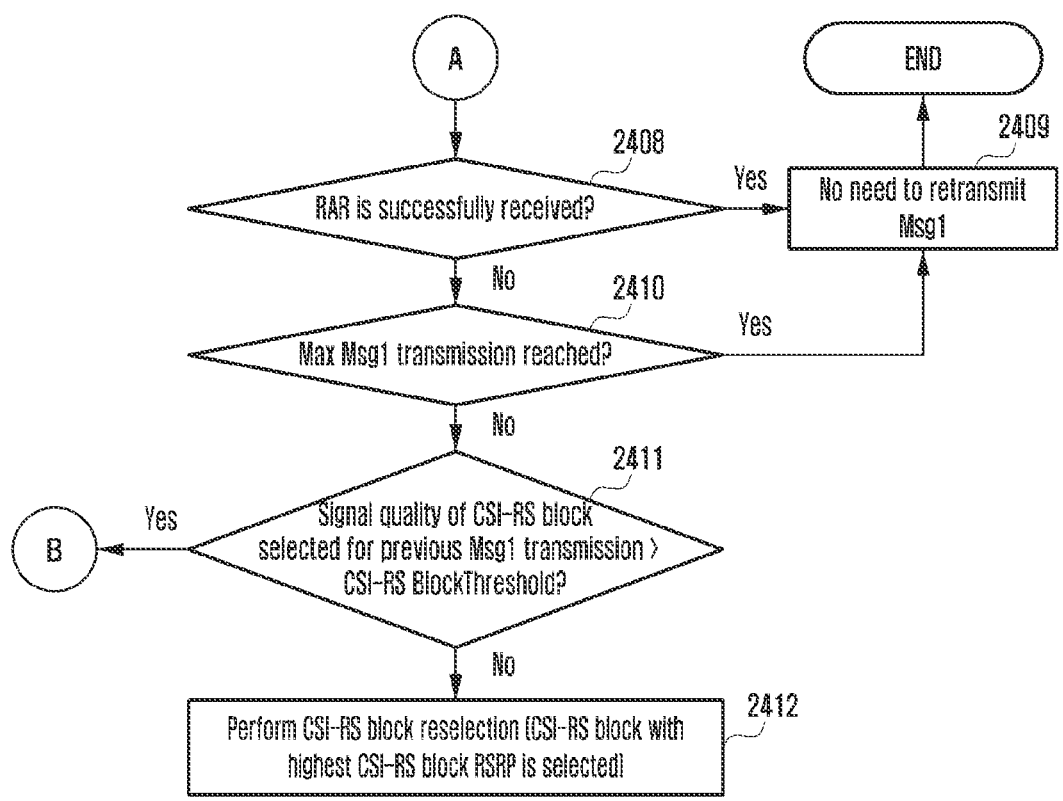

Method 20:

FIGS. 24A and 24B illustrate the UE behavior for the RACH transmission and re-transmission based on Method 20 according to an embodiment of the disclosure.

Referring to FIGS. 24A and 24B, UE selects a suitable CSI-RS block for PRACH preamble transmission. This procedure is similar to the case of the SS block based RACH. The changes in the mentioned procedure occur when the UE intends to perform re-transmission of the RACH preamble for the case of CF RACH or even beam recovery based RACH at operation 2411. When the signal quality of the selected CSI-RS beam/resource is now not deemed feasible for the case of re-transmission, then the UE may perform reselection of the CSI-RS resource at operation 2412. In other words, the UE can either re-perform measurements for the CSI-RS resources or the UE can rely on past measurements of other CSI-RS resources which can be beneficial if one of the beams may be blocked due to sudden environment changes. For calculating the power for transmitting the PRACH, the UE estimates the path loss based on signals received in selected CSI-RS resources.

In this procedure, the UE selects a suitable CSI-RS or the CSI-RS with highest CSI-RS RSRP amongst the reported CSI-RS measurements at operation 2401, and the UE determines whether CF PRACH preambles and/or PRACH resources are configured for the selected CSI-RS resource at operation 2402. If the UE is configured with contention free (i.e., dedicated) PRACH preamble and/or PRACH resource corresponding to the selected CSI-RS block, the UE selects dedicated PRACH preamble and/or PRACH resource corresponding to the selected block at operation 2406, and the UE transmits a PRACH preamble (i.e., Msg1) using the selected PRACH preamble and/or PRACH resource corresponding to the selected CSI-RS resource at operation 2407.

If CSI-RS resource is associated with a dedicated preamble the UE uses that PRACH preamble. Otherwise, the UE selects a PRACH preamble randomly from the contention based PRACH preambles corresponding to the selected CSI-RS resources or from the entire pool of CF preambles.

If CSI-RS resource is associated with dedicated PRACH resources (PRACH occasions), the UE selects a PRACH resource from it otherwise the UE selects a PRACH resource (PRACH occasion) from contention based PRACH resources (PRACH occasions) corresponding to the selected CSI-RS resource or from the entire pool of dedicated set of resources (PRACH occasions) intended for the case of handover RACH.

After transmitting the Msg1, the UE determines whether a RAR (i.e., Msg2) corresponding to Msg1 transmission is successfully received at operation 2408. If the UE successfully receives the RAR, there is no need to retransmit Msg1 at operation 2409. If the UE is not able to receive the RAR, the UE determines whether the UE has performed maximum number of allowed Msg1 transmissions at operation 2410. The UE retransmits the Msg1 if the UE has not yet transmitted maximum number of allowed Msg1 transmissions. If the UE has performed maximum number of allowed Msg1 transmissions, the UE does not retransmit Msg1. During the retransmission, the UE determines whether signal quality of CSI-RS block selected for previous Msg1 transmission is greater than or equal to a CSI-RS block threshold at operation 2411. If the signal quality of the CSI-RS block selected for the previous Msg1 transmission is greater than or equal to the threshold, the UE does not reselect the CSI-RS block. If the signal quality of the SS block selected for the previous Msg1 transmission is less than the threshold, the UE may reselect CSI-RS block at operation 2412. The UE may select the CSI-RS block with highest signal quality amongst all CSI-RS blocks transmitted by gNB. In another embodiment, the UE may select the SS block with highest signal quality amongst all CSI-RS blocks for which measurements are available.

If the UE is not configured with contention free (i.e., dedicated) PRACH preamble and/or PRACH resource, fallback is need. For the case when fallback is needed, the UE checks whether the CF RACH procedure based on the SS blocks of the target cell is supported at operation 2403, and the UE sends a PRACH preamble (i.e., Msg1) using the selected PRACH preamble and/or PRACH resource corresponding to the selected SS block at operation 2404 or 2405.

If SS block is associated with a dedicated preamble the UE uses that PRACH preamble. Otherwise, the UE selects a PRACH preamble randomly from the contention based PRACH preambles corresponding to the selected SS block.

If SS block is associated with dedicated PRACH resources (PRACH occasions), the UE selects a PRACH resource (PRACH occasion) from this subset otherwise the UE selects a PRACH resource (PRACH occasion) from contention based PRACH resources (PRACH occasions) corresponding to the selected SS block. The UE may select the earliest available time slot carrying a PRACH resource (dedicated if available otherwise contention) from PRACH resources (PRACH occasions) corresponding to the selected SS block. In an embodiment, the UE may select randomly one PRACH resource (or PRACH occasion) from configured PRACH resources (or PRACH occasions) (dedicated if available otherwise contention) corresponding to the selected SS block. In case multiple frequency division multiplexed PRACH resources (PRACH occasions) are available in the time corresponding to the selected SS block, the UE randomly selects with equal probability one PRACH resource (PRACH occasion) multiple frequency division multiplexed from available PRACH resources (PRACH occasion). The UE randomly selects with equal probability a PRACH preamble from configured set of PRACH preambles.

These resources for the case of SS block can be either CF based or CB based appropriately as the decision taken by the UE.

Multiple Msg1 Transmissions Before or while Waiting for RAR for First Transmitted Msg 1

Tx/Rx beam correspondence at UE holds if at least one of the following is satisfied: UE is able to determine a UE Tx beam for the uplink transmission based on UE's downlink measurement on UE's one or more Rx beams. UE is able to determine a UE Rx beam for the downlink reception based on transmission/reception point (TRP)'s indication based on uplink measurement on UE's one or more Tx beams. Tx/Rx beam correspondence at UE holds or not depends on UE capability.

For contention free scenario (e.g., handover), UE is configured with a dedicated preamble. If TX/RX correspondence is not there at UE then UE needs to transmit PRACH message 1 (i.e., dedicated PRACH preamble) using multiple UE TX beams as UE does not know the specific UE TX beam, transmission from which can be received by gNB.

Figure 25:
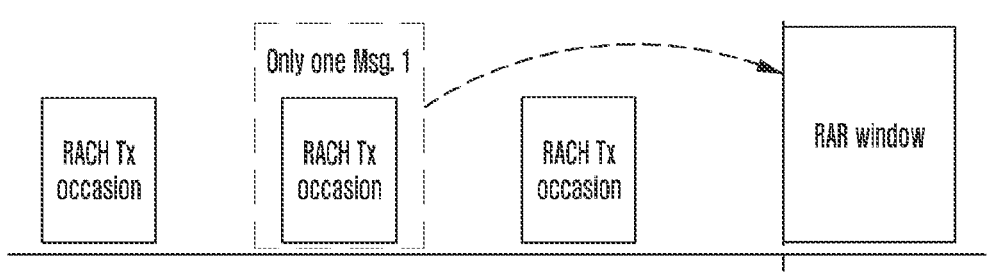
FIG. 25 illustrates an example where UE performs only one Msg. 1 transmission before RAR window.

FIG. 25 illustrates an example where UE performs only one Msg. 1 transmission before RAR window.

Referring to FIG. 25, UE transmits PRACH message 1 using a UE TX beam in RACH transmission occasion and wait for RAR in RAR window. If RAR is not received, UE transmit PRACH message 1 using another UE TX beam in another RACH transmission occasion and so on. This may significantly delay access to target cell.

The delay can be reduced if UE is allowed to transmit PRACH preamble in more than one RACH transmission occasion before monitoring the RAR window.

Figure 26A:
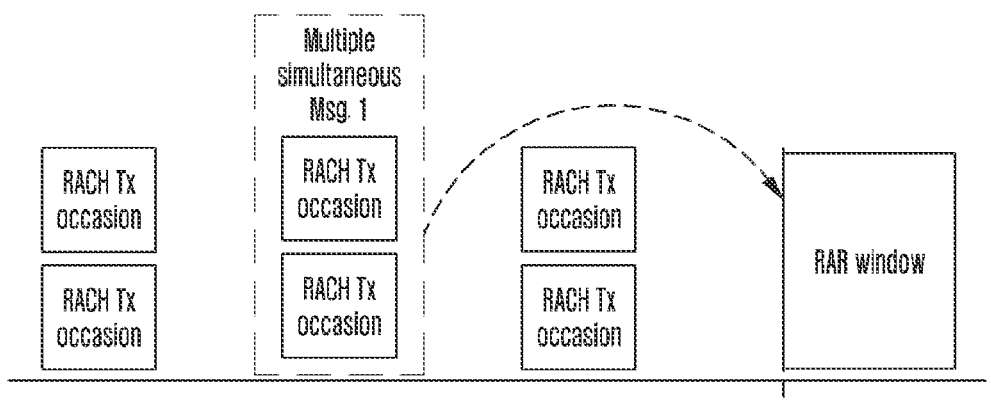
FIGS. 26A and 26B illustrate two examples of multiple Msg. 1 transmissions before RAR window according to various embodiments of the disclosure.
Figure 26B:
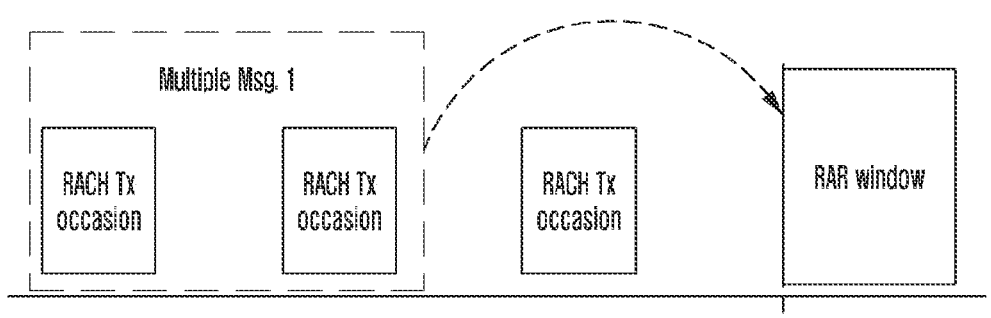

FIGS. 26A and 26B illustrate two examples of multiple Msg. 1 transmissions before RAR window according to various embodiments of the disclosure.

Referring to FIG. 26A, UE transmits Msg. 1 in RACH transmission occasions which are configured in frequency domain. This is possible only if UE has multiple antenna panels as UE can generate beam in only one direction using a single antenna panel. Referring to FIG. 26B, UE transmits Msg. 1 in RACH transmission occasions which are configured in time domain. A UE without beam correspondence can transmit Msg. 1 via different UL TX beams in different RACH TX occasion and access the target cell with less delay.

One of the issues in the above scenario is RAR monitoring (i.e., whether there is a single RAR window or separate RAR window for each transmitted MSG1). It is proposed that UE can monitor the RAR window(s) for receiving RAR when it transmits multiple Msg1 in one of the following ways:

The number of Msg1s UE can transmit before or while monitoring the RAR window can be configured by the network (e.g., in system information or RRC signaling or handover command) by network.

Figure 27:
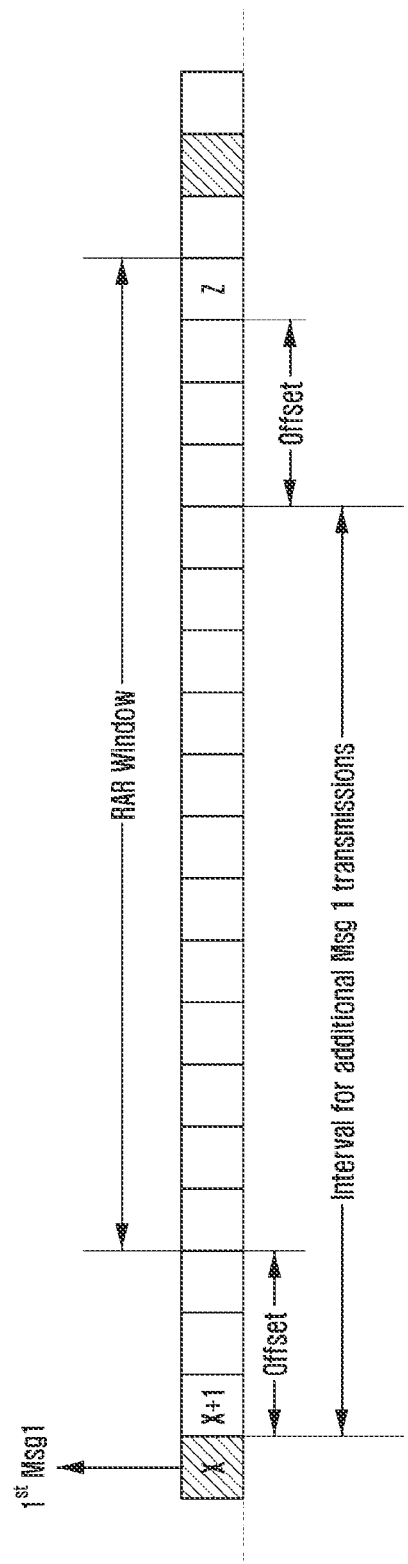
FIG. 27 illustrates multiple Msg1 transmissions before or while waiting for RAR for first transmitted Msg1 based on Option 1 according to an embodiment of the disclosure.

Option 1:

FIG. 27 illustrates multiple Msg1 transmissions before or while waiting for RAR for first transmitted Msg1 based on Option 1 according to an embodiment of the disclosure.

Referring to FIG. 27, UE transmits first Msg1 in a transmission time interval (TTI) X. The transmission occasion(s) where UE can transmit $1^{st}$ Msg1 can be indicated by network.

The RAR window starts from TTI X+offset where offset can be pre-defined or configured (e.g., in system information or RRC signaling or handover command) by network. Offset can be zero. RAR window ends at TTI Z where TTI Z equal to TTI X+offset+RAR Window length where RAR Window length is configured (e.g., in system information or RRC signaling) by network. From TTI X+1 to TTI Z-offset, UE can transmit additional MSG1s in available PRACH TX occasion. For each additional Msg1 transmitted by UE, from TTI X+1 to TTI Z-offset, UE monitors RAR in RAR window (i.e., from TTI X+offset to TTI X+offset+RAR Window length). UE will monitor for RAR corresponding to RA-RNTI and RAPID of each transmitted Msg1. As soon as UE receives RAR for any Msg1 transmitted by UE, it shall consider RAR reception successful and will not transmit additional Msg1 in interval TTI X+1 to TTI Z-offset.

Figure 28:
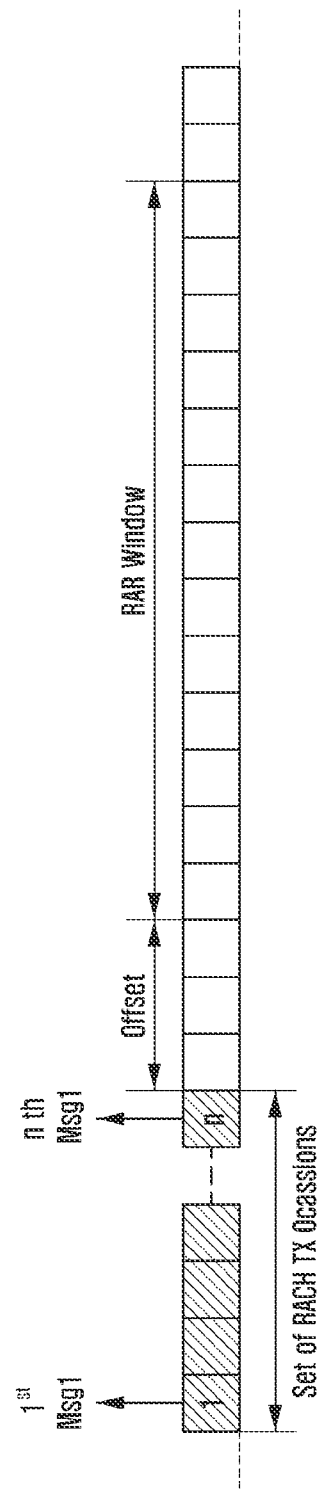
FIGS. 28 and 29 illustrate multiple Msg1 transmissions before or while waiting for RAR for first transmitted Msg1 based on Option 2 according to an embodiment of the disclosure.
Figure 29:
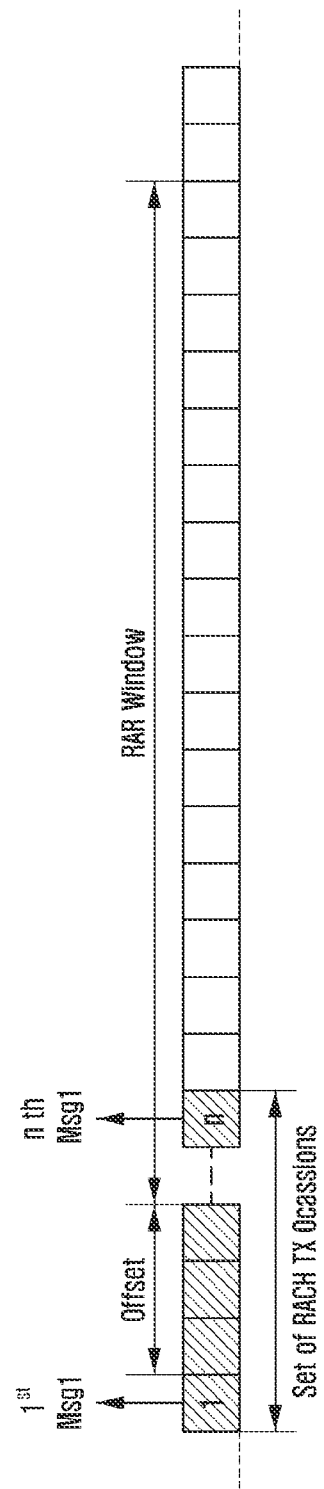

Option 2:

FIGS. 28 and 29 illustrate multiple Msg1 transmissions before or while waiting for RAR for first transmitted Msg1 based on Option 2 according to an embodiment of the disclosure.

In this method, one or more sets of RACH TX occasions are configured by network (e.g., in system information or RRC signaling or handover command) Each set comprise of N TX occasions. N is configurable by network. N can be configured based on number of TX beams at UE which UE may report to gNB in capability signaling. The TX occasions in each set can be contiguous or may not be contiguous. Each set of TX occasions may be associated with a SS block or CSI-RS in order to indicate the DL TX beam. In case of such association, SS block ID or CSI-RS ID associated with each set is indicated by network. Alternately, each TX occasion in a set may be associated with a SS block or CSI-RS in order to indicate the DL TX beam wherein one or multiple TX occasions may be associated with same SS block or CSI-RS. Alternately, TX occasions are not mapped to SS block or CSI-RS. UE may be assigned preamble corresponding to SS block or CSI-RS wherein this assignment can be for some SS blocks or CSI-RSs.

UE transmits MSG1s using a set of TX occasions. RAR window starts at an offset from end of set of RACH TX occasions as shown in FIG. 28.

UE will monitor for RAR corresponding to RA-RNTI and RAPID of each transmitted Msg1 in RAR window. As soon as UE receives RAR for any Msg1 transmitted by UE, it shall consider RAR reception successful. In alternate embodiment, RAR window starts at an offset from end of first RACH TX occasion in set of RACH TX occasions as shown in FIG. 29.

Figure 30:
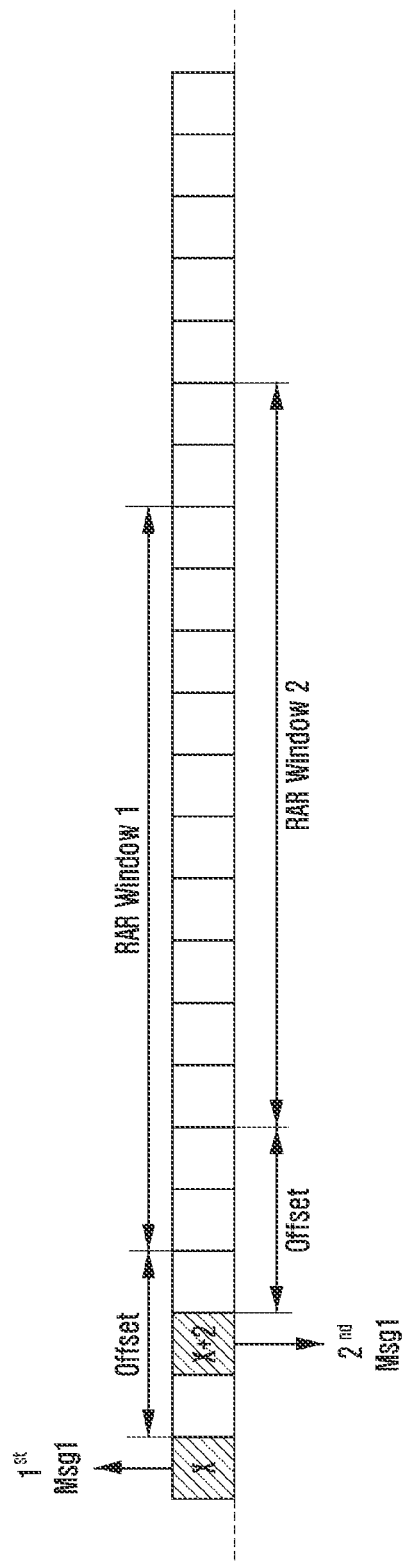
FIG. 30 illustrates multiple Msg1 transmissions before or while waiting for RAR for first transmitted Msg1 based on Option 3 according to an embodiment of the disclosure.

Option 3:

FIG. 30 illustrates multiple Msg1 transmissions before or while waiting for RAR for first transmitted Msg1 based on Option 3 according to an embodiment of the disclosure.

In this method no special signaling such as indication of TX occasions for $1^{st}$ msg1 as in option 1 or set of TX occasions as in option 2 are needed. PRACH resources can be configured in same manner irrespective of whether UE is allowed to transmit multiple Msg1 or not. In this method for every MSG1 transmitted by UE there is independent RAR window. In case of multiple MSG1s transmitted by UE, UE will monitor RAR in multiple RAR windows wherein RAR windows can be overlapping. UE will monitor for RAR corresponding to RA-RNTI and RAPID of each transmitted Msg1 in corresponding RAR window. As soon as UE receives RAR for any Msg1 transmitted by UE, it shall consider RAR reception successful.

Prioritization Between Msg1 Based SI Request and RRC Connection Request/RRC Connection Resume Request by UE in RRC Idle or Inactive State.

Scenario: UE has initiated SI acquisition on an on demand-basis. Random access procedure (2 step Msg1 based SI request or 4 step Msg3 based SI request) to transmit SI request is initiated. The SI request procedure or random access procedure is completed when UE receives the acknowledgement (in Msg2 for Msg1 based SI request; in Msg4 for Msg4 based SI request) for SI request transmitted by UE. After the completion of SI request procedure UE monitor one or more SI Window(s) of requested SI message (s) to receive the requested SI message(s). During the time interval from initiation of SI request and reception of acknowledgment for SI request, UE may trigger connection request/connection resume request. The trigger may be due to location update or RAN area update or paging reception or mobile originated call or for any other reason as specified in specification. Since the SI request procedure is ongoing, connection setup can happen after the completion of SI request procedure. This may however delay the connection setup.

In one embodiment of the proposed disclosure, it is proposed that the UE prioritizes the connection setup (i.e., connection request/connection resume request) over the SI request. UE terminates the ongoing SI request procedure and initiates transmission of connection request/connection resume request. In case of Msg1 based SI request, ongoing random access procedure to transmit the SI request is terminated. Random access procedure for transmitting the connection request/connection resume request is initiated by UE. In case of Msg3 based SI request, ongoing random access procedure to transmit the SI request is not terminated. During the ongoing random access procedure connection request/connection resume request is transmitted. SI request is transmitted after setting up the connection.

In one implementation, RRC has initiated transmission of SI request. While RRC is waiting for SI request acknowledgement from lower layers, RRC connection request/resume request is triggered (e.g., based on indication from higher layer). RRC in UE inform lower layers (i.e., MAC) to terminate transmission of SI request. RRC submits RRC connection request/RRC connection resume request to lower layer for transmission. In case of Msg1 based SI request, MAC layer terminates ongoing RA procedure for msg1 based SI request based on indication from higher layer (i.e., RRC). In case of Msg3 based SI request, MAC layer continues ongoing RA procedure and connection request/connection resume request is transmitted during the random access procedure.

In another embodiment of the proposed disclosure, it is proposed that if SI request is initiated for acquiring one or more SIs which are essential or which (e.g., access control parameters) are needed for connection setup then UE prioritizes SI request over RRC connection request/resume request. UE does not terminate on going SI request. If SI request is initiated for acquiring one or more SIs which are not essential or which are not needed for connection setup then UE prioritizes RRC connection request/resume request over SI request. UE terminates the ongoing SI request procedure and initiates transmission of connection request/connection resume request. In case of Msg1 based SI request, ongoing random access procedure to transmit the SI request is terminated. Random access procedure for transmitting the connection request/connection resume request is initiated by UE. In case of Msg3 based SI request, ongoing random access procedure to transmit the SI request is not terminated. During the ongoing random access procedure connection request/connection resume request is transmitted. SI request is transmitted after setting up the connection.

In another embodiment of the proposed disclosure, it is proposed that the UE prioritizes the connection setup (i.e., connection request/connection resume request) over the SI request if connection setup is for one or more pre-defined access categories or if connection setup is for certain access categories of high priority (e.g., priority greater than a specified value) or if connection setup is for one or more services defined in specification for which connection setup is more prioritized than SI request. UE terminates the ongoing SI request procedure and initiates transmission of connection request/connection resume request. In case of Msg1 based SI request, ongoing random access procedure to transmit the SI request is terminated. Random access procedure for transmitting the connection request/connection resume request is initiated by UE. In case of Msg3 based SI request, ongoing random access procedure to transmit the SI request is not terminated. During the ongoing random access procedure connection request/connection resume request is transmitted. SI request is transmitted after setting up the connection.

In one embodiment of the proposed disclosure, network may indicate in SI whether UE needs to prioritize the connection setup (i.e., connection request/connection resume request) over the SI request.

Distinguishing Msg 4 for SI Request from Msg 4 for Connection Request/Connection Resume Request Sent in Msg3:

Scenario: After the successful reception of RAR, UE sends Msg3 in UL grant received in RAR. Msg3 includes common control channel (CCCH) service data unit (SDU) (i.e., system information request message). System information request message is generated by RRC. The information about the SIB(s) used by UE is included in system information request message. There can be collision between UE1 transmitting SI request in Mgs3 and another UE2 transmitting other RRC message (such as connection request) in Msg3, if both UE1 and UE2 has transmitted Msg1 using same PRACH preamble and PRACH resource and has received the RAR. Msg3 from one of the UEs may be successful. gNB will transmit the Msg4 in response to received Msg3. Contention resolution MAC control element (CE) carrying x bits (48 bits in LTE) of CCCH SDU received in Msg3 is included in Msg4. The transport block (TB) carrying Contention resolution MAC CE is scheduled by physical downlink control channel (PDCCH) addressed to temporary-cell radio network temporary identifier (T-CRNTI) (Note that T-CRNTI was sent earlier to UE by gNB in RAR). In the TB scheduled by PDCCH addresses to T-CRNTI, MAC layer in UE checks if the MAC PDU includes a contention resolution MAC CE. X bits of CCCH SDU in Msg3 for SI request and X bits of CCCH SDU in Msg3 for connection request (or other message) can be same. So there can be ambiguity in determining whether the received Msg4 corresponds to its Msg3 or not.

In one embodiment of the proposed disclosure, it is proposed that SI request should include UE Identity (e.g., international mobile subscriber identity (IMSI) or system architecture evolution-temporary mobile subscriber identity (S-TMSI) or subscriber permanent identifier (SUPI) or any other UE identity defined in system) in addition to information about the SIB(s) used by UE. In the above scenario, this will ensure that, X bits of CCCH SDU in Msg3 for SI request transmitted by UE1 and X bits of CCCH SDU in Msg3 for connection request (or other message) transmitted by UE2 is not same. If gNB has received Msg3 carrying SI request from UE1, UE1 will receive Msg4 and contents of Contention resolution MAC CE will match with x bits of CCCH SDU transmitted by it in Msg3. UE2 may also receive Msg4 (as T-CRNTI was received by both UE1 and UE2) but contents of Contention resolution MAC CE will not match with x bits of CCCH SDU transmitted by it in Msg3. If gNB has received Msg3 carrying connection request from UE2, UE2 will receive Msg4 and contents of Contention resolution MAC CE will match with x bits of CCCH SDU transmitted by it in Msg3. UE1 may also receive Msg4 but contents of Contention resolution MAC CE will not match with x bits of CCCH SDU transmitted by it in Msg3.

In alternate embodiment of the proposed disclosure, it is proposed that UE identity is not included in system information request message. Two types of MAC CE are defined for including in Msg4. One for the case when Msg4 is transmitted in response to reception of Msg3 with SI request and another for the case when Msg4 is transmitted in response to reception of Msg3 with message (e.g., connection request, connection resume request) other than SI request. In one embodiment, the logical channel identifier (LCID) reserved for both MAC CEs to be included in MAC subheader of MAC CE is same and a type field is included in contents of MAC CE. This type field distinguishes whether this MAC CE is in response to SI request or not. In another embodiment, distinct LCIDs are reserved for each MAC CE. One MAC CE is contention resolution MAC CE and another MAC CE is SI ACK MAC CE. Msg4 for connection request/resume request in Msg3 will include contention resolution MAC CE. Msg4 for SI request in Msg3 will include SI ACK MAC CE. Contention resolution MAC CE includes x bits of CCCH SDU included in Msg3. SI ACK MAC CE includes x bits of CCCH SDU included in Msg3. Alternately SI ACK MAC CE includes list of one or more SIB types or SI message index. Alternately SI ACK MAC CE includes a bit map wherein each bit corresponds to a SIB or SI message. For example, if bit map is b0b1b2b3b4, then MSB (b0) in bit map corresponds to first SI message (or SIB type) in list of SI messages (or SIB types) in SIB1, b1 in bitmap corresponds to second SI message (or SIB type) in list of SI messages (or SIB types) in SIB1 and so on. Alternately, if bit map is b0b1b2b3b4, then least significant bit (LSB) (b4) in bit map corresponds to first SI message (or SIB type) in list of SI messages (or SIB types) in SIB1, b3 in bitmap corresponds to second SI message (or SIB type) in list of SI messages (or SIB types) in SIB1 and so on. The length of bit map in MAC CE can be fixed. Alternately length of bit map in MAC CE can be variable. Length can be equal to number of SI messages (or SIB types) in list of SI messages (or SIB types) in SIB1.

Pre-Emption Indication and DRX Inactivity Timer Handling

Scenario: gNB schedules a packet (DL or UL) by transmitting PDCCH. During the On Duration of DRX cycle, gNB starts (if not already running) or resets (if inactivity timer was already running) the inactivity timer. In order to avoid collision between URLL packet and eMBB packet, gNB may later transmit a Pre-emption indication to skip (or abort) reception of scheduled DL packet or skip transmission of scheduled UL packet. GNB may or may not schedule the aborted packet again later.

In one embodiment of the proposed disclosure, it is proposed that if UE receives a pre-emption indication aborting the scheduled packet transmission or reception, UE should stop the inactivity timer (if running) if the inactivity timer was started when the PDCCH scheduling the aborted packet was received. In another embodiment of the proposed disclosure, it is proposed that if UE receives a pre-emption indication aborting the scheduled packet transmission or reception, UE should stop the inactivity timer (if running) if the inactivity timer was started when the PDCCH scheduling the aborted packet was received and the time interval elapsed since the starting of timer is greater than a threshold or is smaller than a threshold. Threshold can be pre-defined or signaled by network.

Figure 31:
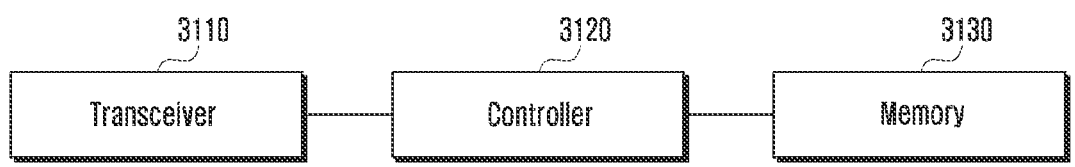
FIG. 31 is a block diagram of a UE according to an embodiment of the disclosure.

FIG. 31 is a block diagram of a UE according to an embodiment of the disclosure.

Referring to FIG. 31, the UE includes a transceiver 3110, a controller 3120 and a memory 3130. The transceiver 3110, the controller 3120 and the memory 3130 are configured to perform the above described operations of the UE. Although the transceiver 3110, the controller 3120 and the memory 3130 are shown as separate entities, they may be realized as a single entity like a single chip. The transceiver 3110, the controller 3120 and the memory 3130 may be electrically connected to or coupled with each other.

The transceiver 3110 may transmit and receive signals to and from other network entities, e.g., a BS.

The controller 3120 may control the UE to perform a function according to one of the embodiments described above. For example, the controller 3120 may be configured to control the transceiver to receive configuration information on RA resources associated with synchronization signal (SS) blocks from the base station, control the transceiver to receive one or more SS blocks from the base station, determine whether there is at least one suitable SS block for which contention free RA resources are configured amongst the one or more SS blocks based on the configuration information, select a suitable SS block for which contention free RA resources are configured if there is at least one suitable SS block for which contention free RA resources are configured amongst the one or more SS blocks, select a first RA preamble corresponding to the selected suitable SS block, and control the transceiver to transmit the first RA preamble to the base station. The controller 3120 may be further configured to select a suitable SS block for which contention based RA resources are configured if a suitable SS block for which contention free RA resources are configured amongst the one or more SS blocks is not found. The controller 3120 may be configured to determine a SS block of the one or more SS blocks as a suitable SS block if a signal quality of the SS block is greater than a threshold configured in a radio resource control (RRC) signaling. The controller 3120 may be further configured to select a next available time slot carrying a RA resource from RA resources corresponding to the selected SS block. The controller 3120 may be further configured to control the transceiver to transmit a second RA preamble to the base station, and monitor responses to the first RA preamble and the second RA preamble in a RAR window, wherein the RAR window is started after the transmitting of the first RA preamble after an offset. The controller 3120 may refer to a circuitry, an ASIC, or at least one processor.

In an embodiment, the operations of the UE may be implemented using the memory 3130 storing corresponding program codes. Specifically, the UE may be equipped with the memory 3130 to store program codes implementing desired operations. To perform the desired operation, the controller 3120 may read and execute the program codes stored in the memory 3130 by using a processor or a central processing unit (CPU).

Figure 32:
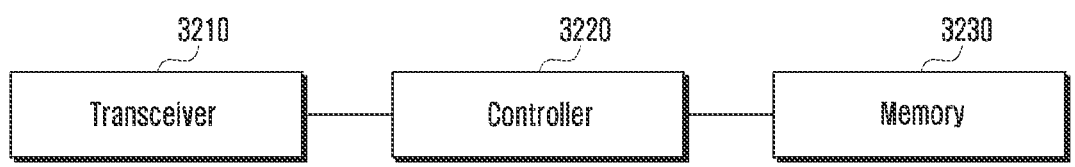
FIG. 32 is a block diagram of a base station (BS) according to an embodiment of the disclosure.

FIG. 32 is a block diagram of a BS according to an embodiment of the disclosure.

Referring to FIG. 32, a BS includes a transceiver 3210, a controller 3220 and a memory 3230. The transceiver 3210, the controller 3220 and the memory 3230 are configured to perform the above described operations of the network (e.g., gNB). Although the transceiver 3210, the controller 3220 and the memory 3230 are shown as separate entities, they may be realized as a single entity like a single chip. The transceiver 3210, the controller 3220 and the memory 3230 may be electrically connected to or coupled with each other.

The transceiver 3210 may transmit and receive signals to and from other network entities, e.g., a UE.

The controller 3220 may control the BS to perform a function according to one of the embodiments described above. For example, the controller 3220 may be configured to control the transceiver to transmit configuration information on RA resources associated with synchronization signal (SS) blocks to the terminal, control the transceiver to transmit one or more SS blocks to the terminal, and control the transceiver to receive an RA preamble from the terminal. The controller 3220 may refer to a circuitry, an ASIC, or at least one processor.

In an embodiment, the operations of the BS may be implemented using the memory 3230 storing corresponding program codes. Specifically, the BS may be equipped with the memory 3230 to store program codes implementing desired operations. To perform the desired operation, the controller 3220 may read and execute the program codes stored in the memory 3230 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, comprising:
   receiving, from a base station, configuration information on a contention-based random access (RA) and information on a first threshold for a selection of a synchronization signal (SS) block;
   receiving, from the base station, configuration information on a contention-free RA, information on a second threshold for a selection of a channel state information reference signal (CSI-RS), and information on at least one RA preamble associated with each CSI-RS;
   in case that the configuration information on the contention-free RA comprises information on contention-free RA resources associated with CSI-RSs and at least one CSI-RS with a signal quality greater than the second threshold among the CSI-RSs associated with the contention-free RA resources is available,
      selecting a first CSI-RS among the at least one CSI-RS associated with the contention-free RA resources; and
      selecting a first RA preamble corresponding to the selected first CSI-RS based on the information on the at least one RA preamble associated with each CSI-RS;
   in case that the at least one CSI-RS with the signal quality greater than the second threshold among the CSI-RSs associated with the contention-free RA resources is not available,
      identifying that at least one SS block with a signal quality greater than the first threshold among SS blocks associated with contention-based RA resources;
      selecting a first SS block among the at least one SS block associated with the contention-based RA resources; and
      selecting a second RA preamble randomly with equal probability from at least one contention-based RA preamble associated with the selected first SS block;
   selecting a physical random access channel (PRACH) occasion based on the selected first CSI-RS or the selected first SS block; and
   transmitting, to the base station, the first RA preamble or the second RA preamble in the selected PRACH occasion.

2. The method of claim 1, wherein the configuration information on the contention-based RA is included in a radio resource control (RRC) message.

3. The method of claim 1, wherein the signal quality greater than the second threshold is identified based on reference signal received power (RSRP) of a CSI-RS.

4. The method of claim 1, further comprising:
   identifying a next available PRACH occasion from among PRACH occasions corresponding to the selected first CSI-RS or the selected first SS block.

5. The method of claim 1, further comprising:
   determining whether a random access response (RAR) corresponding to the first RA preamble or the second RA preamble is not received and whether a maximum number of a RA preamble transmission is not reached;
   in case that the RAR is not received, the maximum number of the RA preamble transmission is not reached, the configuration information on the contention-free RA comprises the information on the contention-free RA resources associated with the CSI-RSs, and the at least one CSI-RS with the signal quality greater than the second threshold among the CSI-RSs associated with the contention-free RA resources is available,
      selecting a second CSI-RS among the at least one CSI-RS associated with the contention-free RA resources; and
      selecting a third RA preamble corresponding to the selected second CSI-RS based on the information on the at least one RA preamble associated with each CSI-RS;
   selecting a PARCH occasion based on the selected second CSI-RS; and
   transmitting, to the base station, the third RA preamble in the selected PRACH occasion.

6. The method of claim 5, further comprising:
   in case that the RAR is not received, the maximum number of the RA preamble transmission is not reached, and the at least one CSI-RS with the signal quality greater than the second threshold among the CSI-RSs associated with the contention-free RA resources is not available,
      identifying that at least one SS block with the signal quality greater than the first threshold among the SS blocks associated with contention-based RA resources;
      selecting a second SS block among the at least one SS block associated with the contention-based RA resource; and
      selecting a fourth RA preamble randomly with equal probability from at least one contention-based RA preamble associated with the selected second SS block;
   selecting a PARCH occasion based on the selected second SS block; and
   transmitting, to the base station, the fourth RA preamble in the selected PRACH occasion.

7. A method performed by a base station in a wireless communication system, comprising:
   transmitting, to a terminal in the wireless communication system, configuration information on a contention-based random access (RA) and information on a first threshold for a selection of a synchronization signal (SS) block;
   transmitting, to the terminal, configuration information on a contention-free RA, information on a second threshold for a selection of a channel state information reference signal (CSI-RS), and information on at least one RA preamble associated with each CSI-RS; and
   receiving, from the terminal, a first RA preamble or a second RA preamble in a physical random access channel (PRACH) occasion selected based on a first CSI-RS or a first SS block,
   wherein in case that the configuration information on the contention-free RA comprises information on contention-free RA resources associated with CSI-RSs and at least one CSI-RS with a signal quality greater than the second threshold among the CSI-RSs associated with the contention-free RA resources, the first CSI-RS is selected among the at least one CSI-RS associated with the contention-free RA resources and the first RA preamble corresponding to the selected first CSI-RS based on the information on the at least one RA preamble associated with each CSI-RS, and wherein in case that the at least one CSI-RS with the signal quality greater than the second threshold among the CSI-RSs associated with the contention-free RA resources is not available, at least one SS block with a signal quality greater than the first threshold among SS blocks associated with contention-based RA resources is identified, the first SS block is selected among the at least one SS block associated with the contention-based RA resources, and the second RA preamble randomly with equal probability from at least one contention-based RA preamble associated with the selected first SS block.

8. The method of claim 7, wherein the configuration information on the contention-based RA is included in a radio resource control (RRC) message.

9. The method of claim 7, wherein the signal quality greater than the second threshold is identified based on reference signal received power (RSRP) of a CSI-RS.

10. The method of claim 7, further comprising:

receiving, from the terminal, a third RA preamble in a PRACH occasion selected based on a second CSI-RS, in case that a random access response (RAR) corresponding to the first RA preamble or the second RA preamble is not received, a maximum number of a RA preamble transmission is not reached, the configuration information on the contention-free RA comprises the information on the contention-free RA resources associated with the CSI-RSs, and the at least one CSI-RS with the signal quality greater than the second threshold among the CSI-RSs associated with the contention-free RA resources is available, wherein the second CSI-RS among the at least one CSI-RS associated with the contention-free RA resources is selected and the third RA preamble corresponding to the selected second CSI-RS is selected based on the information on the at least one RA preamble associated with each CSI-RS; or receiving, from the terminal, a fourth RA preamble in a PRACH occasion selected based on a second SS block, in case that the RAR corresponding to the first RA preamble or the second RA preamble is not received, the maximum number of the RA preamble transmission is not reached, and the at least one CSI-RS with the signal quality greater than the second threshold among the CSI-RSs associated with the contention-free RA resources is not available, wherein at least one SS block with the signal quality greater than the first threshold among the SS blocks associated with contention-based RA resources is identified, the second SS block among the at least one SS block associated with the contention-based RA resource is selected, the fourth RA preamble is selected randomly with equal probability from at least one contention-based RA preamble associated with the selected second SS block.

11. A terminal in a wireless communication system, comprising:

a transceiver; and
a controller coupled with the transceiver and configured to:
receive, from a base station, configuration information on a contention-based random access (RA) and information on a first threshold for a selection of a synchronization signal (SS) block, receive, from the base station, configuration information on a contention-free RA, information on a second threshold for a selection of a channel state information reference signal (CSI-RS), and information on at least one RA preamble associated with each CSI-RS, in case that the configuration information on the contention-free RA comprises information on contention-free RA resources associated with CSI-RSs and at least one CSI-RS with a signal quality greater than the second threshold among the CSI-RSs associated with the contention-free RA resources is available,
select a first CSI-RS among the at least one CSI-RS associated with the contention-free RA resources, and
select a first RA preamble corresponding to the selected first CSI-RS based on the information on the at least one RA preamble associated with each CSI-RS, in case that at least one CSI-RS with the signal quality greater than the second threshold among the CSI-RSs associated with the contention-free RA resources is not available,
identify at least one SS block with a signal quality greater than the first threshold among SS blocks associated with contention-based RA resources,
select a first SS block among the at least one SS block associated with the contention-based RA resources, and
select a second RA preamble randomly with equal probability from at least one contention-based RA preamble associated with the selected first SS block, select a physical random access channel (PRACH) occasion based on the selected first CSI-RS or the selected first SS block, and transmit, to the base station, the first RA preamble or the second RA preamble in the selected PRACH occasion.

12. The terminal of claim 11, wherein the configuration information on the contention-based RA is included in a radio resource control (RRC) message.

13. The terminal of claim 11, wherein the controller is further configured to identify the signal quality greater than the second threshold based on reference signal received power (RSRP) of a CSI-RS.

14. The terminal of claim 11, wherein the controller is further configured to identify a next available PRACH occasion from among PRACH occasions corresponding to the selected first CSI-RS or the selected first SS block.

15. The terminal of claim 11, wherein the controller is further configured to:

determine whether a random access response (RAR) corresponding to the first RA preamble or the second RA preamble is not received and whether a maximum number of a RA preamble transmission is not reached, in case that the RAR is not received, the maximum number of the RA preamble transmission is not reached, the configuration information on the contention-free RA comprises the information on the contention-free RA resources associated with the CSI-RSs, and the at least one CSI-RS with the signal quality greater than the second threshold among the CSI-RSs associated with the contention-free RA resources is available, select a second CSI-RS among the at least one CSI-RS associated with the contention-free RA resources, and select a third RA preamble corresponding to the selected second CSI-RS based on the information on the at least one RA preamble associated with each CSI-RS, select a PARCH occasion based on the selected second CSI-RS, and transmit, to the base station, the third RA preamble in the selected PRACH occasion.

16. The terminal of claim 15, wherein the controller is further configured to:

in case that the RAR is not received, the maximum number of the RA preamble transmission is not reached, and the at least one CSI-RS with the signal quality greater than the second threshold among the CSI-RSs associated with the contention-free RA resources is not available, identify that at least one SS block with the signal quality greater than the first threshold among the SS blocks associated with contention-based RA resources, select a second SS block among the at least one SS block associated with the contention-based RA resource, and select a fourth RA preamble randomly with equal probability from at least one contention-based RA preamble associated with the selected second SS block, select a PARCH occasion based on the selected second SS block, and transmit, to the base station, the fourth RA preamble in the selected PRACH occasion.

17. A base station in a wireless communication system, comprising:

a transceiver; and a controller coupled with the transceiver and configured to:

transmit, to a terminal, configuration information on a contention-based random access (RA) and information on a first threshold for a selection of a suitable SS block, transmit, to the terminal, configuration information on a contention-free RA, information on a second threshold for a selection of a channel state information reference signal (CSI-RS), and information on at least one RA preamble associated with each CSI-RS, and receive, from the terminal, a first RA preamble or a second RA preamble in a physical random access channel (PRACH) occasion selected based on a first CSI-RS or a first SS block, wherein in case that the configuration information on the contention-free RA comprises information on contention-free RA resources associated with CSI-RSs and at least one CSI-RS with a signal quality greater than the second threshold among the CSI-RSs associated with the contention-free RA resources, the first CSI-RS is selected among the at least one CSI-RS associated with the contention-free RA resources and the first RA preamble corresponding to the selected first CSI-RS based on the information on the at least one RA preamble associated with each CSI-RS, and wherein in case that the at least one CSI-RS with the signal quality greater than the second threshold among the CSI-RSs associated with the contention-free RA resources is not available, at least one SS block with a signal quality greater than the first threshold among SS blocks associated with contention-based RA resources is identified, the first SS block is selected among the at least one SS block associated with the contention-based RA resources, and the second RA preamble randomly with equal probability from at least one contention-based RA preamble associated with the selected first SS block.

18. The base station of claim 17, wherein the configuration information on the contention-based RA is included in a radio resource control (RRC) message.

19. The base station of claim 17, wherein the signal quality greater than the second threshold is identified based on reference signal received power (RSRP) of a CSI-RS.

20. The base station of claim 17, wherein the controller is further configured to:

receive, from the terminal, a third RA preamble in a PRACH occasion selected based on a second CSI-RS, in case that a random access response (RAR) corresponding to the first RA preamble or the second RA preamble is not received, a maximum number of a RA preamble transmission is not reached, the configuration information on the contention-free RA comprises the information on the contention-free RA resources associated with the CSI-RSs, and the at least one CSI-RS with the signal quality greater than the second threshold among the CSI-RSs associated with the contention-free RA resources is available, wherein the second CSI-RS among the at least one CSI-RS associated with the contention-free RA resources is selected and the third RA preamble corresponding to the selected second CSI-RS is selected based on the information on the at least one RA preamble associated with each CSI-RS, or receive, from the terminal, a fourth RA preamble in a PRACH occasion selected based on a second SS block, in case that the RAR corresponding to the first RA preamble or the second RA preamble is not received, the maximum number of the RA preamble transmission is not reached, and the at least one CSI-RS with the signal quality greater than the second threshold among the CSI-RSs associated with the contention-free RA resources is not available, wherein at least one SS block with the signal quality greater than the first threshold among the SS blocks associated with contention-based RA resources is identified, the second SS block among the at least one SS block associated with the contention-based RA resource is selected, the fourth RA preamble is selected randomly with equal probability from at least one contention-based RA preamble associated with the selected second SS block.

* * * * *